(12) United States Patent
Inoue

(10) Patent No.: US 12,107,426 B2
(45) Date of Patent: Oct. 1, 2024

(54) POWER CONVERSION DEVICE

(71) Applicant: Mitsubishi Electric Corporation, Tokyo (JP)

(72) Inventor: Sadayuki Inoue, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 18/031,627

(22) PCT Filed: Nov. 6, 2020

(86) PCT No.: PCT/JP2020/041518
§ 371 (c)(1),
(2) Date: Apr. 13, 2023

(87) PCT Pub. No.: WO2022/097269
PCT Pub. Date: May 12, 2022

(65) Prior Publication Data
US 2023/0387692 A1    Nov. 30, 2023

(51) Int. Cl.
*H02J 3/38* (2006.01)
*H02J 3/40* (2006.01)

(52) U.S. Cl.
CPC ............. *H02J 3/381* (2013.01); *H02J 3/40* (2013.01); *H02J 2203/20* (2020.01); *H02J 2300/24* (2020.01)

(58) Field of Classification Search
CPC ...... H02J 3/38; H02J 3/381; H02J 3/40; H02J 2300/24; H02J 2203/20
See application file for complete search history.

(56) References Cited

U.S. PATENT DOCUMENTS

2013/0294119 A1    11/2013    Kimura et al.

FOREIGN PATENT DOCUMENTS

| EP | 3780310 A1 | 2/2021 |
|---|---|---|
| JP | 2012-152058 A | 8/2012 |
| JP | 2019-176584 A | 10/2019 |

OTHER PUBLICATIONS

International Search Report and Written Opinion mailed on Jan. 19, 2021, received for PCT Application PCT/JP2020/041518, filed on Nov. 6, 2020, 10 pages including English Translation.

*Primary Examiner* — Robert L Deberadinis
(74) *Attorney, Agent, or Firm* — XSENSUS LLP

(57) ABSTRACT

A control circuit includes a virtual synchronous generator control circuit to impart a transient characteristic of a synchronous generator to the inverter, a control parameter generating circuit to generate a control parameter for controlling the virtual synchronous generator control circuit, an inverter voltage control circuit to control the inverter as a voltage source, based on AC system voltage information input from the virtual synchronous generator control circuit, and a communication circuit to receive, from a management device that manages the distributed power source, a power target value of the distributed power source and information necessary for generating the control parameter. The control parameter generating circuit generates at least one of a speed adjustment rate and a damping coefficient to be used in the virtual synchronous generator control circuit, based on the power target value and the information necessary for generating the control parameter received by the communication circuit.

12 Claims, 59 Drawing Sheets

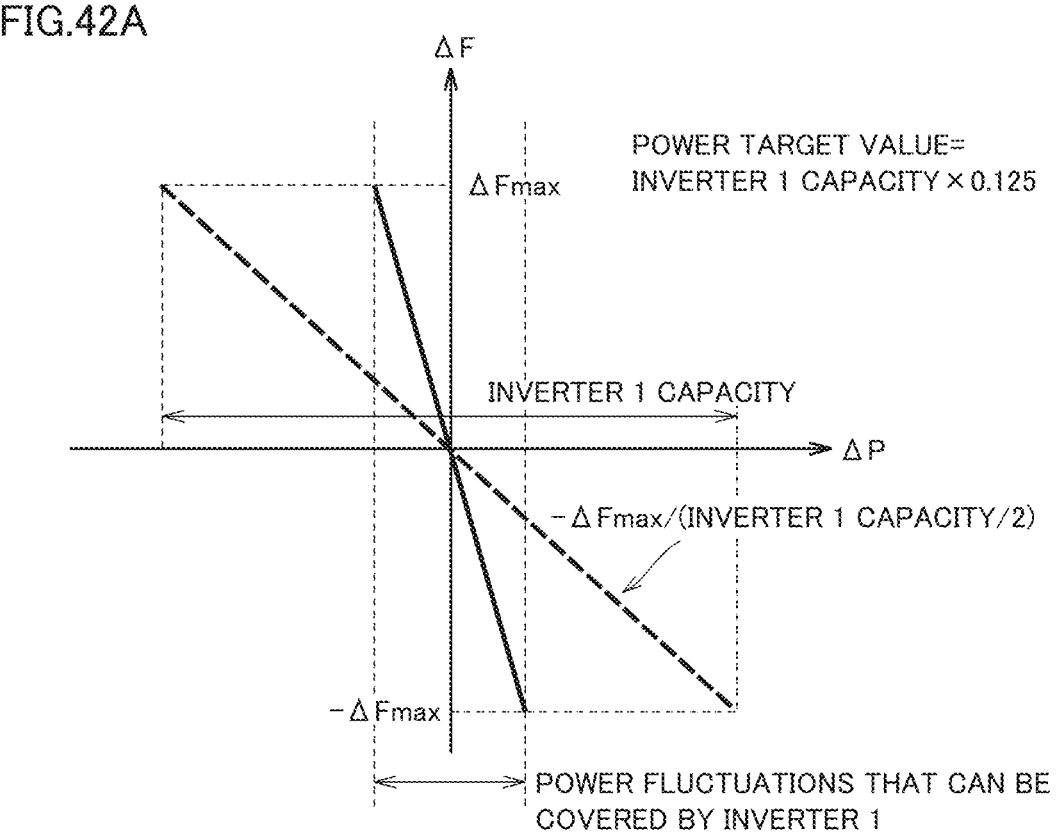

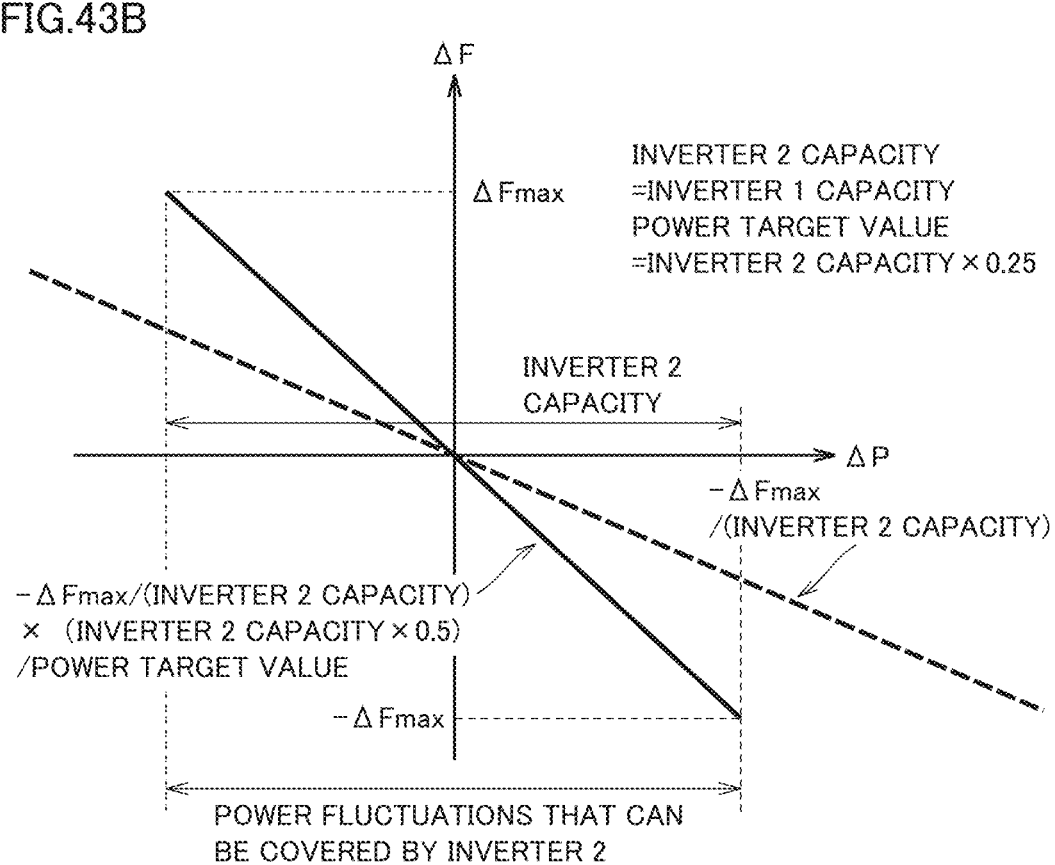

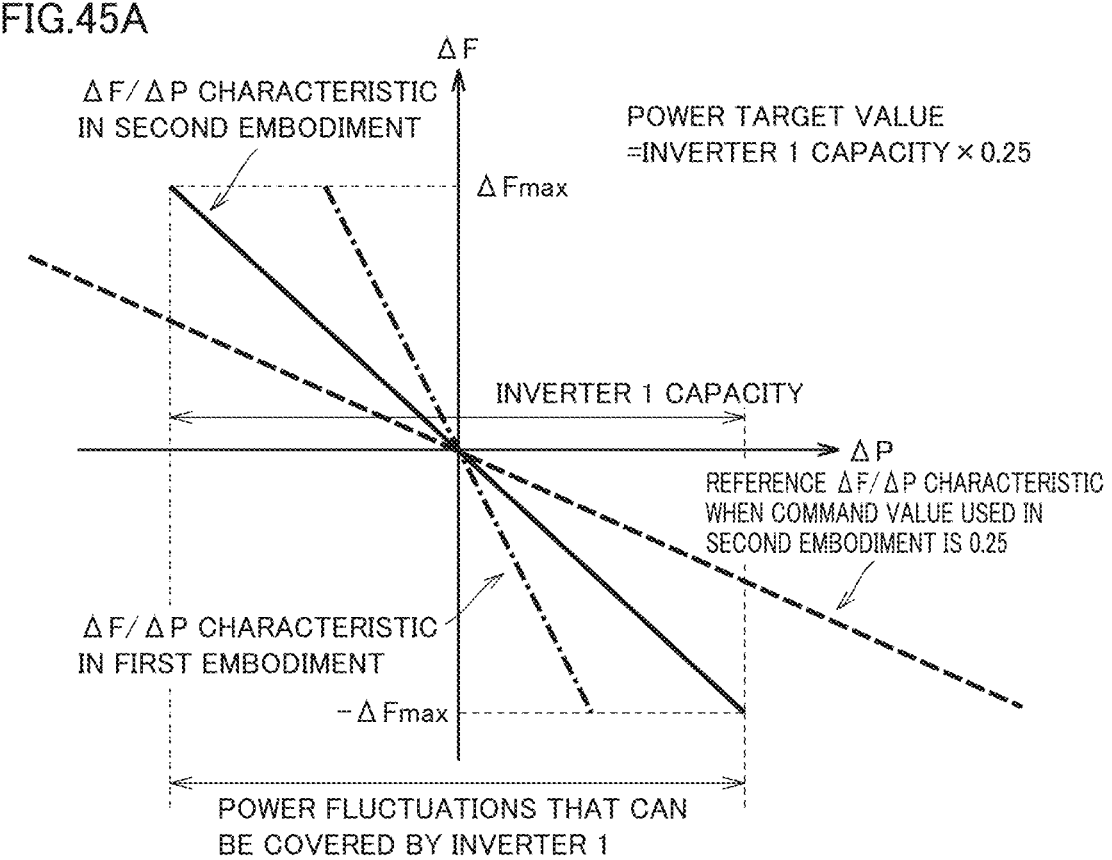

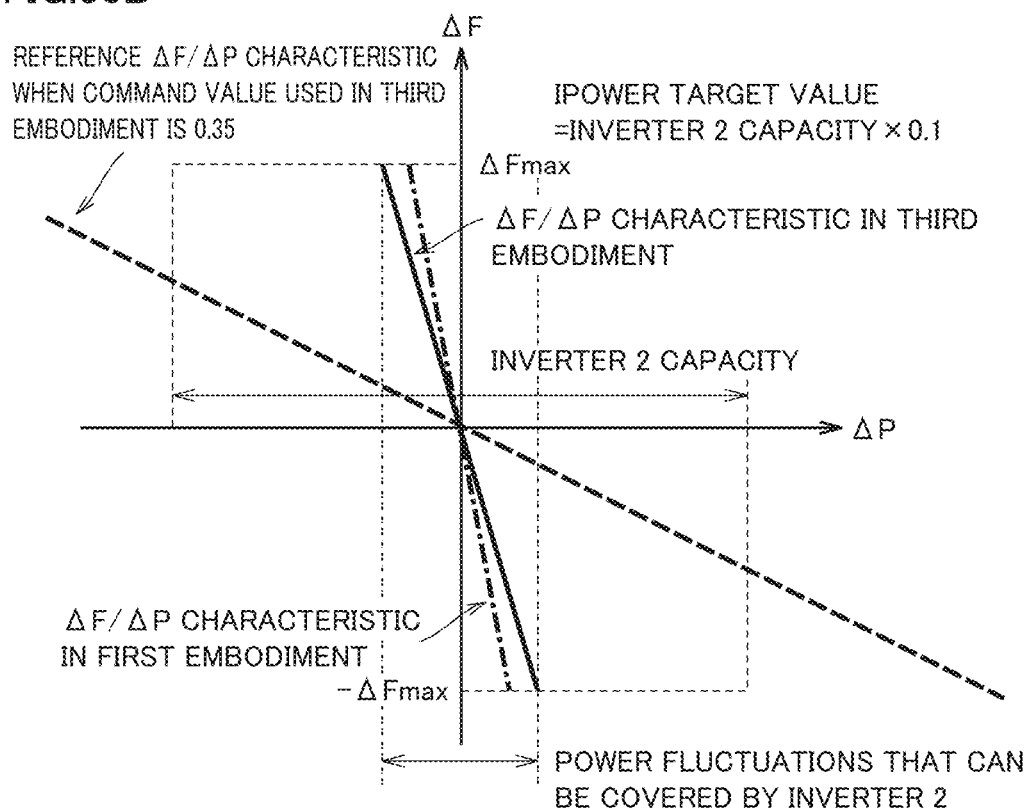

POWER CONVERSION DEVICE

CROSS-REFERENCE TO RELATED APPLICATION

The present application is based on PCT filing PCT/JP2020/041518, filed Nov. 6, 2020, the entire contents of which are incorporated herein by reference.

TECHNICAL FIELD

The present disclosure relates to a power conversion device.

BACKGROUND ART

In recent years, energy creation devices using renewable energy, such as photovoltaic batteries, have been increasingly introduced in order to reduce environmental loads. Meanwhile, in order to address power shortages after the Great East Japan Earthquake, systems including energy storage devices such as storage batteries or systems including energy creation devices and energy storage devices in combination have been commercialized. These systems employ static inverters in order to interconnect energy creation devices and energy storage devices to AC systems.

In power grids, with increase of the amount of power generation using renewable energy, thermal power plants serving to adjust the amount of power generation for demand fluctuations are expected to be closed, from the viewpoint of reducing power generation costs including management costs. However, synchronous generators in thermal power plants potentially have functions (for example, inertial force, synchronization force, etc.) to suppress fluctuations of the system frequency when they occur. Therefore, if more thermal power plants are closed, the number of synchronous generators will be decreasing to make it difficult to keep the stability of power grids.

In order to solve the above problem, technology has been developed for controlling virtual synchronous generators which are static inverters provided with the functions of synchronous generators. For example, Japanese Patent Laying-Open No. 2019-176584 (PTL 1) discloses a method of setting a control parameter for a distributed power source (static inverter) equipped with virtual synchronous generator control. Specifically, PTL 1 discloses a method of generating a control parameter for setting virtual inertia in a distributed power source, based on at least one of a required inertia value required by a grid operator and a virtual inertia value calculated based on a specification and an operation state of the distributed power source.

CITATION LIST

Patent Literature

PTL 1: Japanese Patent Laying-Open No. 2019-176584

SUMMARY OF INVENTION

Technical Problem

The method of generating a control parameter described in PTL 1 ensures the inertial force of the grid intended by the grid operator but fails to ensure the power allocation shared by each distributed power source due to fluctuations in loads or fluctuations in the amount of power generation of energy creation devices.

For example, a case in which two storage batteries equipped with virtual synchronous generator control are interconnected as distributed power sources to a grid will be discussed. It is assumed that the capacity of the storage batteries and the capacity of static inverters are the same and the ratio of the state of charge (SOC) is 2:1. In this case, in an operation plan of the storage batteries (charge/discharge plan), the ratio of discharge power target value of each storage battery is allocated at 2:1.

Here, if the load of the entire grid increases, virtual synchronous generator control is executed in each storage battery, and the increased power is allocated between two storage batteries and output. In doing so, when the control parameters of virtual synchronous generator control of two storage batteries are the same, each storage battery additionally outputs the same amount of power.

However, in the operation plan of the storage batteries described above, two storage batteries are planned to output power in accordance with the ratio between their SOCs, and it is desirable that the increased power is also allocated in accordance with the ratio in the operation plan.

In the above PTL 1, since the control parameters are determined only by the grid inertial force required by the grid operator, a power excess/deficit at the time of fluctuations of loads or fluctuations in generated power of energy creation devices is allocated among a plurality of distributed power sources, based on the virtual inertia of each distributed power source. The power excess/deficit is therefore allocated at a ratio different from the allocation ratio initially intended in the operation plan.

In general, a power target value (operation plan) allocated to a plurality of power conversion devices (for simplicity of explanation, it is assumed that virtual synchronous generator control is implemented in a static inverter of a system power storage system) is allocated based on the capacity and the SOC of each storage battery and the static inverter capacity. Specifically, in the case of discharging, more electric power is allocated to a storage battery with a higher SOC when the storage battery capacity and the capacity of the static inverter are the same among a plurality of storage batteries. This is because, for example, when the charge power in one of two storage batteries becomes zero (SOC=0), the grid inertial force is thereafter maintained in the remaining one storage battery and, therefore, the pseudo inertial force by the static inverter is substantially reduced to half. Thus, when the power allocation among a plurality of storage batteries is determined, it is necessary to determine the share such that the SOC of each storage battery becomes zero substantially simultaneously (in the case of charging full charge).

In particular, in a case where a micro-grid is configured using a plurality of distributed power sources such as storage batteries equipped with virtual synchronous generator control, electric power is unable to be allocated as intended among the distributed power sources when power supplied to the grid abruptly changes due to sudden change in a load or sudden change in solar radiation.

The present disclosure is made to solve the problem described above and an object of the present disclosure is to generate control parameters in virtual synchronous generator control in a power grid in which a plurality of power conversion devices having static inverters equipped with virtual synchronous generator control are interconnected, in which even when the power consumption of loads fluctuates or the generated power of energy creation devices fluctuates, a power excess/deficit can be allocated at the ratio equal to the ratio of power target value that each power conversion device is notified of from a higher-level energy management system (EMS).

Solution to Problem

According to an aspect of the present disclosure, a power conversion device includes an inverter to convert a power output from a distributed power source into an AC power and output the AC power to an AC system, and a controller to control the inverter. The controller includes virtual synchronous generator control circuitry to impart a transient characteristic of a synchronous generator to the inverter, control parameter generating circuitry to generate a control parameter for controlling the virtual synchronous generator control circuitry, inverter voltage control circuitry to control the inverter as a voltage source, based on AC system voltage information input from the virtual synchronous generator control circuitry, and communication circuitry to receive, from a management device that manages the distributed power source, a power target value of the distributed power source and information necessary for generating the control parameter. The control parameter generating circuitry generates at least one of a speed adjustment rate and a damping coefficient to be used in the virtual synchronous generator control circuitry, based on the power target value and the information necessary for generating the control parameter received by the communication circuitry.

Advantageous Effects of Invention

According to the present disclosure, in a power grid in which a plurality of power conversion devices having static inverters equipped with virtual synchronous generator control are interconnected, even when the power consumption of loads fluctuates or the generated power of energy creation devices fluctuates, a power excess/deficit can be allocated at the ratio equal to the ratio of power target value that each power conversion device is notified of.

BRIEF DESCRIPTION OF DRAWINGS

FIG. 42A is a diagram for explaining a problem when a power conversion device is controlled in accordance with the control parameters for virtual synchronous generator control generated in the first embodiment.

FIG. 43B is a diagram illustrating an example of the ΔF/ΔP characteristic generated by changing the slope of the reference ΔF/ΔP characteristic of a second power conversion device.

FIG. 45A is a diagram illustrating an example of the reference ΔF/ΔP characteristic and the ΔF/ΔP characteristic of a first power conversion device according to a second embodiment.

FIG. 50B is a diagram for explaining a method of creating a reference ΔF/ΔP characteristic and a ΔF/ΔP characteristic of a second power conversion device according to the third embodiment.

DESCRIPTION OF EMBODIMENTS

Figure 1:
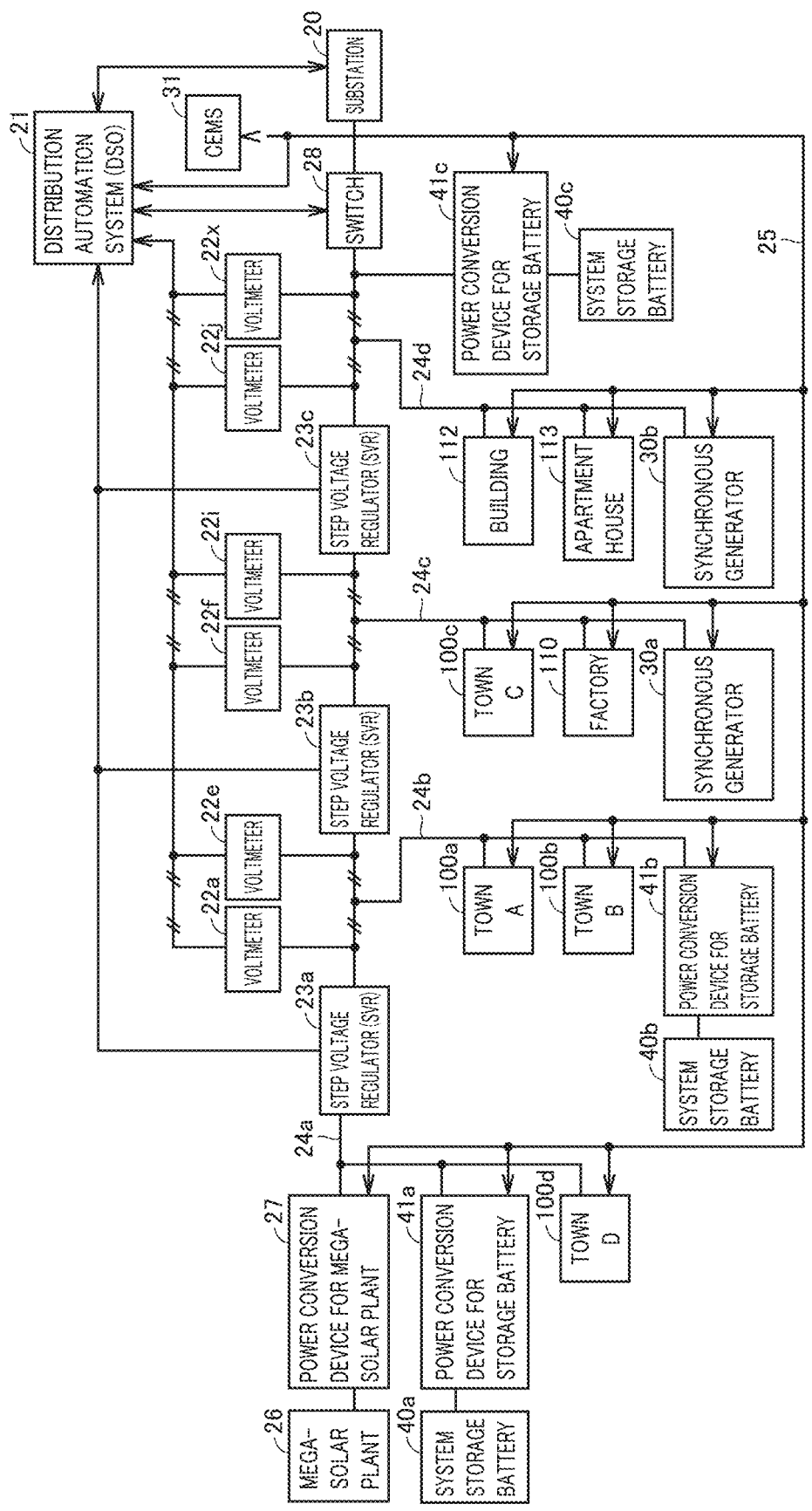
FIG. 1 is a block diagram illustrating a configuration example of a distribution system.

Embodiments of the present disclosure will be described in detail with reference to the drawings. In the following, like or corresponding parts in the drawings are denoted by like reference signs and a description thereof is basically not repeated.

First Embodiment (Configuration Example of Distribution System)

First of all, a configuration example of a distribution system to which a power conversion device according to a first embodiment is connected will now be described. Although a three-phase system is described by way of example in the first embodiment, the distribution system may be a single-phase system.

FIG. 1 is a block diagram illustrating a configuration example of a distribution system 24. As illustrated in FIG. 1, distribution system 24 receives power supply from a substation 20. A plurality of step voltage regulators (SVRs) 23a to 23c are provided in distribution system 24. A plurality of SVRs 23a to 23c are provided in series with respect to a power flow. A building 112, an apartment house 113, town A100a to town D100d, a factory 110, a power conversion device 27 for a mega-solar plant, power conversion devices 41a to 41c for system storage batteries, and synchronous generators 30a and 30b are connected to a plurality of SVRs 23a to 23c. In the following description, SVRs 23a to 23c may be collectively referred to as "SVR 23". Power conversion devices 41a to 41c may be collectively referred to as "power conversion device 41".

A plurality of voltmeters 22a, 22e, 22f, 22i, 22j, and 22x are disposed in distribution system 24. Hereinafter, voltmeters 22a, 22e, 22f, 22i, 22j, and 22x may be collectively referred to as "voltmeter 22". The measurement value of each voltmeter 22 is transmitted to a distribution automation system 21 (which hereinafter may be referred to as "DSO 21") at predetermined periods. DSO 21 corresponds to an example of "system management device" that manages distribution system 24.

Tap position information, and information on primary-side voltage and secondary-side voltage of SVR 23 are sent to DSO 21. In the first embodiment, SVR 23 gives notification of tap position information, and primary-side voltage and secondary-side voltage information at predetermined periods and gives notification of tap position information, and primary-side voltage and secondary-side voltage information on a non-regular basis at the time of tap change.

A community energy management system (CEMS) 31 collects information such as a variety of measurement values from consumers (towns 100a to 100d, factory 110, building 112, apartment house 113), power conversion device 27, synchronous generators 30*a* and 30*b*, and power conversion devices 41*a* to 41*c* at predetermined periods. CEMS 31 notifies DSO 21 of the collected data in response to a request from DSO 21. The power consumption of consumers and the generated power of energy creation devices in towns 100*a* to 100*d* are measured by smart meters (not shown) installed at the consumers. CEMS 31 collects the measurement values of smart meters at predetermined periods (for example, every 30 minutes). CEMS 31 corresponds to an example of "management device".

A mega-solar plant 26 is connected to power conversion device 27. System storage batteries 40*a* to 40*c* are respectively connected to power conversion devices 41*a* to 41*c*. Storage batteries 40*a* to 40*c* are large-capacity storage batteries that can be connected to distribution system 24. In the following description, storage batteries to 40*c* may be collectively referred to as "storage battery 40".

Figure 2:
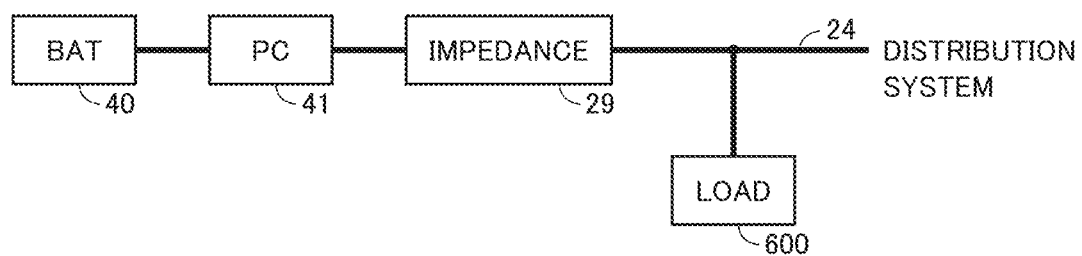
FIG. 2 is a block diagram for further explaining a configuration of the distribution system illustrated in FIG. 1.

FIG. 2 is a block diagram for further explaining a configuration of distribution system 24 illustrated in FIG. 1.

As illustrated in FIG. 2, a load 600, power conversion device 41, and storage battery 40 are connected to distribution system 24. For simplicity of explanation, in FIG. 2, impedance 29 of distribution system 24 is represented in a lumped parameter system. Impedance 29 of distribution system 24 is composed of a reactor component and a resistance component.

(1) CEMS 31

Figure 3:
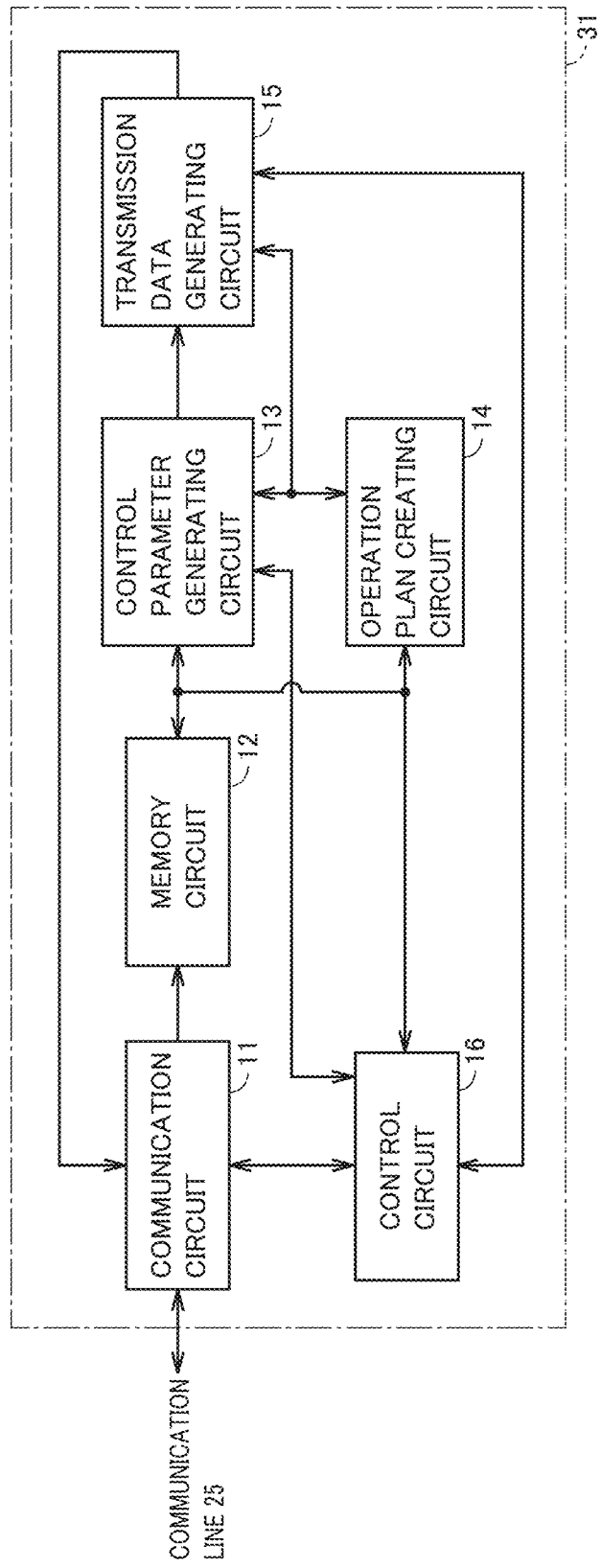
FIG. 3 is a block diagram illustrating a configuration of a CEMS illustrated in FIG. 1.

FIG. 3 is a block diagram illustrating a configuration of CEMS 31 illustrated in FIG. 1.

As illustrated in FIG. 3, CEMS 31 includes a communication circuit 11, a memory circuit 12, a control parameter generating circuit 13, an operation plan creating circuit 14, a transmission data generating circuit 15, and a control circuit 16.

Communication circuit 11 communicates with DSO 21, consumers (towns 100*a* to 100*d*, factory 110, building 112, apartment house 113), power conversion device 27, synchronous generators 30*a* and 30*b*, and power conversion devices 41*a* to 41*c* via a communication line 25.

Memory circuit 12 stores a variety of information acquired through communication circuit 11. The variety of information includes measurement results and status information of each distributed power source.

Control parameter generating circuit 13 generates control parameters of virtual synchronous generator control implemented in each of power conversion device 41*a* to 41*c*.

Operation plan creating circuit 14 creates operation plans of power conversion devices 41*a* to 41*c*, based on a control command from DSO 21. The operation plans of power conversion devices 41*a* to 41*c* include charge/discharge plans (power target values) of the corresponding storage batteries 40*a* to 40*c*. In the first embodiment, operation plan creating circuit 14 creates an operation plan for 24 hours, every 30 minutes.

Further, operation plan creating circuit 14 determines whether the operation plan needs to be revised, based on the measurement results of power conversion devices 41*a* to 41*c* collected in units of five minutes, SOC information of storage batteries 40*a* to 40*c*, and the like. If it is determined that the operation plan needs to be revised, operation plan creating circuit 14 revises the operation plan for a period until it is notified of a control command from DSO 21 next time.

Transmission data generating circuit 15 stores the control parameters of virtual synchronous generator control generated by control parameter generating circuit 13 and the operation plan output from operation plan creating circuit 14. Transmission data generating circuit 15 outputs the stored data to communication circuit 11, in response to a transmission command from control circuit 16. Communication circuit 11 transmits the data output from transmission data generating circuit 15 to communication line 25 in accordance with a control signal output from control circuit 16.

Control circuit 16 is a control circuit for managing a distributed power source connected to distribution system 24. Control circuit 16 manages the operation of communication circuit 11, memory circuit 12, control parameter generating circuit 13, operation plan creating circuit 14, and transmission data generating circuit 15.

(1-1) Operation Plan Creating Circuit 14

Figure 4:
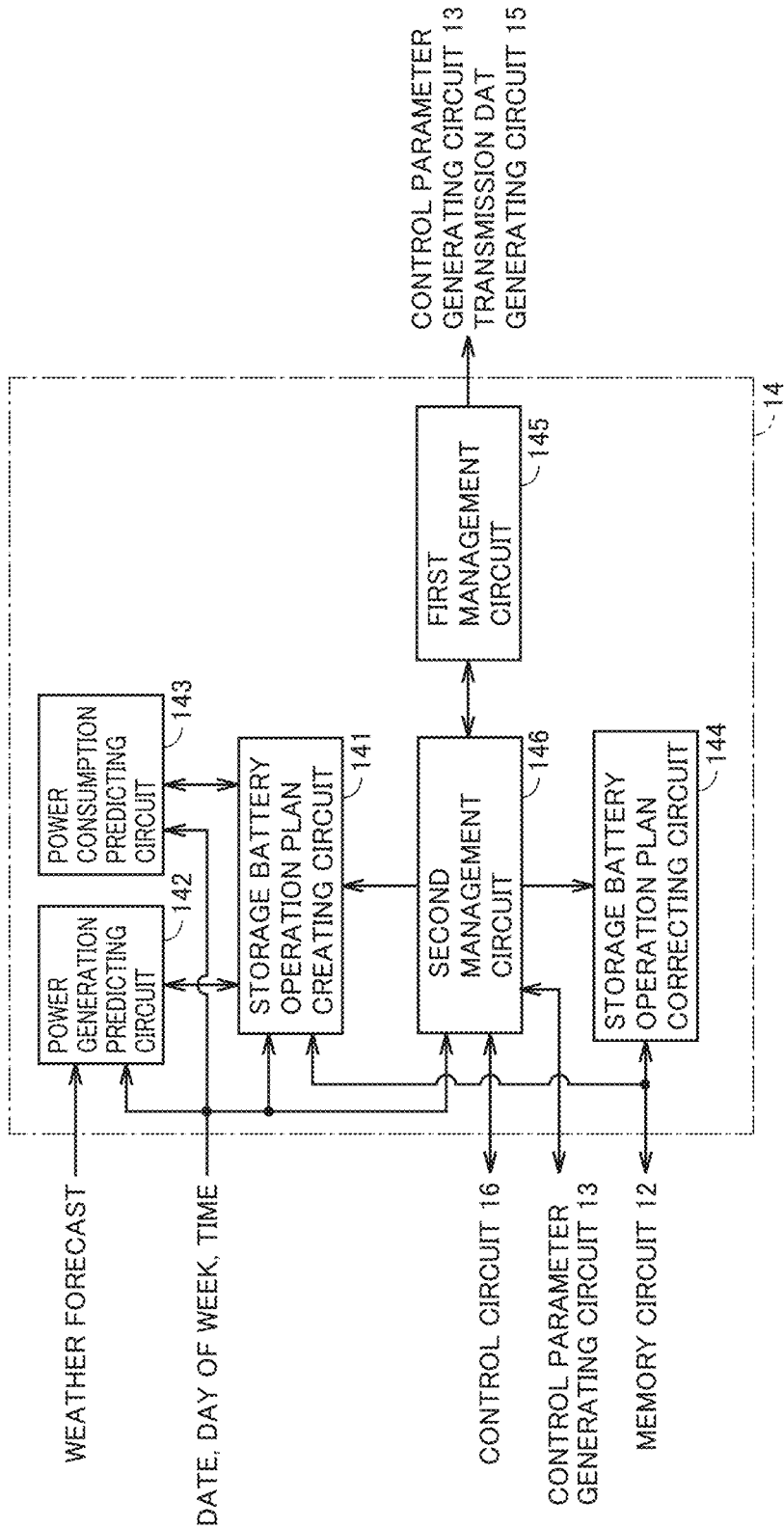
FIG. 4 is a block diagram illustrating a configuration of an operation plan creating circuit illustrated in FIG. 3.

FIG. 4 is a block diagram illustrating a configuration of operation plan creating circuit 14 illustrated in FIG. 3.

As illustrated in FIG. 4, operation plan creating circuit 14 includes a storage battery operation plan creating circuit 141, a power generation predicting circuit 142, a power consumption predicting circuit 143, a storage battery operation plan correcting circuit 144, a first management circuit 145, and a second management circuit 146.

Storage battery operation plan creating circuit 141 creates operation plans (power target values) of power conversion devices 41*a*, 41*b*, and 41*c*, based on information on a control command given from DSO 21, a prediction result of the amount of power generation of mega-solar plant 26 predicted by power generation predicting circuit 142, and information on a prediction result of power consumption of consumers predicted by power consumption predicting circuit 143. The control command that storage battery operation plan creating circuit 141 is notified of from DSO 21 includes a plan value of power consumed downstream of substation 20 (supply power to distribution system 24). The plan value of supply power is formed from plan values for 24 hours every 30 minutes.

Power generation predicting circuit 142 acquires weather forecast information for 24 hours from a not-shown weather forecast server through communication circuit 11. Power generation predicting circuit 142 predicts the generated power of mega-solar plant 26, based on the acquired weather forecast information and information of a database (not shown) prepared for predicting power generation.

Power consumption predicting circuit 143 predicts the total value of power consumption of each consumer, based on clock information inside CEMS 31 (year, month, date, day of week, time) and information of a database (not shown) prepared for predicting power consumption.

Storage battery operation plan correcting circuit 144 determines whether an operation plan needs to be revised, based on the amount of charge/discharge power of power conversion devices 41*a* to 41*c* and power target value information, through communication circuit 11. If it is determined a revision is needed, storage battery operation plan correcting circuit 144 generates a revision value of the operation plan.

First management circuit 145 manages creation of operation plans of distributed power sources connected to distribution system 24. First management circuit 145 stores the power target value (charge power target value and discharge power target value) of each storage battery 40 generated by storage battery operation plan creating circuit 141 and storage battery operation plan correcting circuit 144. First management circuit 145 outputs the power target value to control parameter generating circuit 13 and transmission data generating circuit 15, based on a control signal output from second management circuit 146.

Second management circuit 146 manages the operation of storage battery operation plan creating circuit 141, power generation predicting circuit 142, power consumption predicting circuit 143, storage battery operation plan correcting circuit 144, and first management circuit 145.

(1-2) Control Parameter Generating Circuit 13

Figure 5:
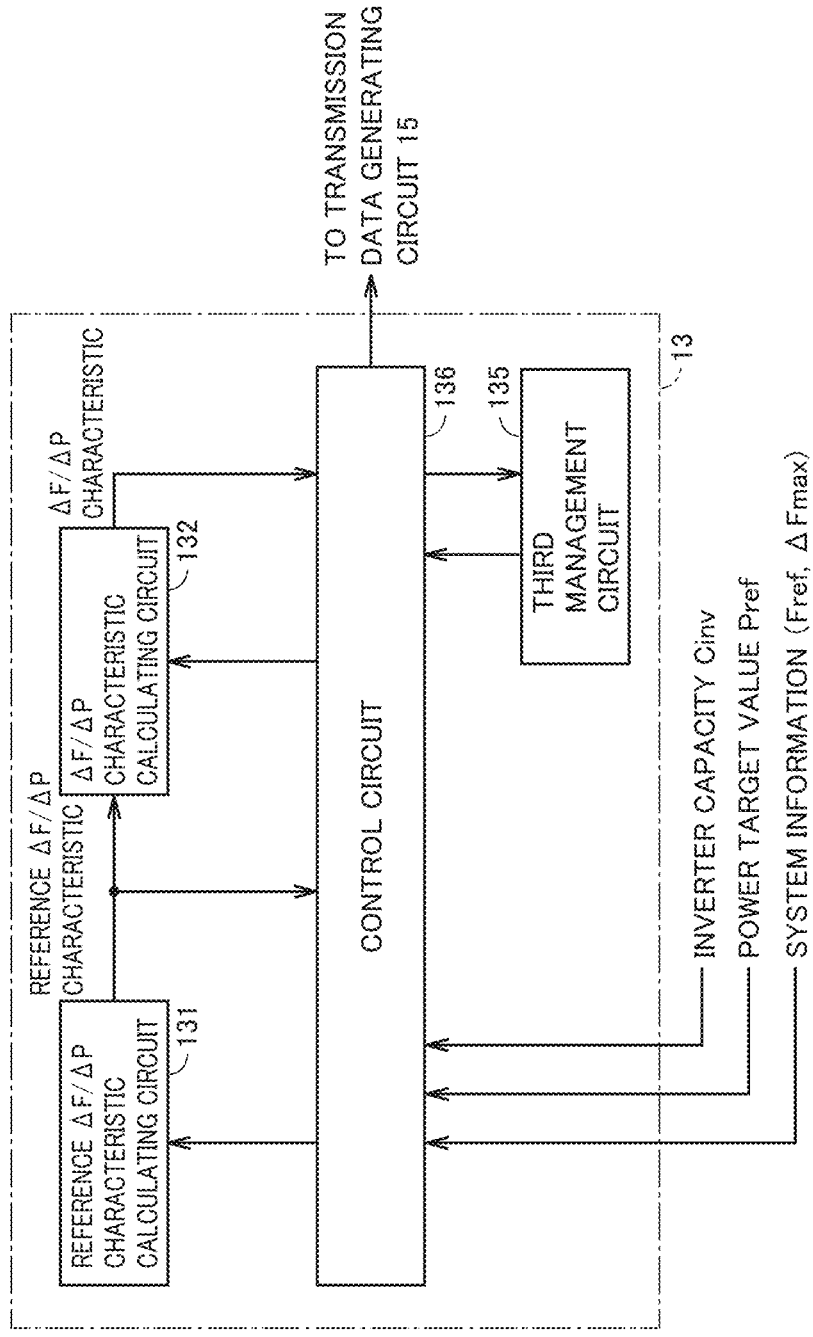
FIG. 5 is a block diagram illustrating a configuration of a control parameter generating circuit illustrated in FIG. 3.

FIG. 5 is a block diagram illustrating a configuration of control parameter generating circuit 13 illustrated in FIG. 3.

As illustrated in FIG. 5, control parameter generating circuit 13 includes a reference ΔF/ΔP characteristic calculating circuit 131, a ΔF/ΔP characteristic calculating circuit 132, a third management circuit 135, and a control circuit 136.

Reference ΔF/ΔP characteristic calculating circuit 131 calculates a reference ΔF/ΔP characteristic, based on the capacity information of static inverters (second DC/AC converter 408) of power conversion devices 41a to 41c.

ΔF/ΔP characteristic calculating circuit 132 calculates a ΔF/ΔP characteristic, based on the reference ΔF/ΔP characteristic and power target value information created by operation plan creating circuit 14 (FIG. 4).

Third management circuit 135 manages control parameters of synchronous generator control. Third management circuit 135 stores information such as the ΔF/ΔP characteristic calculated by ΔF/ΔP characteristic calculating circuit 132 and a power target value Pref into a not-shown memory and manages the information.

Control circuit 136 manages the operation of reference ΔF/ΔP characteristic calculating circuit 131, ΔF/ΔP characteristic calculating circuit 132, and third management circuit 135.

(2) Power Conversion Device 27

Figure 6:
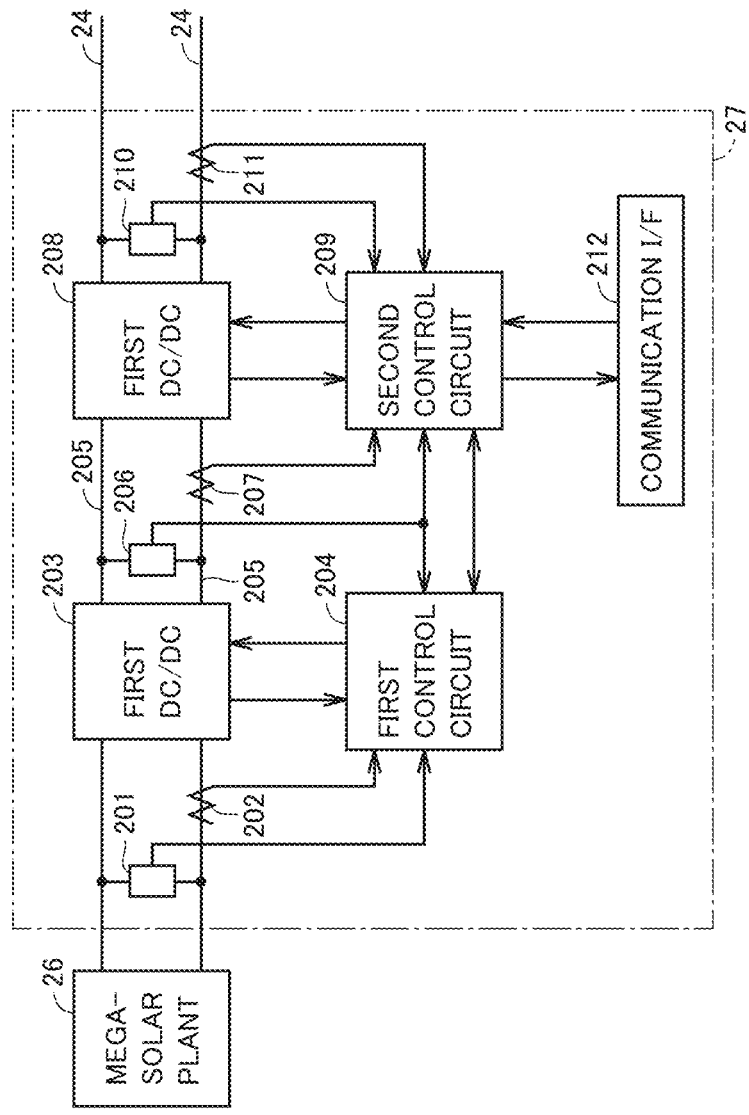
FIG. 6 is a block diagram illustrating a configuration of a power conversion device for a mega-solar plant illustrated in FIG. 1.

FIG. 6 is a block diagram illustrating a configuration of power conversion device 27 illustrated in FIG. 1.

As illustrated in FIG. 6, power conversion device 27 includes voltmeters 201, 206, and 210, ammeters 202, 207, and 211, a first DC/DC converter 203, a first control circuit 204, a DC bus 205, a first DC/AC converter 208, a second control circuit 209, and a communication interface (I/F) 212.

Voltmeter 201 measures a DC voltage output from mega-solar plant 26. Ammeter 202 measures a DC current output from mega-solar plant 26.

First DC/DC converter 203 converts a first DC voltage output from mega-solar plant 26 into a second DC voltage. First control circuit 204 controls first DC/DC converter 203.

DC bus 205 supplies a second DC voltage output from first DC/DC converter 203 to first DC/AC converter 208. Voltmeter 206 measures a voltage on DC bus 205. Ammeter 207 measures a DC current output from first DC/DC converter 203.

First DC/AC converter 208 converts a DC power output from first DC/DC converter 203 into an AC power. Second control circuit 209 controls first DC/AC converter 208.

Voltmeter 210 measures an AC voltage output from first DC/AC converter 208. Ammeter 211 measures an AC current output from first DC/AC converter 208. Communication I/F 212 performs communication between power conversion device 27 and CEMS 31.

(3) Power Conversion Device 41

Figure 7:
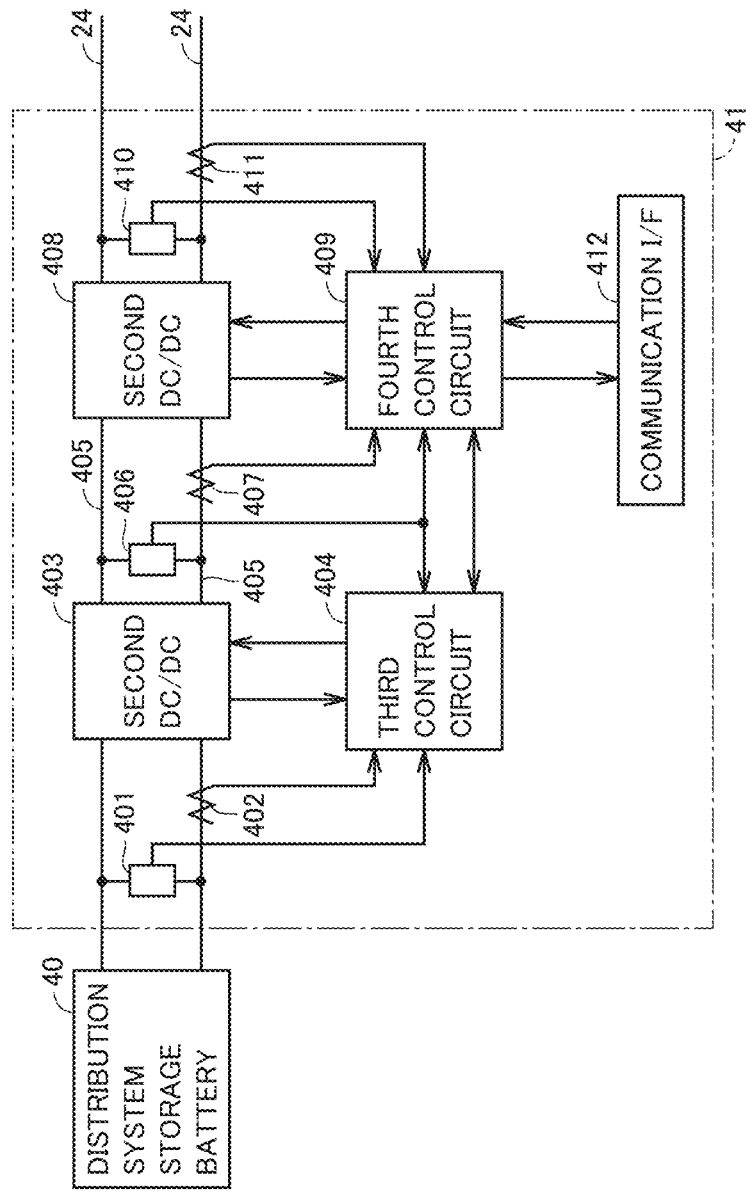
FIG. 7 is a block diagram illustrating a configuration of a power conversion device for a storage battery illustrated in FIG. 1.

FIG. 7 is a block diagram illustrating a configuration of power conversion device 41 illustrated in FIG. 1.

As illustrated in FIG. 7, power conversion device 41 includes voltmeters 401, 406, and 410, ammeters 402, 407, and 411, a second DC/DC converter 403, a third control circuit 404, a DC bus 405, a second DC/AC converter 408, a fourth control circuit 409, and a communication I/F 412.

Voltmeter 401 measures a DC voltage output from storage battery 40. Ammeter 402 measures a DC current output from storage battery 40.

Second DC/DC converter 403 converts a third DC voltage output from storage battery 40 into a fourth DC voltage. Third control circuit 404 controls second DC/DC converter 403.

DC bus 405 supplies a DC voltage output from second DC/DC converter 403 to second DC/AC converter 408. Voltmeter 406 measures a voltage on DC bus 405. Ammeter 407 measures a DC current output from second DC/DC converter 403. Second DC/AC converter 408 converts a DC power output from second DC/DC converter 403 into an AC power. Fourth control circuit 409 controls second DC/AC converter 408.

Voltmeter 410 measures an AC voltage output from second DC/AC converter 408. Ammeter 411 measures an AC current output from second DC/AC converter 408. Communication I/F 412 performs communication between power conversion device 41 and CEMS 31.

Known DC/DC converters can be used as appropriate for first DC/DC converter 203 (FIG. 6) and second DC/DC converter 403 (FIG. 7). Known inverters can be used for first DC/AC converter 208 (FIG. 6) and second DC/AC converter 408 (FIG. 7). First DC/AC converter 208 and second DC/AC converter 408 each correspond to an example of "static inverter". Second control circuit 209 and fourth control circuit 409 correspond to an example of "control circuit".

(2-1) First Control Circuit 204

Figure 8:
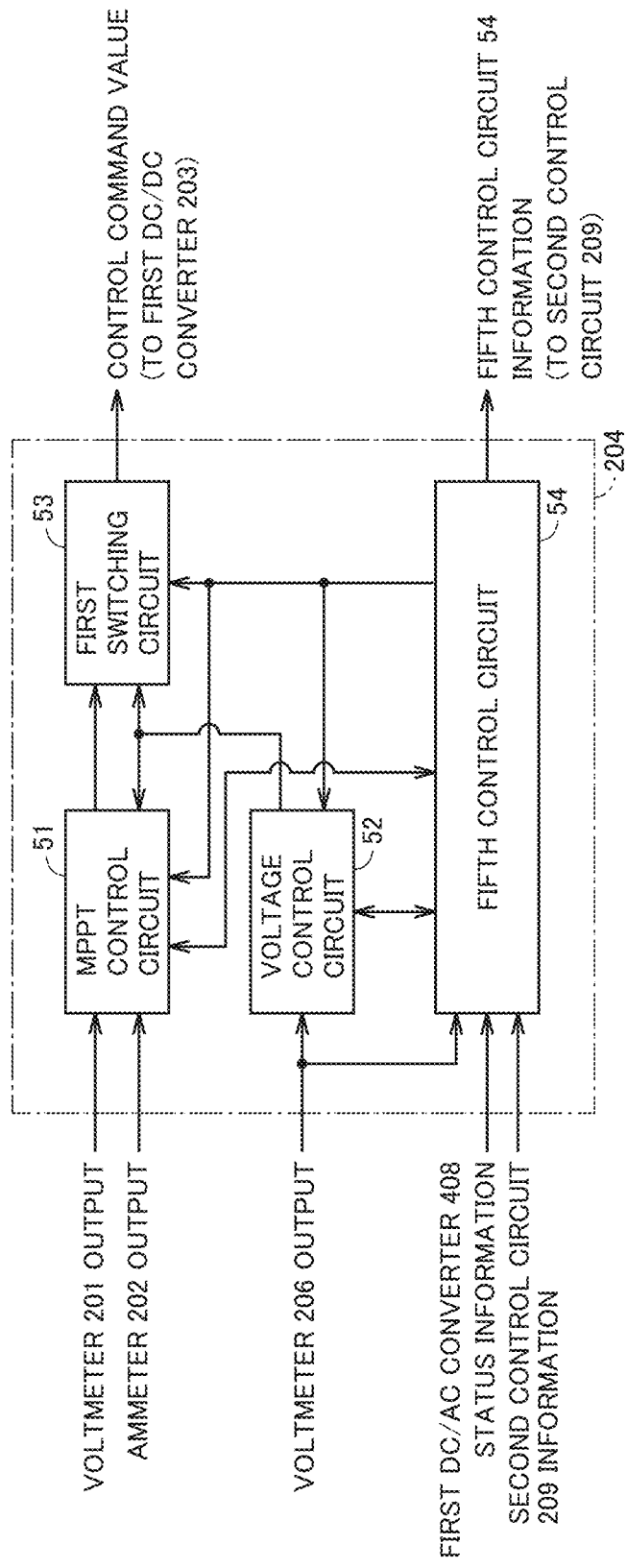
FIG. 8 is a block diagram illustrating a configuration of a first control circuit illustrated in FIG. 6.

FIG. 8 is a block diagram illustrating a configuration of first control circuit 204 illustrated in FIG. 6.

As illustrated in FIG. 8, first control circuit 204 includes a maximum power point tracking (MPPT) control circuit 51, a voltage control circuit 52, a first switching circuit 53, and a fifth control circuit 54.

MPPT control circuit 51 executes maximum power point tracking (MPPT) control, based on measurement values of voltmeter 201 and ammeter 202. MPPT control circuit 51 searches for the maximum power point of mega-solar plant 26 in order to extract the generated power of mega-solar plant 26 to the maximum. Specifically, MPPT control circuit 51 generates a control command value of first DC/DC converter 203 in order to control the DC voltage measured by voltmeter 201 to a voltage corresponding to the maximum power point.

Voltage control circuit 52 generates a control command value of first DC/DC converter 203 for maintaining the DC voltage (second DC voltage) on DC bus 205 at a predetermined target voltage, based on the measurement value of voltmeter 206.

Fifth control circuit 54 outputs a control parameter and a control target value of MPPT control circuit 51 and voltage control circuit 52 and manages a power generation state of mega-solar plant 26. Fifth control circuit 54 further outputs a control signal of first switching circuit 53.

First switching circuit 53 selectively outputs one of the outputs of MPPT control circuit 51 and voltage control circuit 52 as a control command value of first DC/DC converter 203, in accordance with a control signal from fifth control circuit 54.

First DC/DC converter 203 is controlled in a MPPT mode or a voltage control mode. In the MPPT mode, first switching circuit 53 outputs a control command value generated by MPPT control circuit 51. In the voltage control mode, first switching circuit 53 outputs a control command value generated by voltage control circuit 52.

(2-2) Second Control Circuit 209

Figure 9:
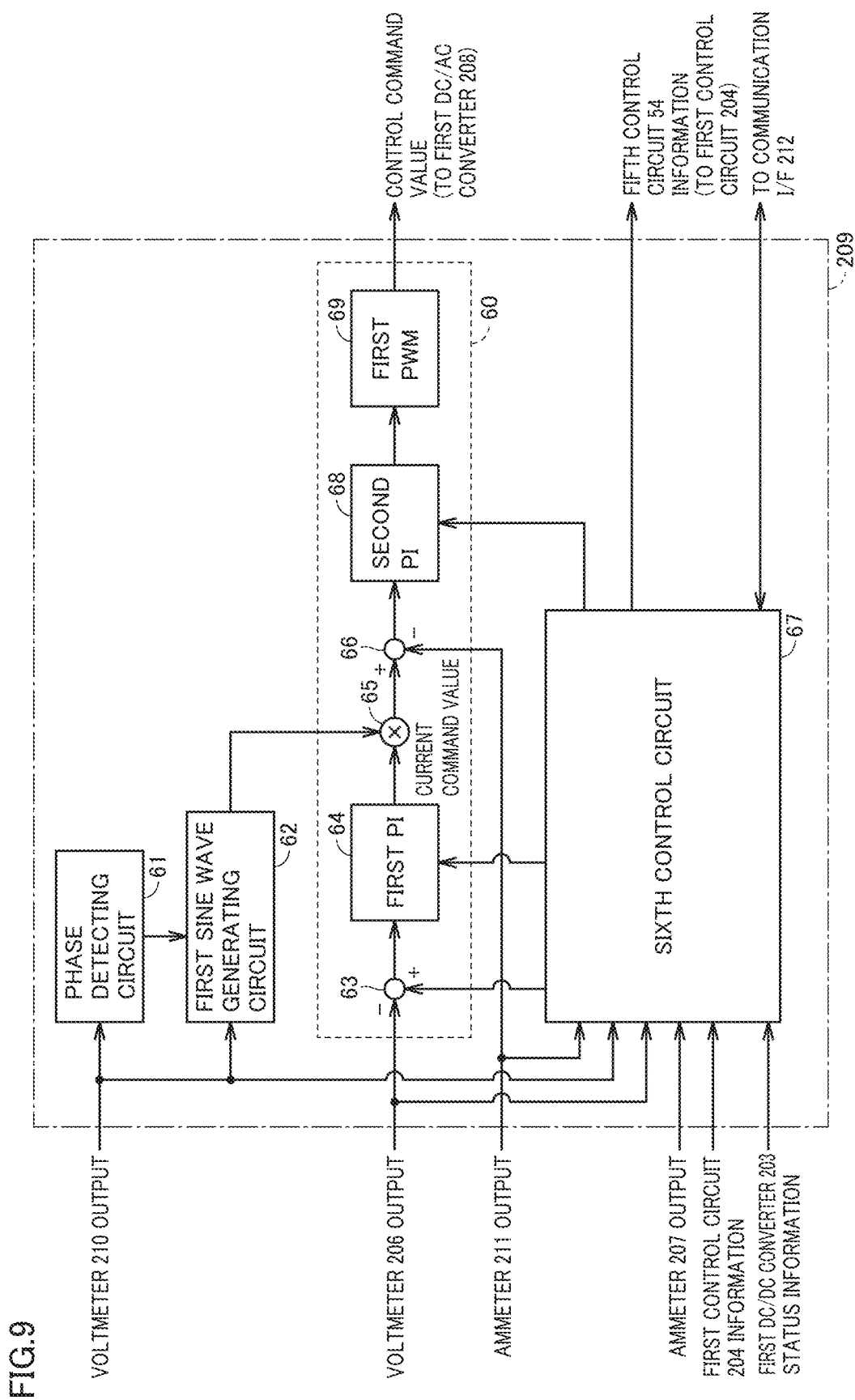
FIG. 9 is a block diagram illustrating a configuration of a second control circuit illustrated in FIG. 6.

FIG. 9 is a block diagram illustrating a configuration of second control circuit 209 illustrated in FIG. 6.

As illustrated in FIG. 9, second control circuit 209 includes a phase detecting circuit 61, a first sine wave generating circuit 62, a current control circuit 60, and a sixth control circuit 67.

Current control circuit 60 includes a subtractor 63, a first PI control circuit 64, a multiplier 65, a subtractor 66, a second PI control circuit 68, and a first PWM converter 69. Current control circuit 60 executes a control mode in which power is output in synchronization with a system voltage. This control mode is a common control method for power converters for photovoltaic power generation installed in households.

Phase detecting circuit 61 detects a phase of AC voltage from the waveform of AC voltage measured by voltmeter 210 (FIG. 6).

First sine wave generating circuit 62 generates a sine wave synchronized with the waveform of AC voltage, based on the amplitude of AC voltage measured by voltmeter 210 and phase information detected by phase detecting circuit 61. In the first embodiment, phase detecting circuit 61 detects a zero cross point of the waveform of AC voltage and detects the frequency of AC voltage from the detection result of a zero cross point. Phase detecting circuit 61 outputs the detected frequency of AC voltage together with the zero cross point information to first sine wave generating circuit 62.

Current control circuit 60 generates a control command value for controlling first DC/DC converter 203, based on the DC voltage on DC bus 205 measured by voltmeter 206 (FIG. 6). Subtractor 63 subtracts the DC voltage on DC bus 205 measured by voltmeter 206 from a target value of DC bus voltage output from sixth control circuit 67. The subtraction value of subtractor 63 is input to first PI control circuit 64.

Multiplier 65 generates a current command value by multiplying a control command value output from first PI control circuit 64 by a sine wave output from first sine wave generating circuit 62.

Subtractor 66 calculates a deviation between a current command value output from multiplier 65 and a current value of an AC system measured by ammeter 211 (FIG. 6) and outputs the calculated deviation to second PI control circuit 68.

Second PI control circuit 68 generates a control command value such that the deviation output from subtractor 66 becomes zero, based on control parameters (proportional gain and integral time) applied from sixth control circuit 67. Second PI control circuit 68 outputs the generated control command value to first PWM converter 69.

First PWM converter 69 generates a control command value by executing PWM control on a control command value input from second PI control circuit 68 and outputs the generated control command value to first DC/AC converter 208.

Sixth control circuit 67 collects the measurement results concerning DC bus 205 output from voltmeter 206 and ammeter 207, the measurement results concerning an AC system output from voltmeter 210 and ammeter 211, and status information of first DC/DC converter 203 output from first control circuit 204, and notifies CEMS 31 and the like of the collected information through communication I/F 212.

Further, sixth control circuit 67 notifies first PI control circuit 64 and second PI control circuit 68 of a control parameter. Sixth control circuit 67 notifies CEMS 31 of information on active power and reactive power measured by an effective voltage measuring unit (not shown) of the AC system, through communication I/F 212. Sixth control circuit 67 notifies fifth control circuit 54 of the measurement values such as effective voltage and active power of the AC system. For example, when the effective value of the system voltage exceeds a prescribed value, fifth control circuit 54 suppresses increase of the system voltage by switching the control of mega-solar plant 26 from MPPT control to voltage control.

(3-1) Third Control Circuit 404

Figure 10:
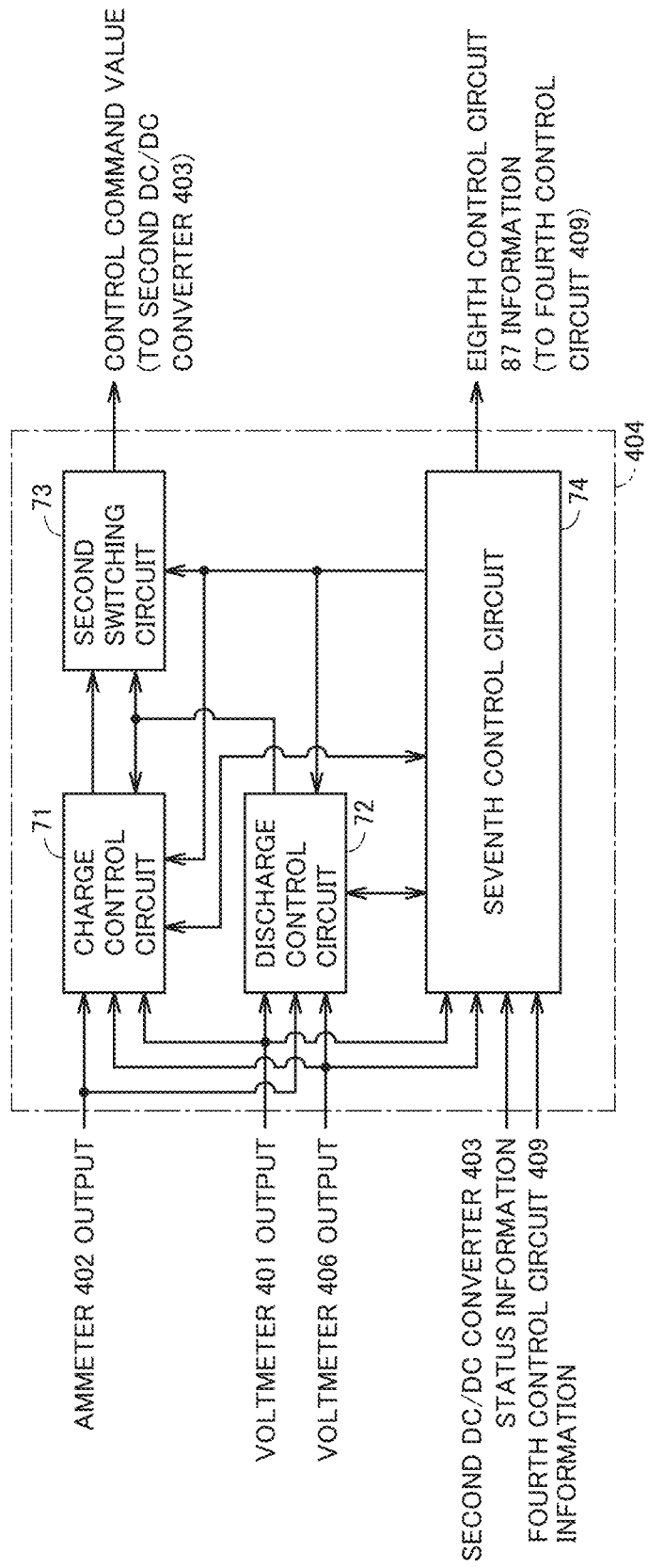
FIG. 10 is a block diagram illustrating a configuration of a third control circuit illustrated in FIG. 7.

FIG. 10 is a block diagram illustrating a configuration of third control circuit 404 illustrated in FIG. 7.

As illustrated in FIG. 10, third control circuit 404 includes a charge control circuit 71, a discharge control circuit 72, a second switching circuit 73, and a seventh control circuit 74.

Charge control circuit 71 generates a control command value of second DC/DC converter 403 when charge control of storage battery 40 is performed.

Discharge control circuit 72 generates a control command value of second DC/DC converter 403 when discharge control of storage battery 40 is performed.

Seventh control circuit 74 outputs a control parameter, a control target value, and the like to charge control circuit 71 and discharge control circuit 72. Seventh control circuit 74 manages the state of charge (SOC), charge power (charge current), discharge power (discharge current), and the like of storage battery 40. Seventh control circuit 74 outputs a control signal of second switching circuit 73.

Second switching circuit 73 selectively outputs one of the outputs of charge control circuit 71 and discharge control circuit 72 as a control command value of second DC/DC converter 403, in accordance with a control signal from seventh control circuit 74. Specifically, second switching circuit 73 outputs a control command value generated by charge control circuit 71 when charge of storage battery 40 is specified. On the other hand, second switching circuit 73 outputs a control command value generated by discharge control circuit 72 when discharge of storage battery 40 is specified.

(3-2) Fourth Control Circuit 409

Figure 11:
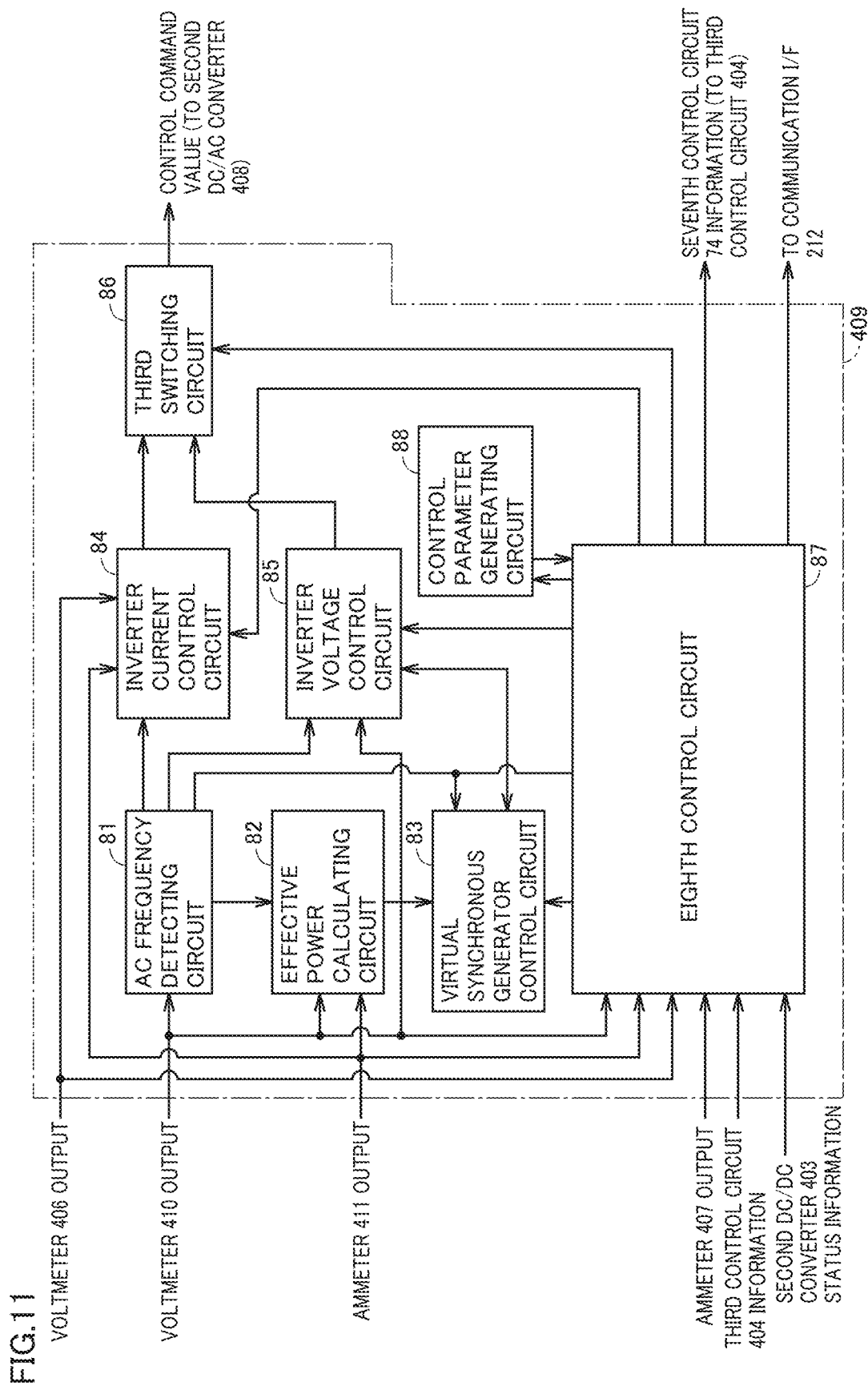
FIG. 11 is a block diagram illustrating a configuration of a fourth control circuit illustrated in FIG. 7.

FIG. 11 is a block diagram illustrating a configuration of fourth control circuit 409 illustrated in FIG. 7.

As illustrated in FIG. 11, fourth control circuit 409 includes an AC frequency detecting circuit 81, an effective power calculating circuit 82, a virtual synchronous generator control circuit 83, an inverter current control circuit 84, an inverter voltage control circuit 85, a third switching circuit 86, an eighth control circuit 87, and a control parameter generating circuit 88.

AC frequency detecting circuit 81 detects a phase of AC voltage from the waveform of AC voltage measured by voltmeter 410 (FIG. 7). In the first embodiment, a zero cross point is detected from the waveform of AC voltage, and the frequency is detected from the time intervals of the detected zero cross points. The method of detecting the frequency of AC voltage is not limited to the method using the detection results of zero cross points.

Effective power calculating circuit 82 calculates an effective power using information on AC voltage and AC current measured by voltmeter 410 and ammeter 411 (FIG. 7). In the first embodiment, an effective power is calculated by integrating the power of one cycle of the AC voltage waveform, based on zero cross point detection information and AC frequency information output from AC frequency detecting circuit 81. The method of calculating an effective power is not limited to the method above, and for example, an effective power may be calculated using DQ transformation when the AC system is three-phase alternating current.

Virtual synchronous generator control circuit 83 imparts inertial force, synchronization force, and damping force of a synchronous generator to second DC/AC converter 408 (static inverter), based on the frequency information of AC voltage output from AC frequency detecting circuit 81 and the AC effective power information output from effective power calculating circuit 82.

[Virtual Synchronous Generator Control Technology]

Virtual synchronous generator control technology will be described briefly below.

A synchronous generator typically used for thermal power generation has a function of adjusting an output power in accordance with a frequency (governor function), a function of maintaining an angular velocity (inertial force), a function of synchronizing with a system voltage (synchronization force), a function of regulating voltage of a bulk system (AVR function: automatic voltage regulation function), and a function of continuing operation even at a momentary drop of AC system voltage in a system fault.

Virtual synchronous generator control technology allows a static inverter to mimic the functions of a synchronous generator by controlling a transient response of the static inverter. Specifically, three functions, namely, the governor function, the function of mimicking a mass system model (dynamic characteristic of a rotating machine) based on a swing equation, and the AVR function are mimicked.

Figure 54:
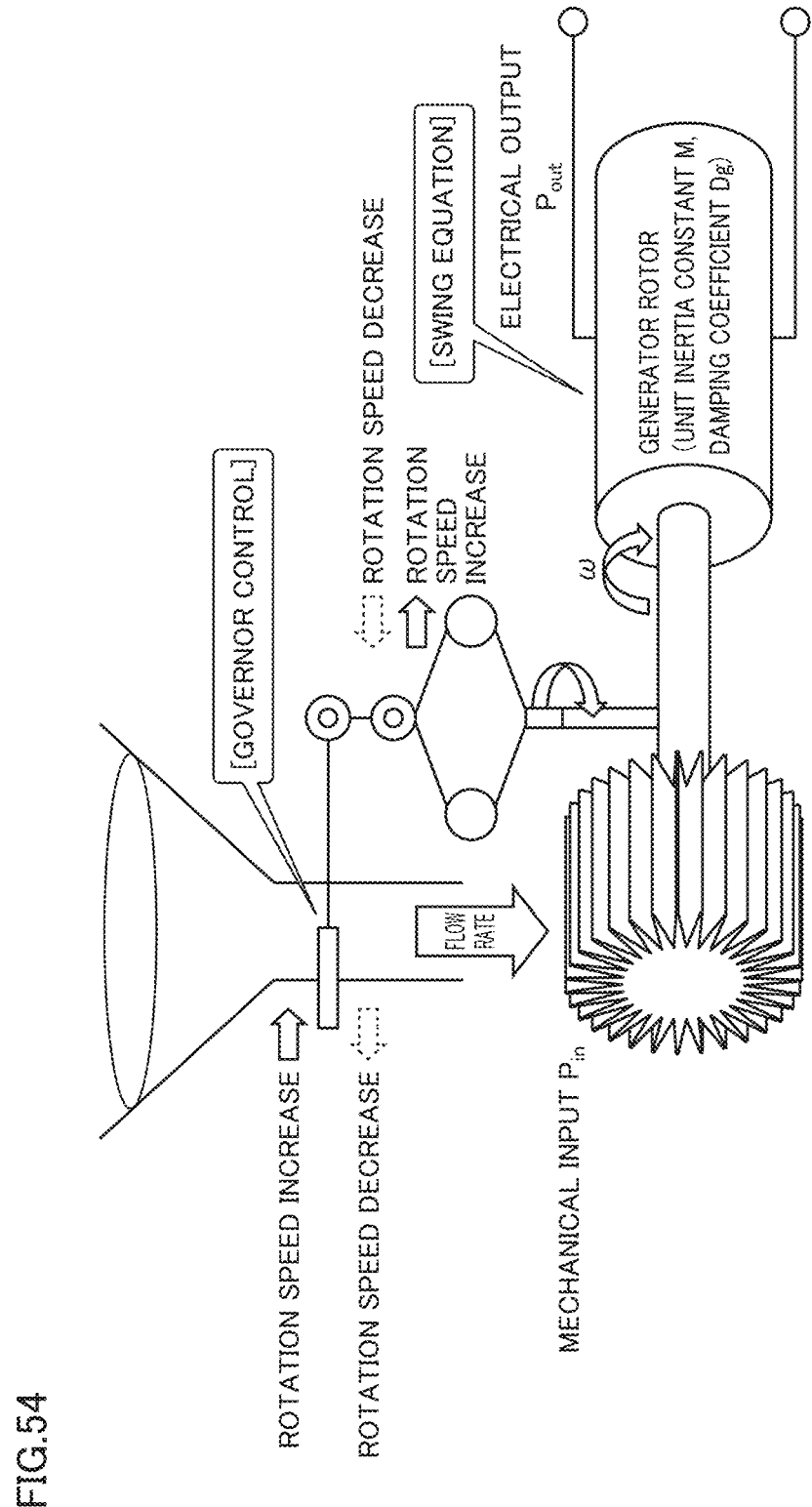
FIG. 54 is a diagram for explaining the concept of virtual synchronous generator control technology.

In the first embodiment, in particular, a case where the governor function and the function of mimicking a mass system model based on a swing equation are implemented in second DC/AC converter 408 will be described. FIG. 54 is a conceptual diagram for explaining the virtual synchronous generator control technology. The AVR function of synchronous generators is the function controlled based on an output voltage command or a reactive power command value given from a higher-level system (in the first embodiment, CEMS 31) and therefore is not implemented in the first embodiment. Hereinafter, the governor function and the function of mimicking a mass system model based on a swing equation will be specifically described.

First, the governor function will be described.

The governor in a power generation plant has the function of controlling an output power of a generator by controlling an output of a gas turbine or a steam turbine in thermal power generation and nuclear power generation or guide vanes of a waterwheel in hydropower generation. When a demand power exceeds a supply power in an AC power system, the frequency of the system voltage decreases. In a thermal power generator or a hydropower generator capable of output control, the droop characteristics are imparted to the governor so that the generator is controlled to increase power generation when the frequency of the system voltage decreases. On the other hand, the generator is controlled to reduce power generation when the supply power exceeds the demand power and thus the frequency of the system voltage increases.

FIG. 54 is a diagram schematically depicting the governor function. As illustrated in FIG. 54, when the angular velocity ω of the synchronous generator increases, the valve for adjusting energy inflow moves to the right side whereby energy supplied to the synchronous generator decreases. On the other hand, when the angular velocity ω of the synchronous generator decreases, the valve moves to the left side whereby energy supplied to the synchronous generator increases. Thus, the energy output from the synchronous generator can be controlled independently by the frequency (that is, the angular velocity ω of the synchronous generator) of local system voltage. Even when the operation above is performed by each individual synchronous generator, the load can be shared among a plurality of synchronous generators as the operation is managed based on the frequency of the system voltage. As the governor, for example, a model configured with a first-order lag system is provided as a standard model by the Institute of Electrical Engineers of Japan.

In the first embodiment, the operation in a case where the governor is approximated by the above model configured with a first-order lag system as represented by the following expression (1) will be described.

$$-1/\{Kgd \times (1+s \times Tg)\} \qquad (1)$$

In the expression (1), $-1/Kgd$ is a proportional gain of the governor (Kgd: speed adjustment rate), and Tg is a time constant of the first-order lag system (Tg: governor time constant).

Next, the function of mimicking a mass system model based on a swing equation will be described.

As illustrated in FIG. 54, the synchronous generator has a rotor having a unit inertia constant M. For example, when the generated power of mega-solar plant 26 abruptly decreases due to sudden change in solar radiation, the above governor control is unable to instantaneously make up the power shortage. The synchronous generator converts rotation energy accumulated in the rotor into electric power and outputs the power to an AC system. In doing so, if the angular velocity (rotation speed) of the rotor decreases, the energy supplied by the governor control increases, whereby the demand power and the supply power are balanced. The following expression (2) is the swing equation that mimics a mass system model (generator rotor). In the swing equation, energy P is divided by angular velocity ω and converted into torque T.

$$Tin - Tout = M \times d\omega/dt + Dg \times \omega \qquad (2)$$

Dg is a damping coefficient and M is an inertia constant.

In the first embodiment, a case where expression (1) and expression (2) are incorporated into the control of the static inverter (second DC/AC converter 408) to mimic the inertial force, the synchronization force, and the damping force of the synchronous generator will be described.

Returning to FIG. 11, inverter current control circuit 84 generates a control command value for controlling current of second DC/AC converter 408. Inverter current control circuit 84 differs from current control circuit 60 illustrated FIG. 9 only in control parameters, and the circuit configuration and operation is the same and will not be further elaborated.

Inverter voltage control circuit 85 generates a control command value for controlling voltage of second DC/AC converter 408.

Third switching circuit 86 switches a control command value from inverter current control circuit 84 and a control command value from inverter voltage control circuit 85, based on an output of eighth control circuit 87.

Eighth control circuit 87 collects the measurement results concerning DC bus 405 by voltmeter 406 and ammeter 407 and status information of second DC/DC converter 403 output from third control circuit 404, and notifies CEMS 31 and the like of the collected information, through communication I/F 412.

Eighth control circuit 87 also gives notification of a control parameter of each of virtual synchronous generator control circuit 83, inverter current control circuit 84, and inverter voltage control circuit 85.

Further, eighth control circuit 87 notifies CEMS 31 of information on an effective voltage of the AC system measured by a not-illustrated effective voltage measuring unit of the AC system or an active power and a reactive power measured by a not-illustrated active/reactive power measuring unit of the AC system, through communication I/F 412. Eighth control circuit 87 notifies seventh control circuit 74 of the measurement results of effective voltage, active power, and the like of the AC system.

(3-2-1) AC Frequency Detecting Circuit 81

Figure 12:
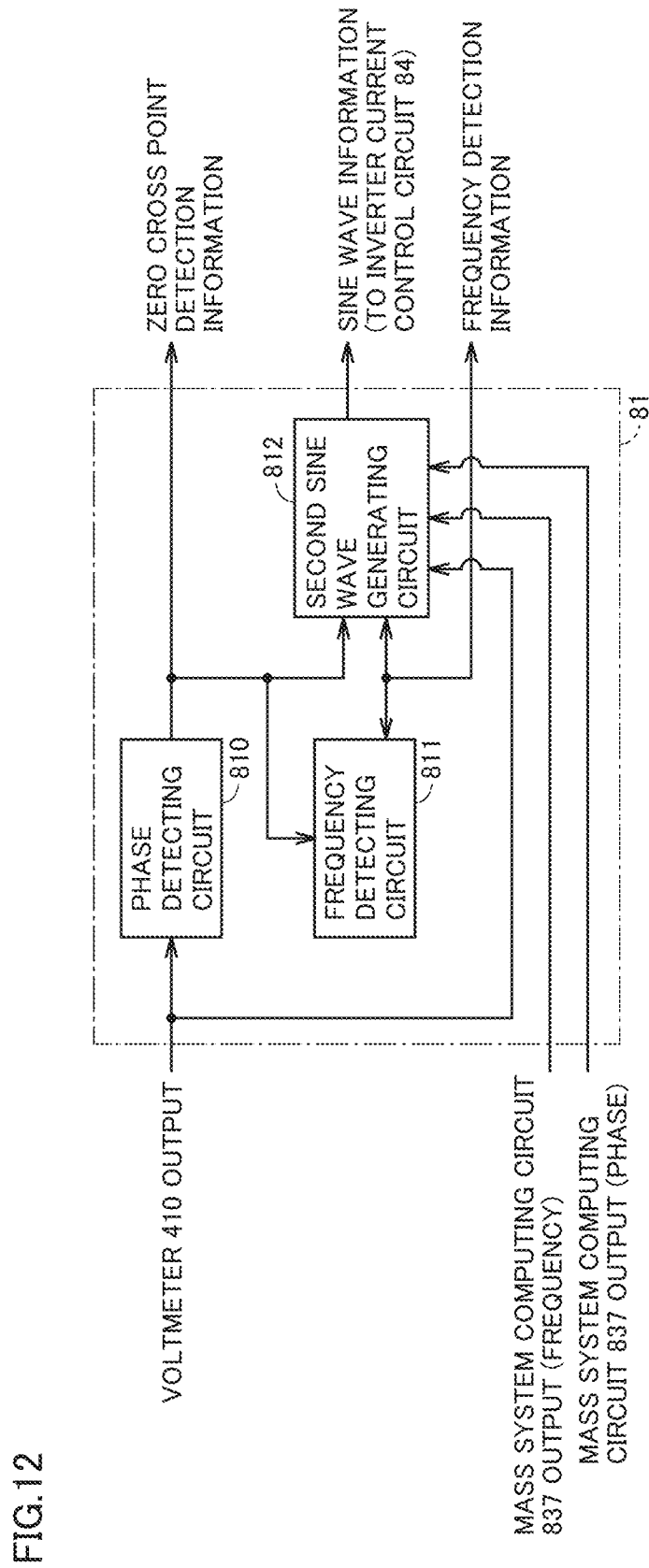
FIG. 12 is a block diagram illustrating a configuration of an AC frequency detecting circuit illustrated in FIG. 11.

FIG. 12 is a block diagram illustrating a configuration of AC frequency detecting circuit 81 illustrated in FIG. 11.

As illustrated in FIG. 12, AC frequency detecting circuit 81 includes a phase detecting circuit 810, a frequency detecting circuit 811, and a second sine wave generating circuit 812.

Phase detecting circuit 810 detects a zero cross point from the waveform of the system voltage output from voltmeter 410. The phase detection method in phase detecting circuit 810 is not limited to detection of a zero cross point. In detection of a zero cross point in an actual device, an error occurs due to a zero cross point detection error in voltmeter 410 (mainly offset error), an amplitude detection error in voltmeter 410 (mainly linearity error), an error in sampling periods when the system voltage waveform is sampled, and the like. The error in sampling periods may occur due to variations in time from carrier interruption to actual sampling when sampling is performed using a microcomputer or the like.

Frequency detecting circuit 811 detects a system frequency from the periods of zero cross points output from phase detecting circuit 810. The method of detecting a system frequency is not limited to the method in which a system frequency is detected from the periods of zero cross points.

Second sine wave generating circuit 812 generates a sine wave synchronized with system voltage, based on the detection result of zero cross point in phase detecting circuit 810, the detection result of frequency in frequency detecting circuit 811, and the amplitude of system voltage output from CEMS 31. AC frequency detecting circuit 81 outputs the detection result of zero cross point (detection time of zero cross point), the detection result of frequency, and the sine wave information.

(3-2-2) Inverter Voltage Control Circuit 85

Figure 13:
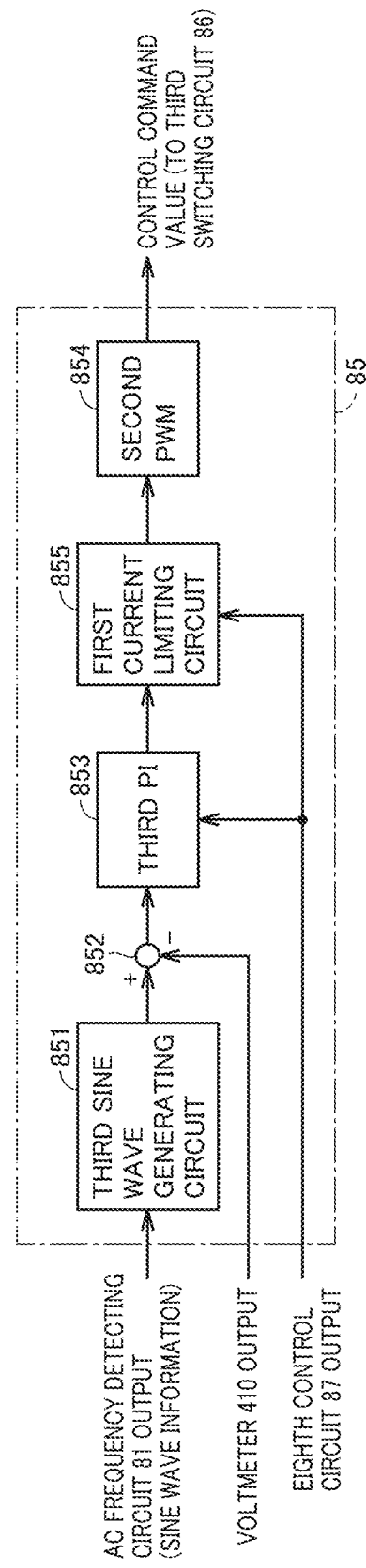
FIG. 13 is a block diagram illustrating a configuration of an inverter voltage control circuit illustrated in FIG. 11.

FIG. 13 is a block diagram illustrating a configuration of inverter voltage control circuit 85 illustrated in FIG. 11.

As illustrated in FIG. 13, inverter voltage control circuit 85 includes a third sine wave generating circuit 851, a subtractor 852, a third PI control circuit 853, a first current limiting circuit 855, and a second PWM converter 854.

Inverter voltage control circuit 85 generates a control command value for controlling second DC/AC converter 408, based on information on frequency and phase output from virtual synchronous generator control circuit 83 (FIG. 11) and amplitude information of system voltage output from eighth control circuit 87 (FIG. 11). The amplitude information of system voltage from eighth control circuit 87 is input to inverter voltage control circuit 85 via second sine wave generating circuit 812.

The sine wave information (information on frequency, phase, and amplitude) from AC frequency detecting circuit 81 (FIG. 11) is input to third sine wave generating circuit 851. However, in the first embodiment, the amplitude information is not controlled since QV control is not performed in virtual synchronous generator control circuit 83.

Third sine wave generating circuit 851 generates a target value of AC voltage output from second DC/AC converter 408, based on the input sine wave information.

Subtractor 852 calculates the deviation between the target value of AC voltage from third sine wave generating circuit 851 and the voltage measured by voltmeter 410 and outputs the calculated deviation to third PI control circuit 853.

Third PI control circuit 853 generates a voltage command value by performing PI (proportional integral) computation such that the input deviation becomes zero. Third PI control circuit 853 outputs the generated voltage command value to first current limiting circuit 855.

First current limiting circuit 855 imposes a limit on the voltage command value output from third PI control circuit 853, based on the measurement result of ammeter 411 input via eighth control circuit 87. Specifically, when current exceeding the current capacity of second DC/AC converter 408 flows, first current limiting circuit 855 performs control to limit the voltage command value so that the current flowing through second DC/AC converter 408 becomes equal to or lower than a predetermined current value (for example, the current capacity of second DC/AC converter 408). The output of first current limiting circuit 855 is input to second PWM converter 854. The control parameters (control gain and integral time) in third PI control circuit 853 and first current limiting circuit 855 are applied from eighth control circuit 87.

Second PWM converter 854 generates a control signal by executing pulse width modulation (PWM) control, using the voltage command value output from first current limiting circuit 855. Second PWM converter 854 outputs the generated control signal to second DC/AC converter 408.

(3-2-3) Virtual Synchronous Generator Control Circuit 83

Figure 14:
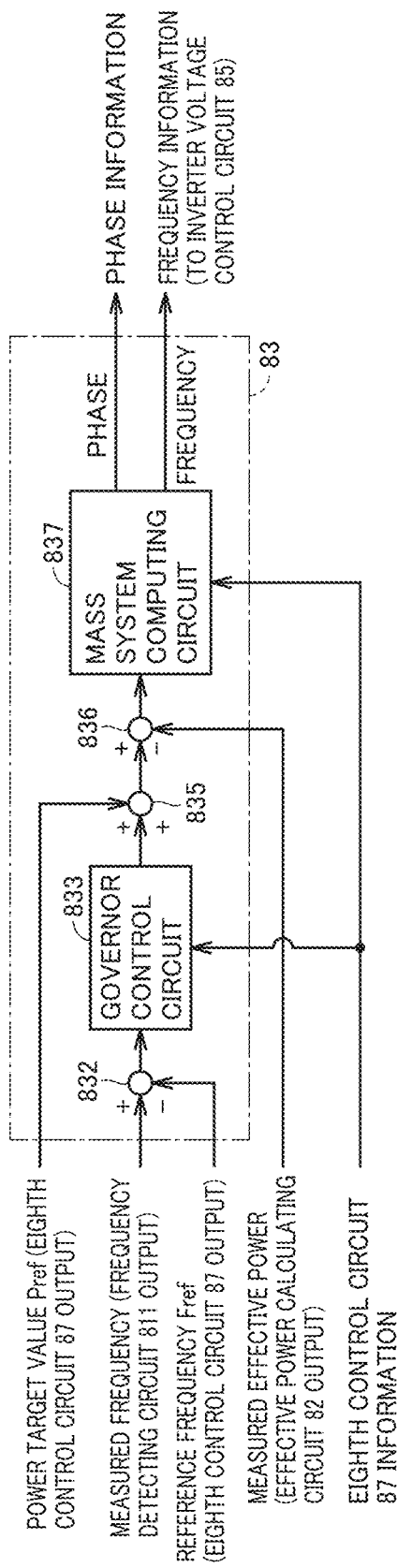
FIG. 14 is a block diagram illustrating a configuration of a virtual synchronous generator control circuit illustrated in FIG. 11.

FIG. 14 is a block diagram illustrating a configuration of virtual synchronous generator control circuit 83 illustrated in FIG. 11.

As illustrated in FIG. 14, virtual synchronous generator control circuit 83 includes a subtractor 832, a governor control circuit 833, an adder 835, a subtractor 836, and a mass system computing circuit 837.

Subtractor 832 calculates the deviation between the measurement result of frequency and a reference frequency Fref output from eighth control circuit 87. The output of subtractor 832 is input to governor control circuit 833. Governor control circuit 833 generates an offset value to be added to a power target value, based on the output of subtractor 832. The detailed operation of governor control circuit 833 will be described later.

Adder 835 generates a control power target value of mass system computing circuit 837 by adding the offset value output from governor control circuit 833 to power target value Pref input from eighth control circuit 87.

Subtractor 836 calculates the deviation between the effective power input from effective power calculating circuit 82 and the control power target value input from adder 835. The output of subtractor 836 is input to mass system computing circuit 837.

Mass system computing circuit 837 calculates the frequency and phase of system voltage output from power conversion device 41 such that the deviation output from subtractor 836 becomes zero. In the first embodiment, notification of the control parameters (speed adjustment rate Kgd, governor time constant Tg, inertia constant M, and damping coefficient Dg) of governor control circuit 833 and mass system computing circuit 837 is given from control parameter generating circuit 88 through eighth control circuit 87.

(3-2-3-1) Governor Control Circuit 833

Figure 15:
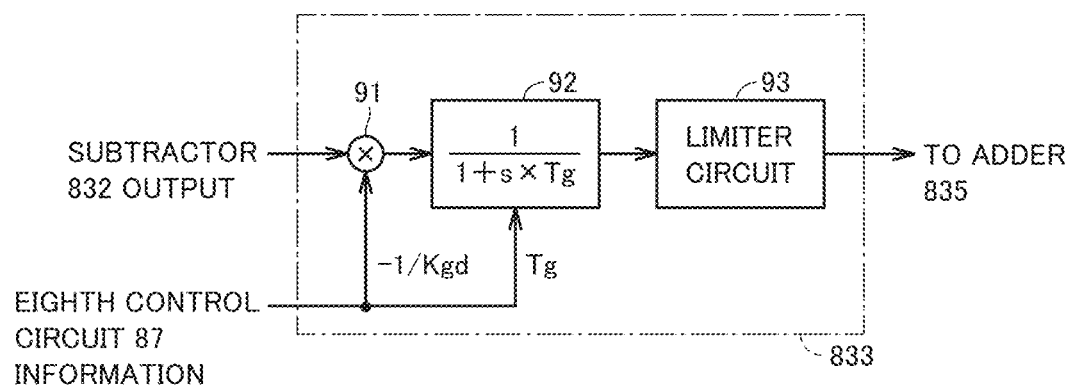
FIG. 15 is a block diagram illustrating a configuration of a governor control circuit illustrated in FIG. 14.

FIG. 15 is a block diagram illustrating a configuration of governor control circuit 833 illustrated in FIG. 14.

As illustrated in FIG. 15, governor control circuit 833 includes a multiplier 91, a first-order lag system model 92, and a limiter circuit 93.

Multiplier 91 multiplies the output of subtractor 832 by the proportional gain (−1/Kgd) output from eighth control circuit 87. The output of multiplier 91 is input to first-order lag system model 92. In the first embodiment, first-order lag system model 92 is implemented with a standard model of a first-order lag system (1/(1+s×Tg)) presented by the Institute of Electrical Engineers of Japan. Limiter circuit 93 performs a limiter process on the output of first-order lag system model 92.

(3-2-3-2) Mass System Computing Circuit 837

Figure 16:
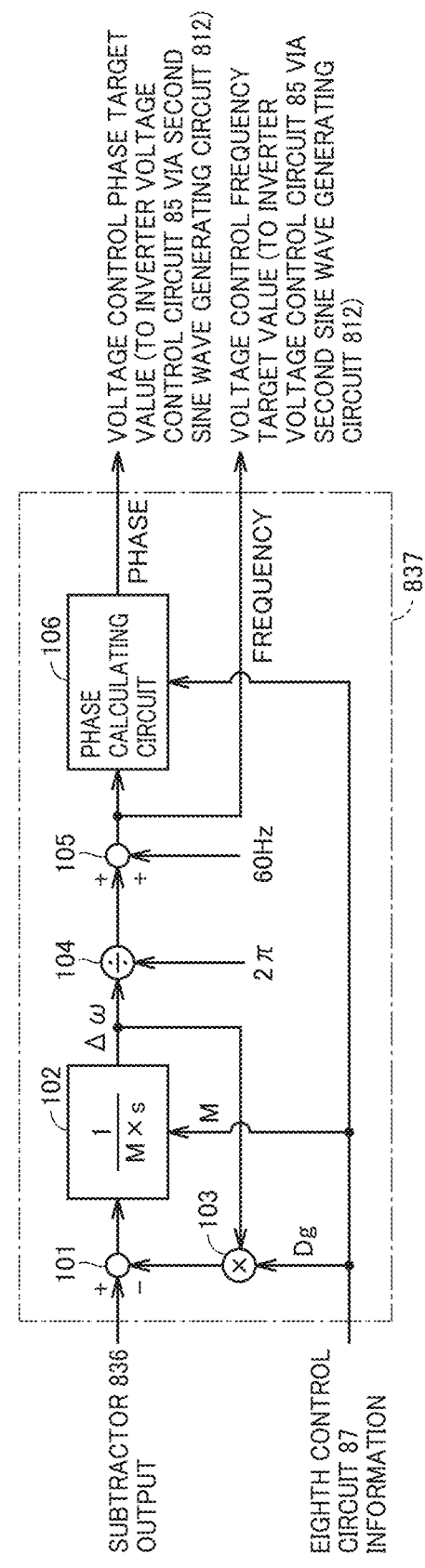
FIG. 16 is a block diagram illustrating a configuration of a mass system computing circuit illustrated in FIG. 14.

FIG. 16 is a block diagram illustrating a configuration of mass system computing circuit 837 illustrated in FIG. 14.

As illustrated in FIG. 16, mass system computing circuit 837 includes a subtractor 101, an integrator 102, a multiplier 103, a divider 104, an adder 105, and a phase calculating circuit 106.

Subtractor 101 calculates the deviation between the output of subtractor 836 and the output of multiplier 103. The output of subtractor 101 is input to integrator 102.

Integrator 102 generates a differential value Δω between a target angular velocity (2×π×target frequency (for example 60 Hz)) of the generator rotor in FIG. 54 and the angular velocity of the generator rotor by integrating the output of subtractor 101 multiplied by 1/M. The output of integrator 102 is input to multiplier 103.

Multiplier 103 multiplies the output of integrator 102 by damping coefficient Dg input from eighth control circuit 87.

Mass system computing circuit 837 is configured to mimic the damping force of the synchronous generator by control of second DC/AC converter 408, based on the deviation between the output of subtractor 836 and the output of multiplier 103.

Divider 104 divides the output Δω of integrator 102 by 2×π to convert the output Δω into a differential value Δf of frequency. Adder 105 converts frequency differential information Δf into a frequency of the generator rotor (rotation frequency) by adding target frequency (60 Hz) to frequency differential information Δf. The output of adder 105 is input to phase calculating circuit 106. Phase calculating circuit 106 calculates the phase of the generator rotor.

The transfer function of the swing equation of mass system computing circuit 837 will now be described. The transfer function of the swing equation can be expressed using the proportional gain (1/Dg) and the time constant (M/Dg) of the first-order time delay system by the following expression (3).

$$(1/M \times s)/\{1+Dg/M \times (1/s)\} = (1/Dg) \times [1/\{1+(M/Dg) \times s\}] \quad (3)$$

Governor time constant Tg and time constant M/Dg of the mass system computing unit in the virtual synchronous generator control are determined based on the response speed required for the system.

(Operation Overview of Power Conversion Device)

The operation overview of the power conversion device according to the first embodiment will now be described.

Figure 17:
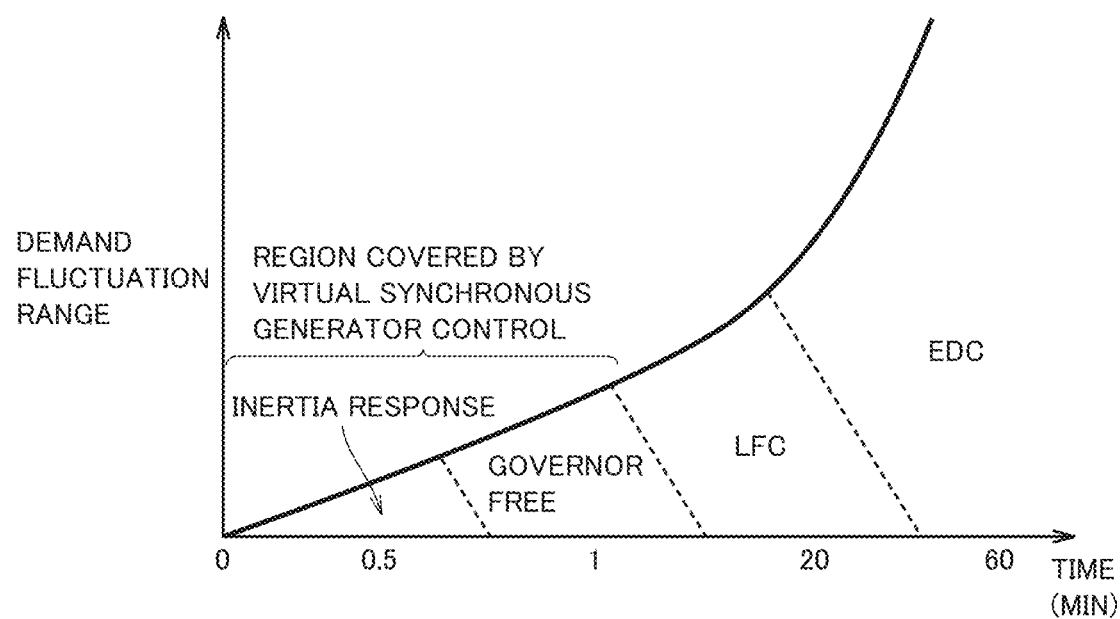
FIG. 17 is a diagram illustrating a region covered by virtual synchronous generator control implemented in a power conversion device.

FIG. 17 is a diagram illustrating a region covered by virtual synchronous generator control implemented in power conversion device 41. In FIG. 17, the horizontal axis shows the response time, and the vertical axis shows the demand fluctuation range.

As illustrated in FIG. 17, the virtual synchronous generator control implemented in the static inverter covers minute fluctuations and short-cycle fluctuations of approximately a few tens of milliseconds to a few minutes. Fluctuations longer than a few minutes can be handled by load frequency control (LFC) or economic load distribution control (EDC). Thus, in the first embodiment, the response performance of the virtual synchronous generator control is defined as 1 second or shorter.

In the following description, a model configured with storage battery 40, power conversion device 41, impedance 29 of the distribution system, and load 600 connected to distribution system 24 illustrated in FIG. 2 is used. For simplicity of explanation, it is assumed that the inverter capacity of power conversion device 41 is 4 kW and the capacity of load 600 is a maximum of 4 kW.

Figure 18:
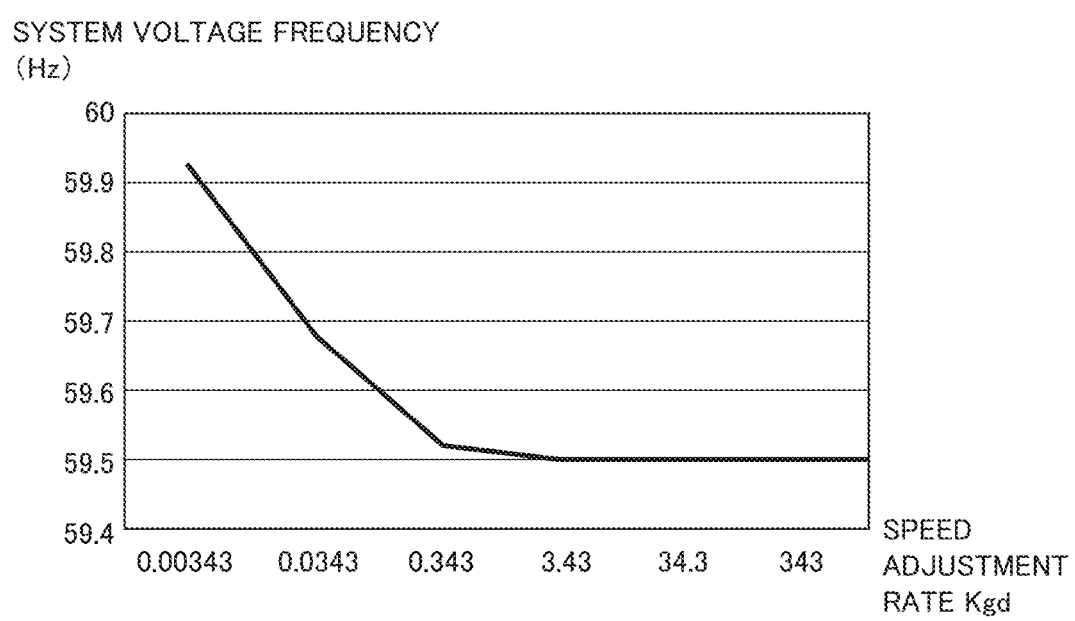
FIG. 18 is a diagram for explaining virtual synchronous generator control implemented in a power conversion device according to a first embodiment.

FIG. 18 is a diagram for explaining virtual synchronous generator control implemented in power conversion device 41 according to a first embodiment. FIG. 18 illustrates an example of the relation between speed adjustment rate Kgd and the system frequency when the power consumption of load 600 is changed without changing the power target value. FIG. 18 illustrates the system frequency at each speed adjustment rate Kgd in a steady state when load 600 fluctuates from 2 kW to 4 kW in a state in which notification of the power target value of 2 kW is given from CEMS 31 in FIG. 2. Each of governor time constant Tg, inertia constant M, and damping coefficient Dg is fixed to a constant value.

In the example in FIG. 18, the system frequency decreases as the value of Kgd increases until Kgd becomes 0.343. On the other hand, it is observed that the system frequency converges when Kgd exceeds 0.343.

Figure 19:
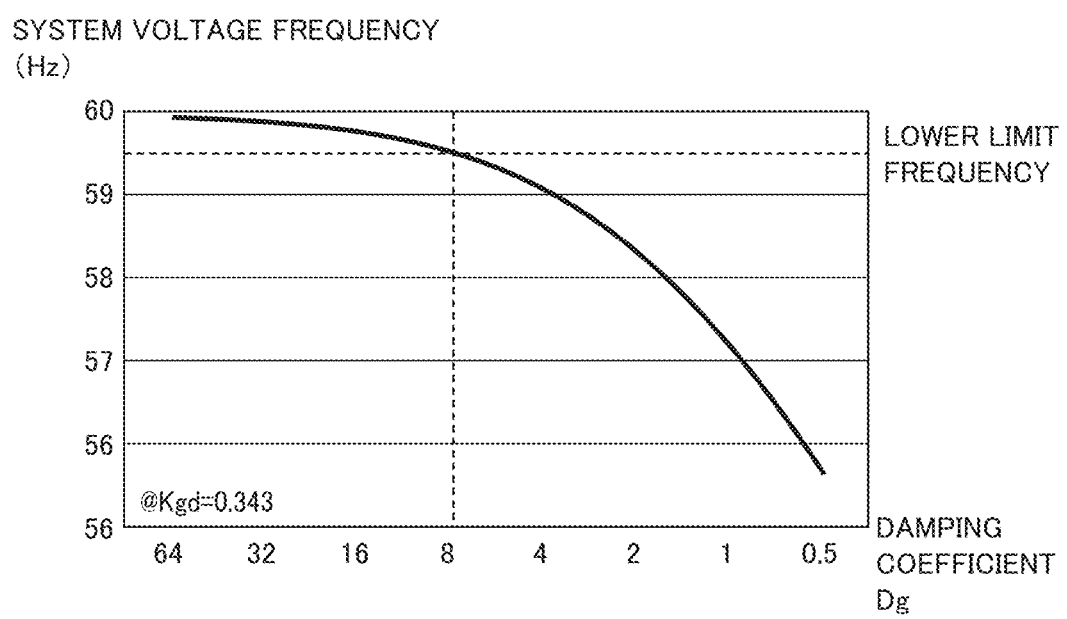
FIG. 19 is a diagram for explaining virtual synchronous generator control implemented in a power conversion device according to the first embodiment.

FIG. 19 is a diagram for explaining virtual synchronous generator control implemented in power conversion device 41 according to the first embodiment. FIG. 19 illustrates an example of the relation between damping coefficient Dg and the system frequency when the load is abruptly changed. FIG. 19 illustrates the system frequency at each damping coefficient Dg when the load fluctuates from 2 kW to 4 kW in a state in which notification of the power target value of 2 kW is given from CEMS 31 in FIG. 2. Each of governor time constant Tg, inertia constant M, and speed adjustment rate Kgd (=0.343) is fixed to a constant value. In the example in FIG. 19, it is observed that as damping coefficient Dg decreases, the decrease of the system frequency increases.

In general, the limit values (upper limit and lower limit) of the system frequency are approximately ±1 to 2% of the reference frequency (hereinafter also referred to as Fref). Thus, when reference frequency Fref is 60 Hz, the upper limit of the system frequency is approximately 61.2 to 60.6 Hz, and the lower limit of the system frequency is approximately 59.4 to 58.8 Hz. It is therefore necessary to set speed adjustment rate Kgd and damping coefficient Dg in the governor control such that the system frequency falls within a frequency range determined by the limit values.

The ΔF/ΔP characteristic will now be described.

Figure 20:
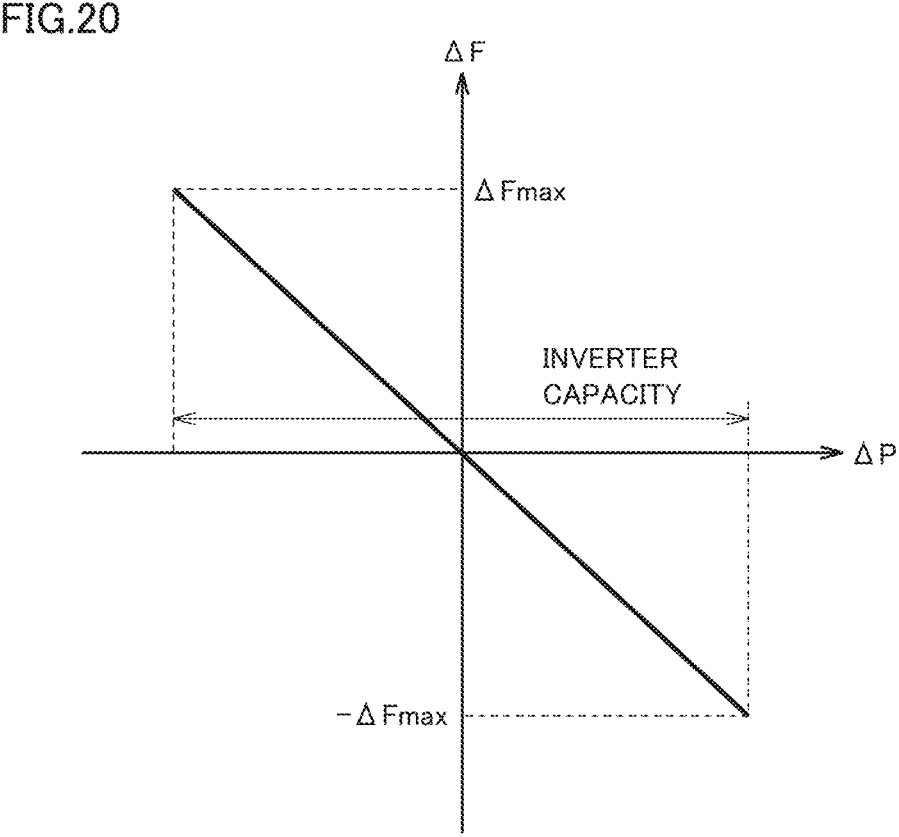
FIG. 20 is a diagram illustrating an example of a ΔF/ΔP characteristic.

FIG. 20 is a diagram illustrating an example of the ΔF/ΔP characteristic. The horizontal axis in FIG. 20 is a differential power ΔP that is a deviation of the actual output power of power conversion device 41 from the power target value. Differential power ΔP is positive when the output power of power conversion device 41 is greater than the power target value.

The vertical axis in FIG. 20 is a differential frequency ΔF that is a deviation of the frequency of AC voltage output by power conversion device 41 from reference frequency Fref (for example 60 Hz) of the AC system. Differential frequency ΔF is positive when the frequency of AC voltage output by power conversion device 41 is higher than reference frequency Fref. ΔFmax is the maximum value of differential frequency ΔF.

In virtual synchronous generator control circuit 83 (FIG. 8) according to the first embodiment, the ΔF/ΔP characteristic illustrated in FIG. 20 is determined depending on the capacity of the static inverter (second DC/AC converter 408), speed adjustment rate Kgd, and damping coefficient Dg. In FIG. 20, charging of storage battery 40 is not taken into consideration, and the power target value is set to half the capacity of the static inverter (second DC/AC converter 408). FIG. 20 illustrates the ΔF/ΔP characteristic in a case where the system frequency when the power consumption of load 600 is equal to the capacity of the static inverter (second DC/AC converter 408) in FIG. 2 is the upper limit (Fref+ΔFmax), and the system frequency when the power consumption of load 600 is zero is the lower limit (Fref−ΔFmax).

In the first embodiment, the ΔF/ΔP characteristic illustrated in FIG. 20 is referred to as "reference ΔF/ΔP characteristic". As described above, the reference ΔF/ΔP characteristic is the ΔF/ΔP characteristic under the condition that, in the discharge mode of storage battery 40, a half of the capacity of static inverter is a power target value, the system frequency is the upper limit (Fref+ΔFmax) when the output of the static inverter agrees with the capacity, and the system frequency is the lower limit (Fref−ΔFmax) when the output of the static inverter is zero. The detail of the discharge mode will be described later.

Figure 21:
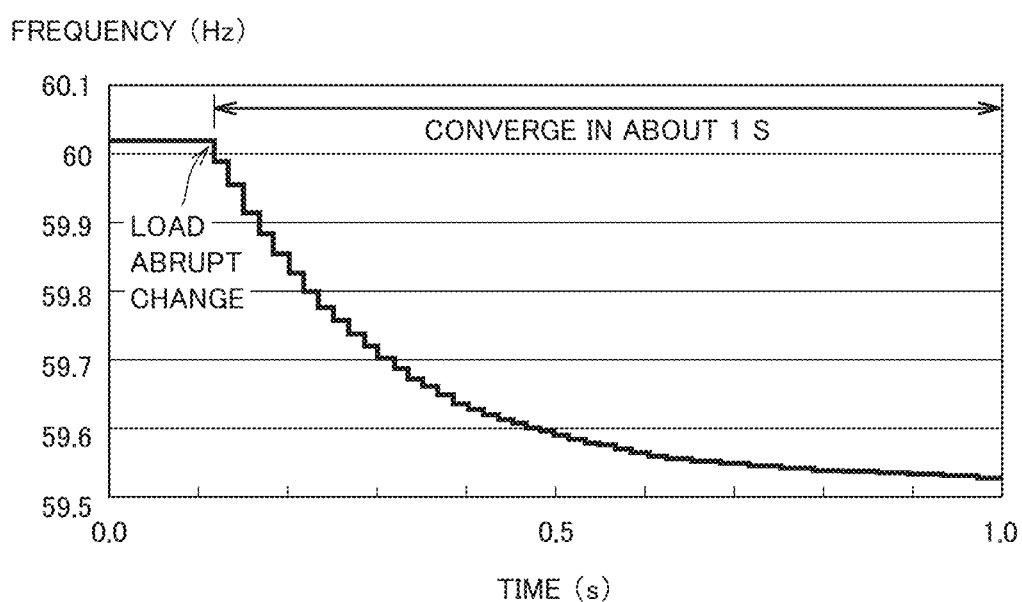
FIG. 21 is a diagram illustrating a response waveform of the frequency of AC voltage output from a static inverter when a load is abruptly changed in the virtual synchronous generator control implemented in the power conversion device according to the first embodiment.

FIG. 21 is a diagram illustrating a response waveform of the frequency of AC voltage output from the static inverter when a load is abruptly changed in the virtual synchronous generator control implemented in power conversion device 41 according to the first embodiment.

As illustrated in FIG. 17, the virtual synchronous generator control implemented in the static inverter covers minute oscillations and short-cycle fluctuations of approximately a few tens of milliseconds to a few minutes. Thus, the response performance of 1 second or shorter is required for the virtual synchronous generator control. In general, when the time constant is reduced, the response performance increases but oscillations occur in the response waveform. Further, when a plurality of distributed power sources operate in cooperation, inconvenience such as occurrence of unnecessary cross current may occur. Thus, in the first embodiment, as illustrated in FIG. 21, the time constant in governor control circuit 833 (FIG. 15) and mass system computing circuit 837 (FIG. 16) is determined such that the system frequency converges in approximately 1 second.
(Conventional Virtual Synchronous Generator Control and Its Problem)

Problems in a case where two power conversion devices 41 equipped with conventional virtual synchronous generator control are disposed in distribution system 24 will now be described.

Figure 22:
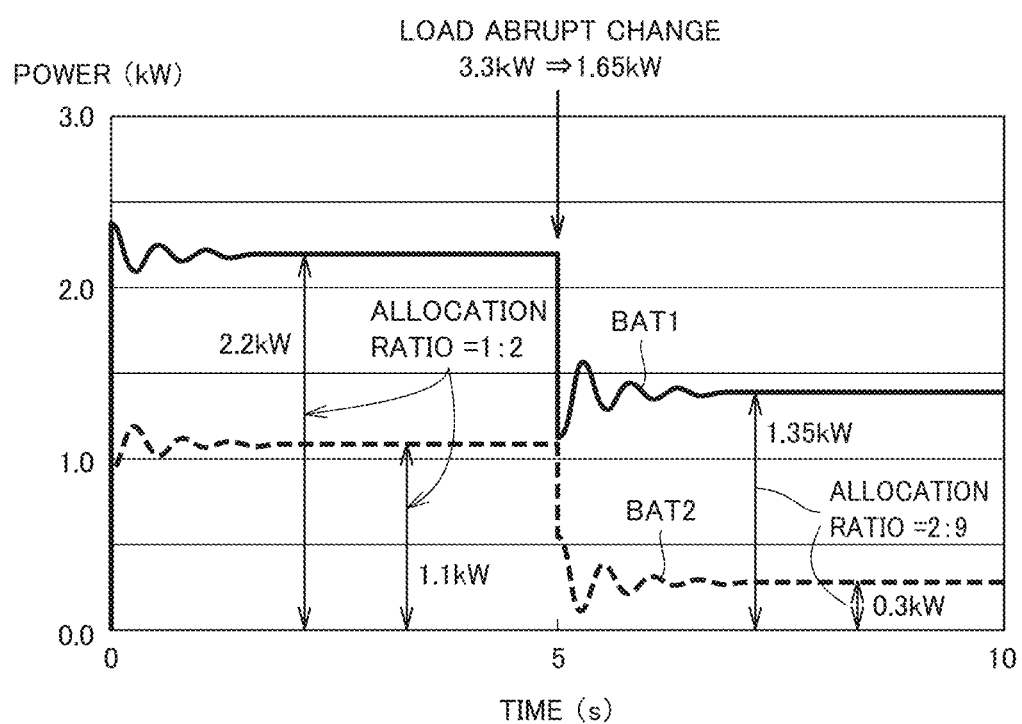
FIG. 22 is a diagram illustrating a response waveform of the effective value of AC power output from the static inverter of each of two power conversion devices equipped with conventional virtual synchronous generator control.

FIG. 22 is a diagram illustrating a response waveform of the effective value of AC power output from the static inverter of each of two power conversion devices 41 equipped with conventional virtual synchronous generator control. The response waveform illustrated in FIG. 22 shows the waveform of the effective value of AC power output from each static inverter when an independent system is configured using two power conversion devices 41 and a load is abruptly changed.

In FIG. 22, the inverter capacity of each power conversion device 41 is 4 kW, and the power consumption of the load is 3.3 kW. First and second power conversion devices 41 are controlled, supposing that the power target value of a first storage battery (denoted by "BAT1" in the figure) corresponding to first power conversion device 41 is 2.2 kW, and the power target value of a second storage battery (denoted by "BAT2" in the figure) corresponding to second power conversion device 41 is 1.1 kW. It is assumed that, in such a state, the power consumption of the load abruptly changes to about a half (1.65 kW) in the vicinity of 5 seconds.

As illustrated in FIG. 22, before the load abruptly changes, a power in the vicinity of the power target value (2.2 kW) is output from first power conversion device 41, a power in the vicinity of the power target value (1.1 kW) is output from second power conversion device 41, and the power ratio between the two is 2:1.

On the other hand, after the load abruptly changes, the output power of first power conversion device 41 is 1.35 kW, the output power of second power conversion device 41 is 0.3 kW, and the power ratio between the two is 9:2. In this way, it is understood that after the load abruptly changes, power is output from two power conversion devices 41 at a ratio (9:2) different from the intended power allocation ratio (2:1).

Figure 23:
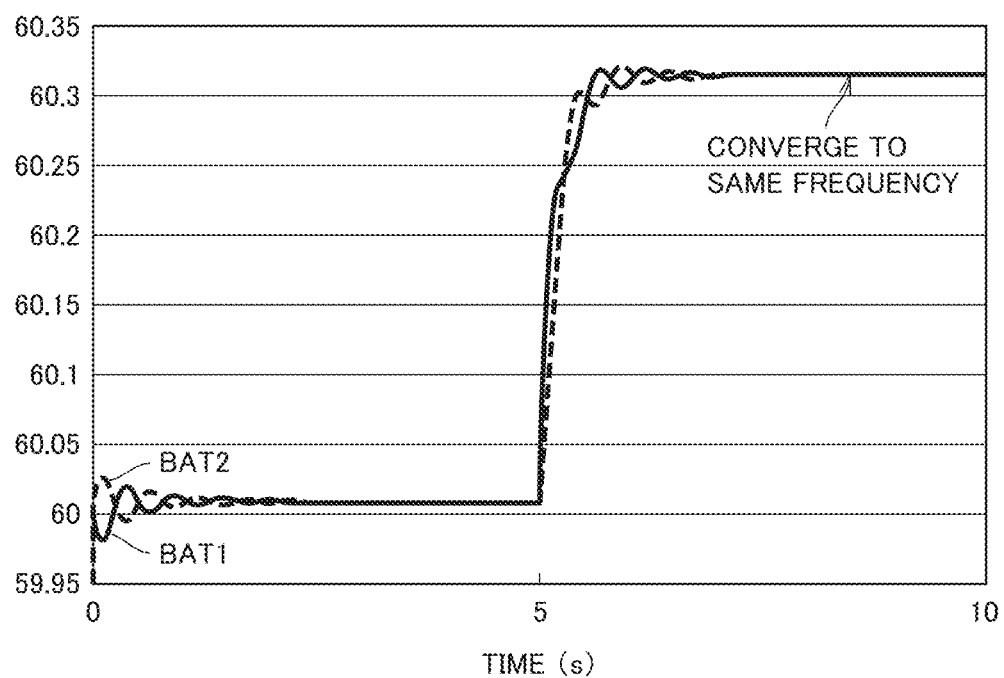
FIG. 23 is a diagram illustrating a response waveform of the frequency of AC voltage output from each static inverter when two power conversion devices equipped with conventional virtual synchronous generator control are operated.

FIG. 23 illustrates a response waveform of the frequency of AC voltage output from each static inverter when two power conversion devices 41 equipped with conventional virtual synchronous generator control are operated under the condition above. As illustrated in FIG. 23, it is understood that the frequency of AC voltage converges to substantially the same frequency under the virtual synchronous generator control even after the load abruptly changes.

The reason why the power allocation ratio changes at the time of abrupt change of the load will now be described with reference to FIG. 24 and FIG. 25.

Figure 24:
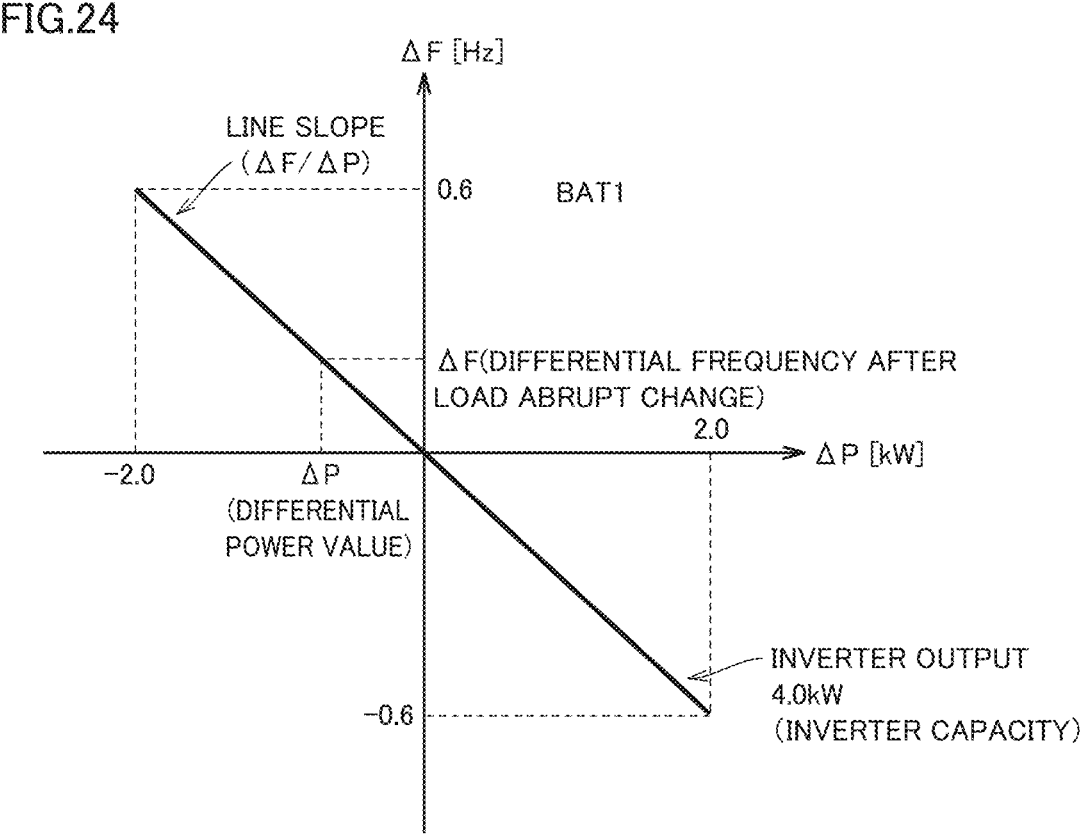
FIG. 24 is a diagram illustrating an example of the ΔF/ΔP characteristic of a first power conversion device equipped with conventional virtual synchronous generator control.

FIG. 24 is a diagram illustrating an example of the ΔF/ΔP characteristic of first power conversion device 41 equipped with conventional virtual synchronous generator control. FIG. 25 is a diagram illustrating an example of the ΔF/ΔP characteristic of second power conversion device 41 equipped with conventional virtual synchronous generator control.

In the conventional virtual synchronous generator control, the ΔF/ΔP characteristic is not switched in accordance with the power target value and the capacity of the static inverter. In the example in FIG. 24 and FIG. 25, since the static inverters of two power conversion devices 41 have the same capacity (4 kW), it is assumed that the same ΔF/ΔP characteristic is applied.

When the load abruptly changes as illustrated in FIG. 22, the virtual synchronous generator control implemented in each power conversion device 41 operates such that a power excess/deficit is shared between two power conversion devices 41. In doing so, as illustrated in FIG. 23, two power conversion devices 41 are controlled such that the frequencies of AC voltages output from the static inverters are equal to each other.

Figure 25:
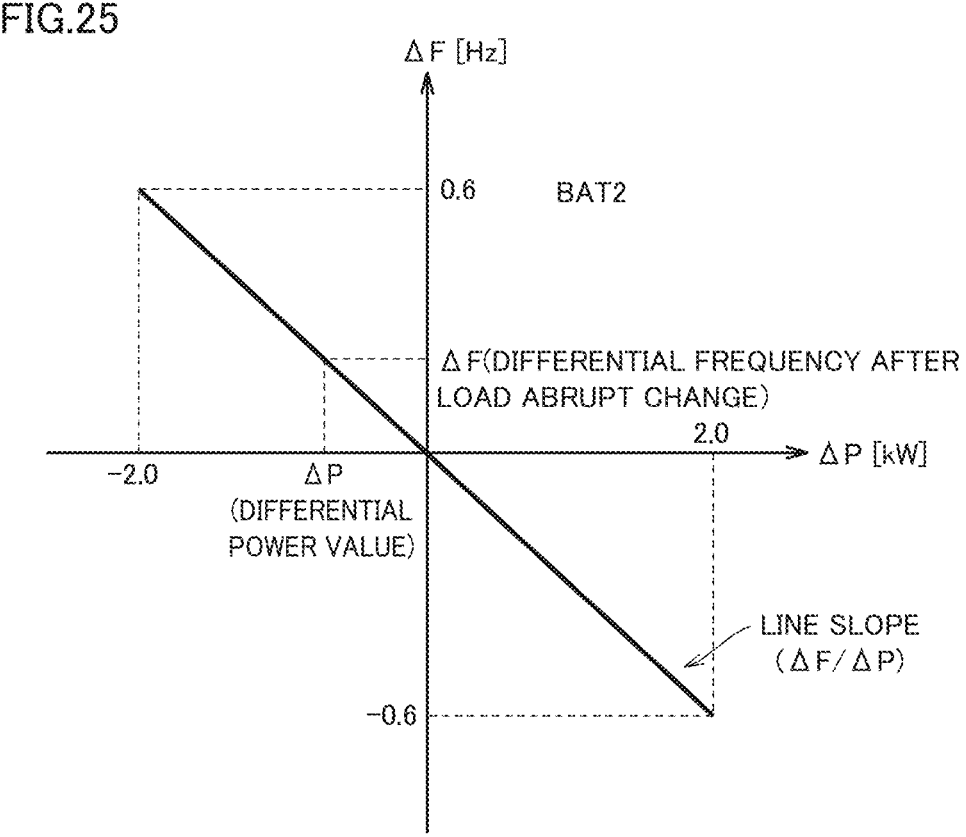
FIG. 25 is a diagram illustrating an example of the ΔF/ΔP characteristic of a second power conversion device equipped with conventional virtual synchronous generator control.

On the other hand, differential power ΔP between the power output from each power conversion device 41 and the power target value is determined by the ΔF/ΔP characteristic illustrated in FIG. 24 and FIG. 25. Therefore, when the ΔF/ΔP characteristics of two power conversion devices 41 are the same, differential powers ΔP are also the same as the differential frequencies ΔF are the same. As a result, as illustrated in FIG. 22, after abrupt change of the load, powers are output from two power conversion devices 41 at an allocation ratio different from the intended power allocation ratio.

(Virtual Synchronous Generator Control in First Embodiment)

Figure 26:
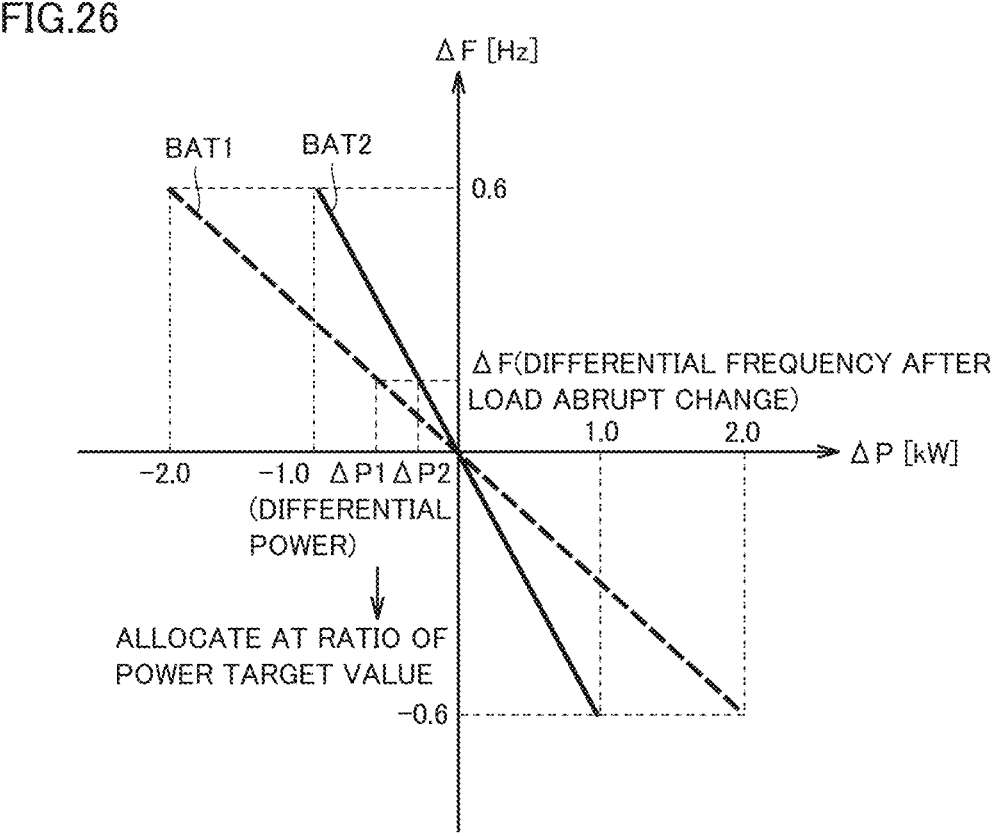
FIG. 26 is a diagram illustrating an example of the ΔF/ΔP characteristic of a second power conversion device equipped with virtual generator control according to the first embodiment.

FIG. 26 is a diagram illustrating an example of the ΔF/ΔP characteristic of second power conversion device 41 equipped with virtual generator control according to the first embodiment. In the figure, the solid line indicates the ΔF/ΔP characteristic of second power conversion device 41, and the broken line indicates the ΔF/ΔP characteristic (FIG. 24) of first power conversion device 41.

As illustrated in FIG. 22, when the power target value (1.1 kW) of second power conversion device 41 is half the power target value (2.2 kW) of first power conversion device 41 (that is, the power allocation ratio is 2:1), as illustrated in FIG. 26, the ΔF/ΔP characteristic of second power conversion device 41 is determined such that the ratio between differential power ΔP (ΔP1 in the figure) of first power conversion device 41 and differential power ΔP (ΔP2 in the figure) of second power conversion device 41 is equal to the ratio of power target value (2:1), at the same differential frequency ΔF.

It is understood that the ΔF/ΔP characteristics of two power conversion devices 41 are determined as illustrated in FIG. 26, whereby the ratio of power shared by each power conversion device 41 is equal to the ratio of power target value (2:1) given from CEMS 31 even when the load changes.

(Method of Creating ΔF/ΔP Characteristic)

A method of creating the ΔF/ΔP characteristic of each power conversion device 41 in CEMS 31 will now be described.

In the first embodiment, when the ΔF/ΔP characteristic of each power conversion device 41 is created, CEMS 31 first creates a reference ΔF/ΔP characteristic for each power conversion device 41. In the following description, a method of creating a reference ΔF/ΔP characteristic in discharging of storage battery 40 will be described.

The operation modes of storage battery 40 include a discharge mode of discharging storage battery 40, a charge mode of charging storage battery 40, and a charge/discharge mode of charging and discharging storage battery 40. When storage battery 40 is operated in the discharge mode or the charge mode, the reference ΔF/ΔP characteristic is created such that differential power ΔP corresponding to ΔFmax that is a limit value of differential frequency ΔF is half the capacity of the static inverter.

On the other hand, when storage battery 40 is operated in the charge/discharge mode (in particular when the power target value is in the vicinity of zero), the reference ΔF/ΔP characteristic is created such that differential power ΔP corresponding to ΔFmax is equal to the capacity of the static inverter.

It is necessary that CEMS 31 should create the reference ΔF/ΔP characteristics of a plurality of power conversion devices 41 it manages, under the same policy. CEMS 31 therefore creates a reference ΔF/ΔP characteristic considering the charge/discharge mode in first power conversion device 41 but does not create a reference ΔF/ΔP characteristic considering the charge mode or the discharge mode in second power conversion device 41.

Figure 27:
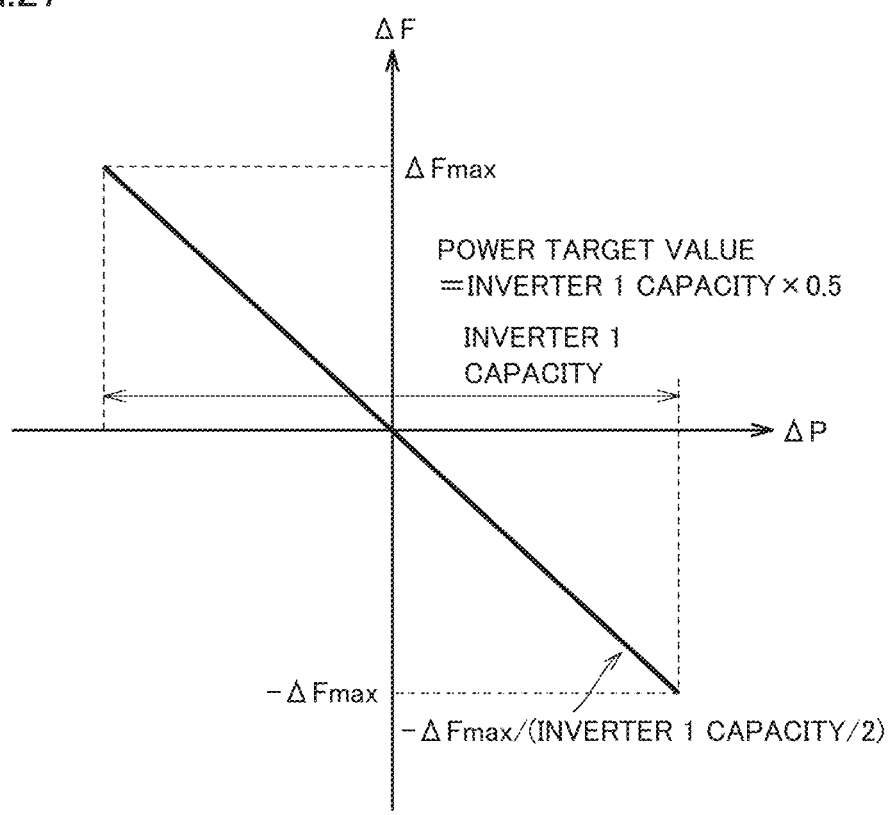
FIG. 27 is a diagram illustrating an example of a reference ΔF/ΔP characteristic in a power conversion device equipped with virtual synchronous generator control according to the first embodiment.

FIG. 27 is a diagram illustrating an example of the reference ΔF/ΔP characteristic in power conversion device 41 equipped with virtual synchronous generator control according to the first embodiment.

In the first embodiment, CEMS 31 creates a reference ΔF/ΔP characteristic, based on information on the limit values (Fref±ΔFmax) of the system frequency given from DSO 21 and information on the capacity of the static inverter.

Specifically, when only the discharge mode is taken into consideration, power target value Pref is set to half the capacity of the static inverter, and a reference ΔF/ΔP characteristic is created such that the system frequency is the lower limit (Fref−ΔFmax) when power conversion device 41 outputs a power equal to the capacity of the static inverter and that the system frequency is the upper limit (Fref+ΔFmax) when the output of the static inverter is zero.

When only the charge mode is taken into consideration, the charge power is treated as a negative value, and a reference ΔF/ΔP characteristic is created such that the system frequency is the lower limit (Fref−ΔFmax) when the charge power is zero and that the system frequency is the upper limit (Fref+Δfmax) when the charge power is equal to the capacity of the static inverter, thereby achieving similar effects.

When the charge/discharge mode is taken into consideration, power target value Pref is set to zero, and a reference ΔF/ΔP characteristic is created such that the system frequency is the lower limit (Fref−ΔFmax) when a power equal to the capacity of the static inverter is discharged and that the system frequency is the upper limit (Fref+ΔFmax) when a power equal to the capacity of the static inverter is charged, thereby achieving similar effects.

Figure 28:
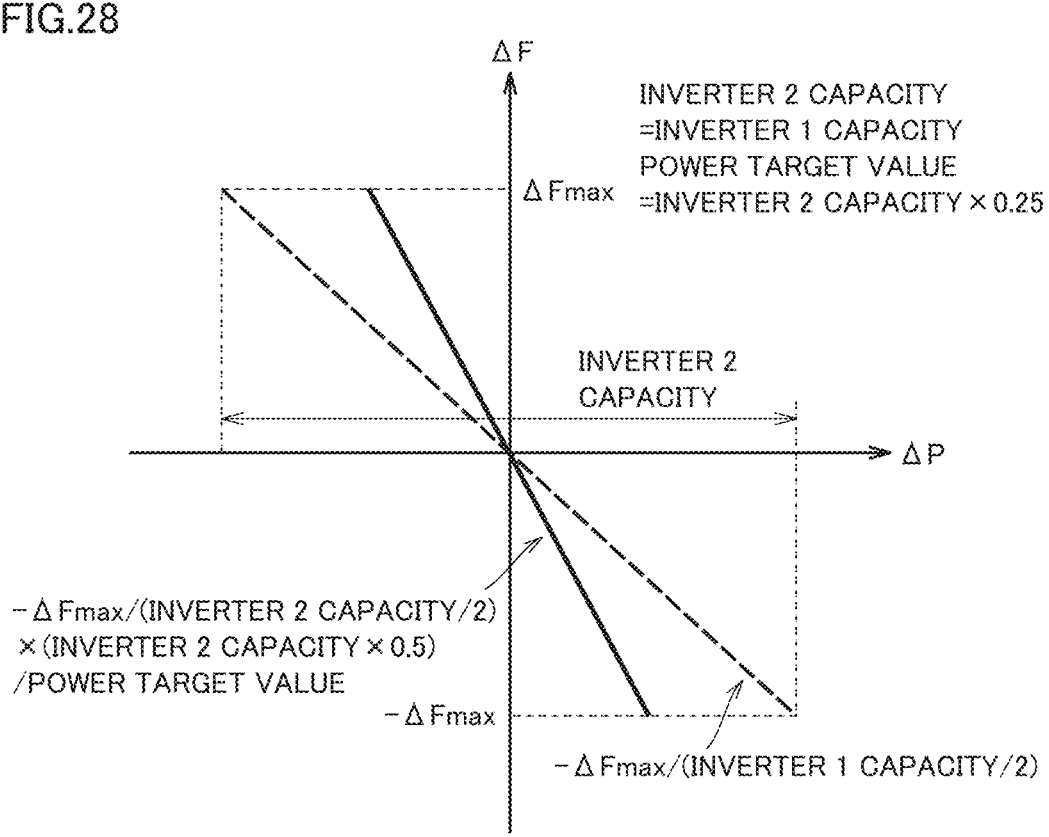
FIG. 28 is a diagram for explaining a method of creating a ΔF/ΔP characteristic of each power conversion device using the reference ΔF/ΔP characteristic illustrated in FIG. 27.

A method of creating a ΔF/ΔP characteristic of each power conversion device 41 using the reference ΔF/ΔP characteristic illustrated in FIG. 27 will now be described with reference to FIG. 28.

In the following description, it is assumed that the static inverters of power conversion devices 41 have the same capacity. In FIG. 28, a method of creating a ΔF/ΔP characteristic using the reference ΔF/ΔP characteristic in FIG. 27 in a case where the power target value is different from the power target value (half the capacity of the static inverter) in the reference ΔF/ΔP characteristic will be described. In the figure, the broken line indicates the reference ΔF/ΔP characteristic (FIG. 27), and the solid line indicates the ΔF/ΔP characteristic.

In a case where the static inverters have the same capacity, in the first embodiment, the slope of the ΔF/ΔP characteristic (the solid line in the figure) is obtained by multiplying the slope of the reference ΔF/ΔP characteristic (the broken line in the figure) by the result of dividing a half of the static inverter capacity (0.5 times) by power target value Pref of power conversion device 41. For example, when power target value Pref is 0.25 times as large as the static inverter capacity, the slope of the ΔF/ΔP characteristic is obtained by multiplying the slope of the reference ΔF/ΔP characteristic by 0.5/0.25 (=2).

A case where the static inverters of power conversion devices 41 have different capacities will now be described. In this case, a method of creating a reference ΔF/ΔP characteristic of each power conversion device 41 is different from the creation method described above.

When the capacities of the static inverters are different among a plurality of power conversion devices 41, a static inverter capacity serving as a reference is determined in advance. For example, when the capacities of three static inverters are 10 kW, 8 kW, and 4 kW, 8 kW is the reference. Basically, any capacity can be selected as a reference. Then, a reference ΔF/ΔP characteristic of the static inverter having the reference capacity (8 kW) is created using the creation method described in FIG. 27.

Figure 29:
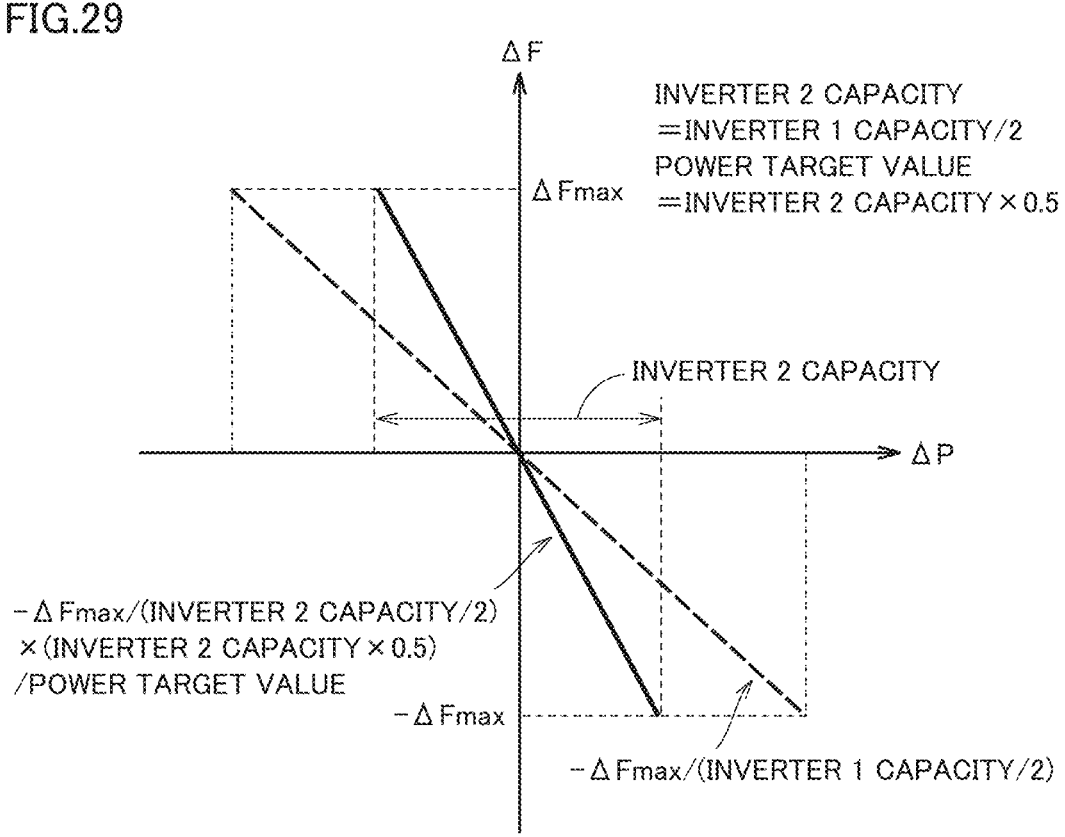
FIG. 29 is a diagram for explaining a method of creating a reference ΔF/ΔP characteristic of a static inverter with a capacity of 4 kW.

Next, a reference ΔF/ΔP characteristic of the static inverter with a capacity of 4 kW is created using the reference ΔF/ΔP characteristic of the static inverter having the reference capacity (8 kW). FIG. 29 is a diagram for explaining a method of creating a reference ΔF/ΔP characteristic of the static inverter with a capacity of 4 kW. In the figure, the broken line indicates the reference ΔF/ΔP characteristic (FIG. 27) of the static inverter having the reference capacity, and the solid line indicates the reference ΔF/ΔP characteristic of the static inverter with a capacity of 4 kW.

As illustrated in FIG. 29, the slope of the reference ΔF/ΔP characteristic is obtained by multiplying the slope of the reference ΔF/ΔP characteristic for the reference capacity (8 kW) by the value obtained by dividing the reference capacity (this time, 8 kW) by the capacity of its own static inverter (this time, 4 kW). Specifically, the slope of the reference ΔF/ΔP characteristic of the static inverter with a capacity of 4 kW is calculated by multiplying the slope of the reference ΔF/ΔP characteristic of the static inverter with a reference capacity (8 kW) by 8/4 (=2). Similarly, the slope of the line of the reference ΔF/ΔP characteristic of the static inverter with a capacity of 10 kW is calculated by multiplying the slope of the reference ΔF/ΔP characteristic of the static inverter with a reference capacity (8 kW) by 8/10 (=0.8).

Figure 30:
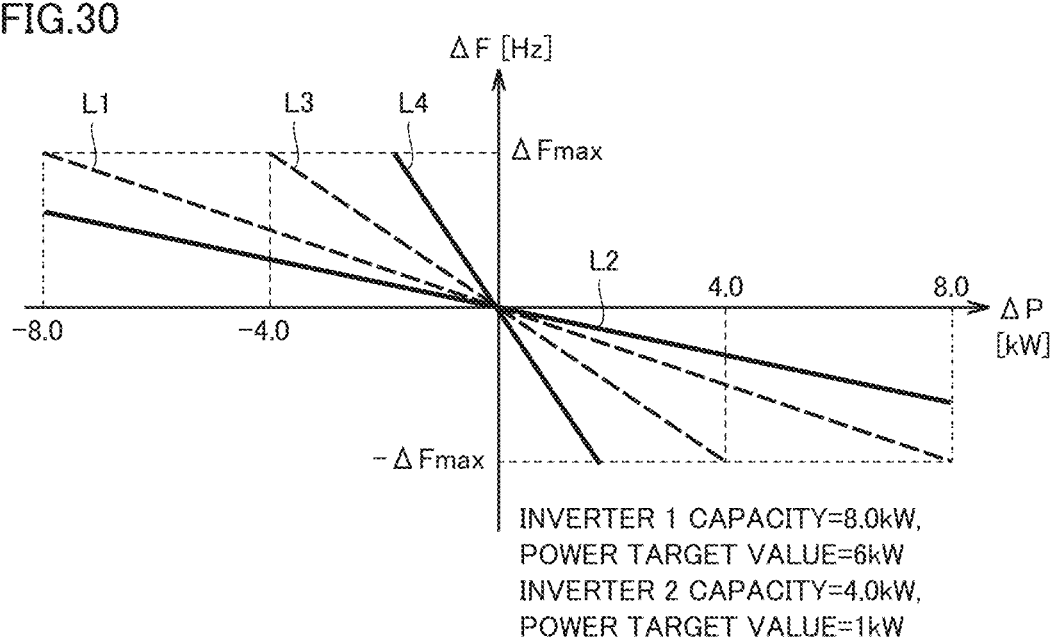
FIG. 30 is a diagram illustrating an example of the reference ΔF/ΔP characteristic and the ΔF/ΔP characteristic of two power conversion devices with different capacities of the static inverters.

FIG. 30 is a diagram illustrating an example of the reference ΔF/ΔP characteristics and the ΔF/ΔP characteristics of two power conversion devices 41 with different capacities of the static inverters. In FIG. 30, broken line L1 indicates the reference ΔF/ΔP characteristic of first power conversion device 41, and solid line L2 indicates the ΔF/ΔP characteristic of first power conversion device 41. Broken line L3 indicates the reference ΔF/ΔP characteristic of second power conversion device 41, and solid line L4 indicates the ΔF/ΔP characteristic of second power conversion device 41.

In the example in FIG. 30, first power conversion device 41 has a capacity of the static inverter of 8 kW and a power target value of 6 kW. Second power conversion device 41 has a capacity of the static inverter of 4 kW and a power target value of 1 kW.

Figure 31:
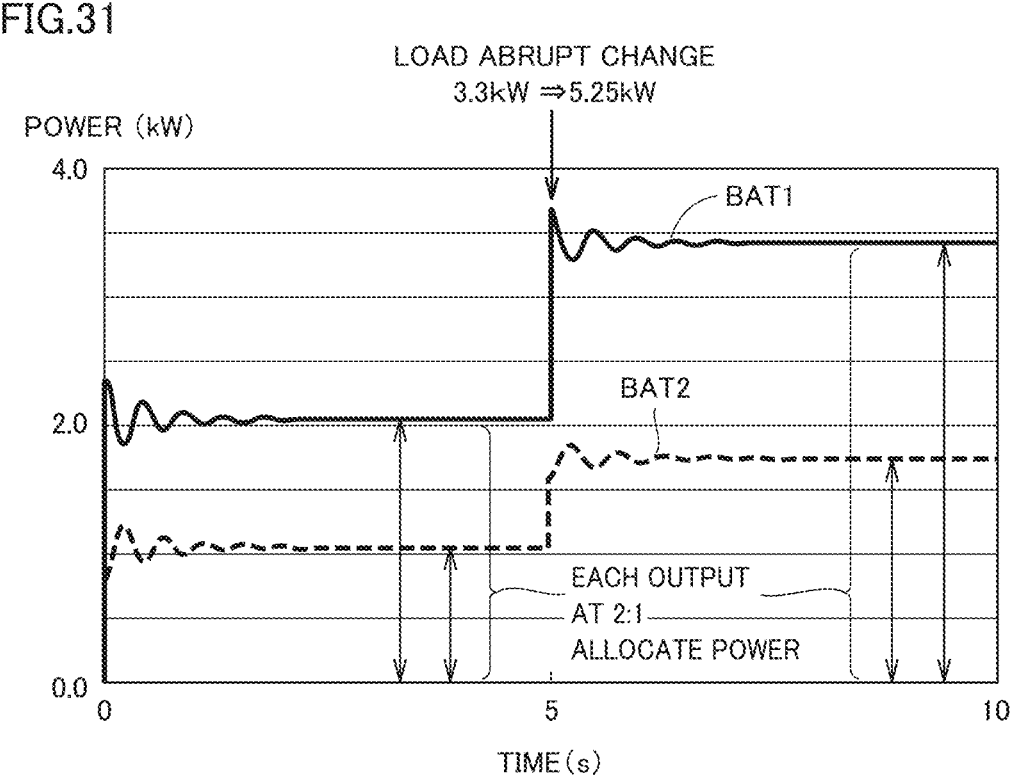
FIG. 31 is a diagram illustrating waveforms of effective values of AC powers output from two power conversion devices illustrated in FIG. 30.

FIG. 31 is a diagram illustrating the waveforms of effective values of AC powers output from two power conversion devices 41 illustrated in FIG. 30. The waveforms in FIG. 31 are those of first and second power conversion devices 41 operated using the control parameters (Tg, Kgd, M, and Dg) generated by virtual synchronous generator control circuit 83 based on the ΔF/ΔP characteristics (solid lines L2 and L4 in the figure) of two power conversion devices 41 illustrated in FIG. 30.

FIG. 31 illustrates the waveform of effective value of AC power output from each power conversion device 41 when the load abruptly changes from 3 kW to 5.25 kW. As illustrated in FIG. 31, either before the load abruptly changes or after the load abruptly changes, the power allocation ratio between first and second power conversion devices 41 is 2:1, indicating that they operate as intended.

As explained above, when a plurality of power conversion devices 41 having static inverters equipped with virtual synchronous generator control are connected to distribution system 24, the ΔF/ΔP characteristic is created for each power conversion device 41, based on the capacity of the static inverter and the power target value. Then, the control parameters of virtual synchronous generator control circuit 83 (FIG. 11) are created using the ΔF/ΔP characteristic, for each power conversion device 41.

With such a configuration, even when the power consumption of load 600 or the generated power of mega-solar plant 26 abruptly changes, the ratio of power output from each power conversion device 41 can be made equal to the ratio of power target value given from CEMS 31. This can prevent, for example, increase of the proportion of the discharge power of storage battery 40 with a smaller discharge power which is set because of a small SOC in the entire discharge power.

In the method of creating a ΔF/ΔP characteristic described in the first embodiment, the reference ΔF/ΔP characteristic of each power conversion device 41 is created, and the ΔF/ΔP characteristic is created in accordance with the power target value, using the created reference ΔF/ΔP characteristic. However, the method is not limited to this. For example, the control parameters (Tg, Kgd, M, Dg) of virtual synchronous generator control circuit 83 may be generated directly based on the capacity of the static inverter, the power target value, and the SOC information of storage battery 40.

(Operation of Power Conversion Device)

Referring now to FIG. 1 to FIG. 41, the operation of the power conversion device according to the first embodiment will be described in detail.

First of all, referring to FIG. 1, distribution system 24 to which the power conversion device according to the first embodiment is applied will be described.

In the first embodiment, distribution system 24 has a plurality of SVRs 23 connected in series between substation 20 and power conversion device 27 (or power conversion device 41a or town 100a) in order that the system voltage supplied from substation 20 is regulated within a prescribed voltage range.

Power conversion device 27 operates as a current source. Power conversion device 41a is installed near power conversion device 27. In the first embodiment, power conversion device 41a operates as a voltage source. Power conversion device 41a can also smooth the generated power of mega-solar plant 26 by executing virtual synchronous generator control.

Examples of the load include towns 100a to 100d, factory 110, and building 112 and apartment house 113. The power supplied from substation 20, the generated power of mega-solar plant 26, and the discharge power of storage battery 40 are supplied to the load. A synchronous generator for emergency is disposed in the factory, and a synchronous generator for emergency is disposed in the building.

Here, the operation of a distributed power source system in distribution system 24 receiving the power supplied from substation 20, the generated power of mega-solar plant 26, and the discharge power of storage battery 40 will now be described.

Figure 32:
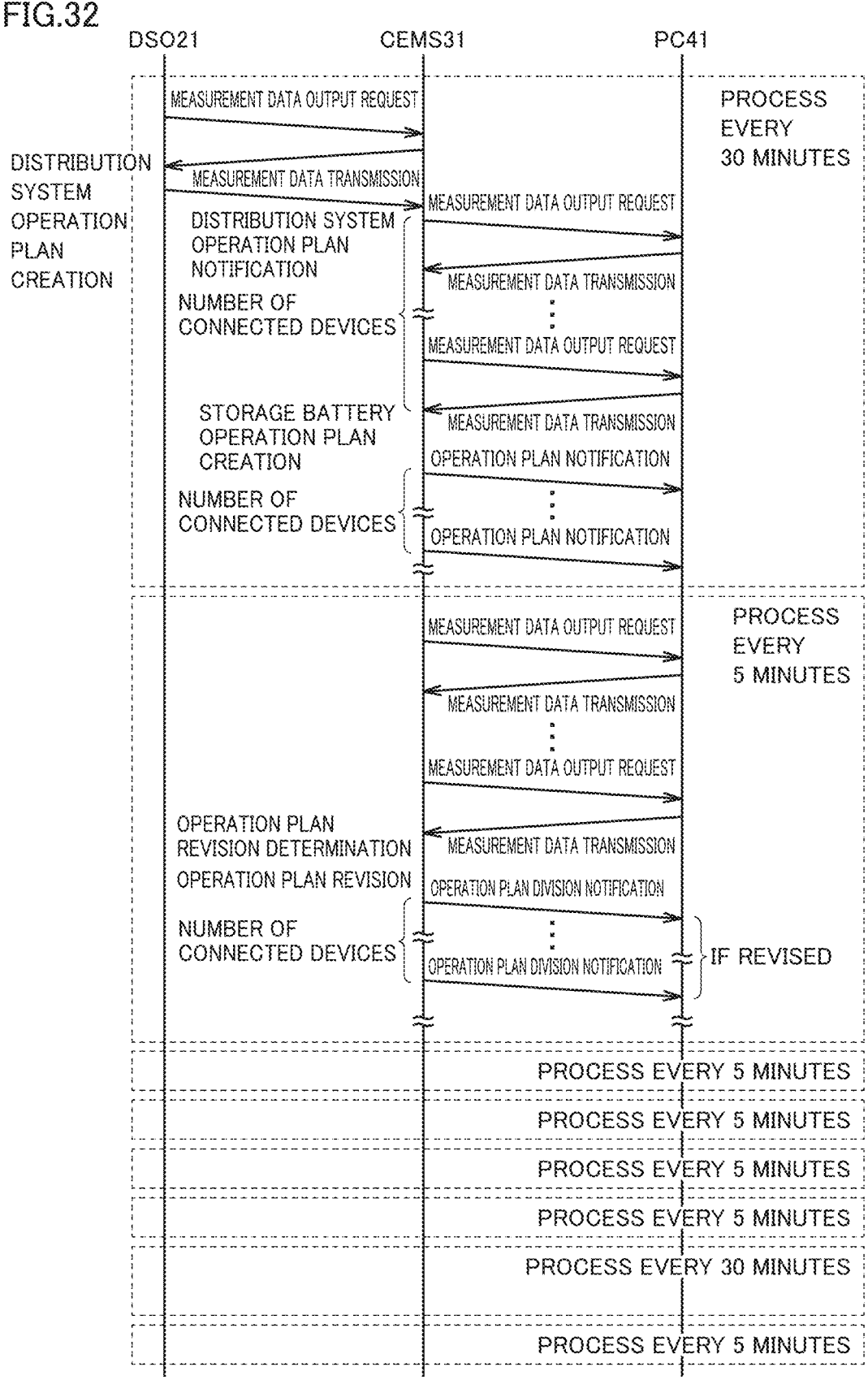
FIG. 32 is a sequence diagram for explaining normal operation of a distributed power source system illustrated in FIG. 1.

FIG. 32 is a sequence diagram for explaining normal operation of the distributed power source system centered on CEMS 31 illustrated in FIG. 1.

As illustrated in FIG. 32, the process in normal times includes a process performed every 30 minutes (hereinafter also referred to as "first process") and a process performed every 5 minutes (hereinafter also referred to as "second process").

Upon start of the first process (process every 30 minutes), DSO 21 requests CEMS 31 to output the collected measurement data through communication line 25. Upon receiving the request from DSO 21, CEMS 31 transmits measurement data including the amount of power consumption of each consumer, the amount of generated power of mega-solar plant 26, and the amount of charge/discharge power and the SOC of storage battery 40 collected for immediate 30 minutes to DSO 21.

Upon receiving the measurement data, DSO 21 creates an operation plan of distribution system 24 based on the measurement data and notifies CEMS 31 of the created operation plan. The operation plan of distribution system 24 includes a power supply plan from substation 20 to distribution system 24 and is necessary for creating an operation plan (charge/discharge plan) of storage battery 40. DSO 21 creates every minutes power supply plans, for 24 hours. The every 30 minutes power supply plan indicates the total amount of power supplied from substation 20 to distribution system 24 for 30 minutes.

Upon receiving the operation plan (power supply plan) from DSO 21, CEMS 31 requests power conversion device 41 to transmit measurement data. The measurement data includes the amount of charge/discharge power and the SOC information of storage battery 40 for immediate 5 minutes. Upon receiving the request from CEMS 31, power conversion device 41 notifies CEMS 31 of measurement data.

CEMS 31 receives measurement data from all power conversion devices 41a to 41c connected to distribution system 24. In doing so, CEMS 31 also collects measurement data such as the amount of power consumption for 30 minutes of each consumer and the amount of generated power of mega-solar plant 26.

Upon completion of collection of measurement data, CEMS 31 creates an operation plan of storage battery 40 and control parameters. The operation plan of storage battery 40 is a charge/discharge plan of storage battery 40 and includes a target value (power target value) of charge/discharge power of storage battery 40. The method of creating an operation plan of storage battery 40 and control parameters will be described later.

Upon completion of creation of an operation plan of storage battery 40 and control parameters, CEMS 31 notifies each power conversion device 41 of the operation plan of the corresponding storage battery 40 and the control parameters and terminates the first process.

Subsequently, CEMS 31 performs the second process (every 5 minutes process). CEMS 31 collects measurement data from each power conversion device 41 every 5 minutes. CEMS 31 detects the deviation between the power target value and the actual charge/discharge power, based on the collected measurement data. When the deviation is equal to or greater than a predetermined threshold, CEMS 31 recalculates an operation plan (power target value) of storage battery 40 and notifies each power conversion device 41 of the recalculation result. A specific method of recalculation will be described later.

(Operation of CEMS 31)

Figure 33:
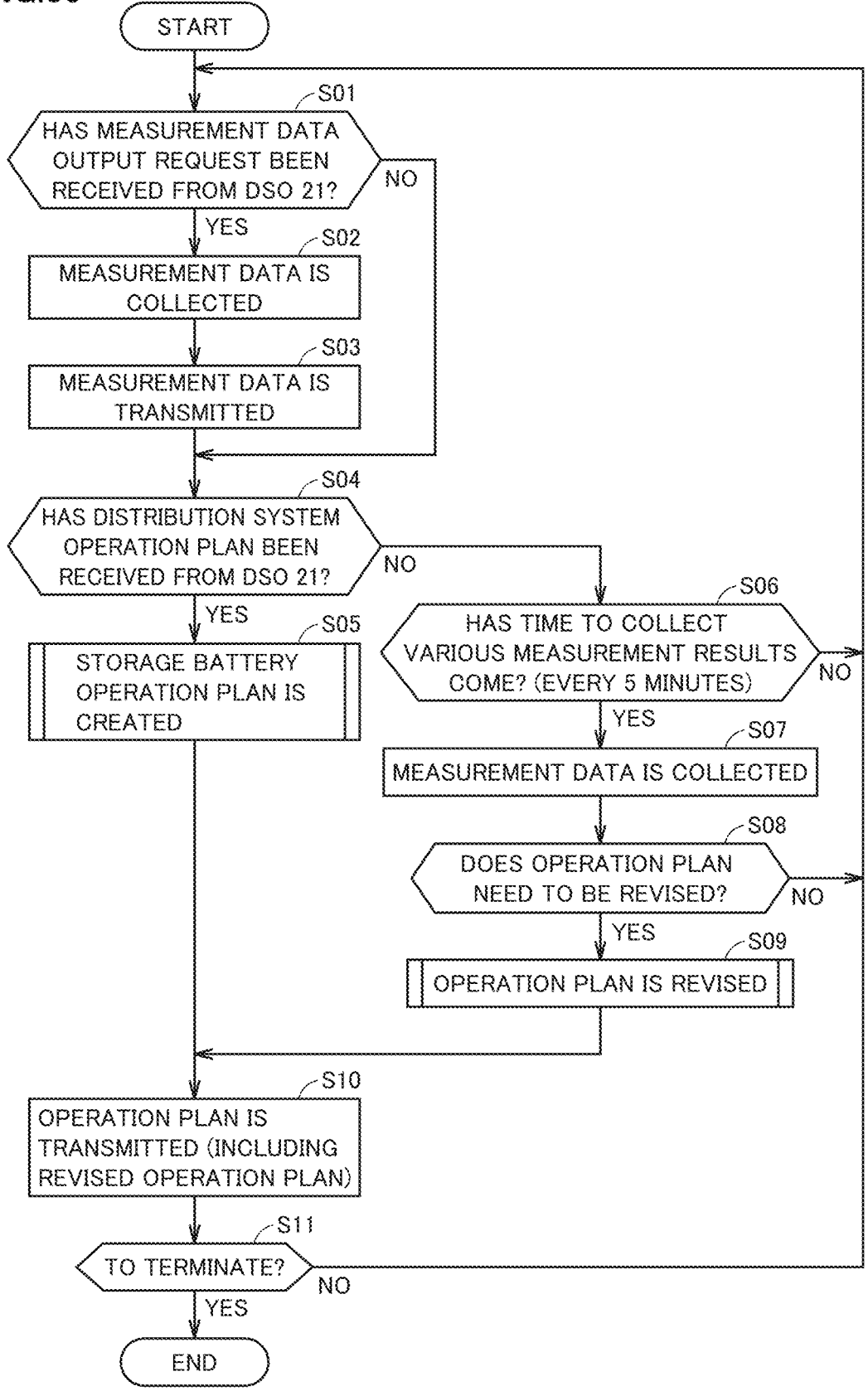
FIG. 33 is a flowchart illustrating a control process of the CEMS.

Referring now to FIG. 33, the detailed operation of CEMS 31 will be described. FIG. 33 is a flowchart illustrating the control process of CEMS 31 illustrated in FIG. 1. As illustrated in FIG. 33, upon start of the process, at step (hereinafter abbreviated as S) 01, CEMS 31 confirms whether an output request of measurement data has been received from DSO 21. If an output request has been received (YES at S01), at S02, CEMS 31 collects measurement data from a plurality of power conversion devices 41. At S03, CEMS 31 notifies DSO 21 of the measurement data stored in memory circuit 12, through communication circuit 11.

On the other hand, if an output request has not been received from DSO 21 (NO at S01) or if measurement data has been transmitted to DSO 21 at S03, CEMS 31 proceeds to S04 and confirms whether an operation plan (power supply plan) has been received from DSO 21. If an operation plan has been received (YES at S04), CEMS 31 proceeds to S05 and creates an operation plan (charge/discharge plan) of storage battery 40.

Figure 34:
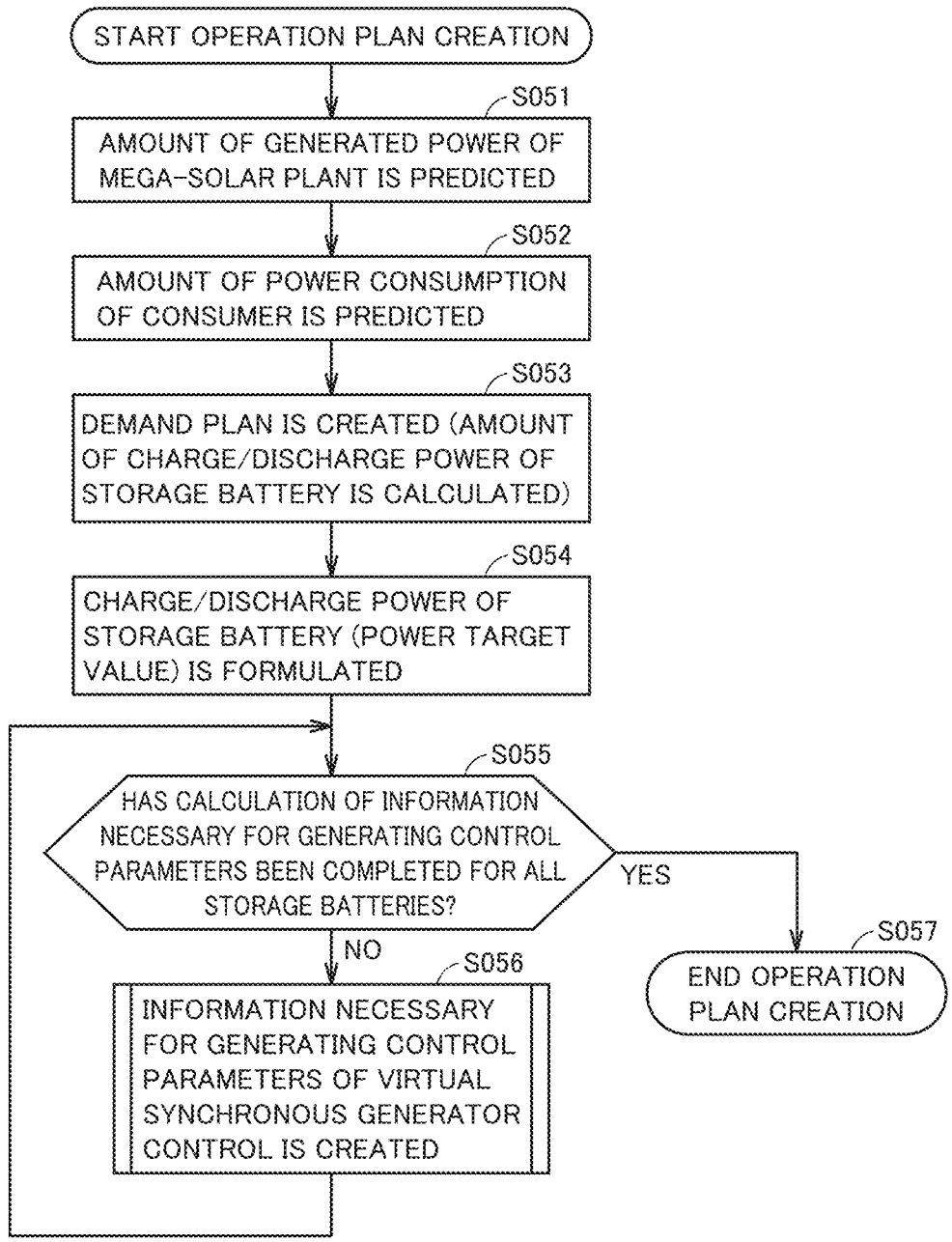
FIG. 34 is a flowchart illustrating a process of creating a storage battery operation plan (S05 in FIG. 33).

FIG. 34 is a flowchart illustrating a process of creating an operation plan of storage battery 40 (S05 in FIG. 33).

As illustrated in FIG. 34, upon start of the process, at S051, CEMS 31 predicts the amount of generated power of mega-solar plant 26. Specifically, returning to FIG. 3 and FIG. 4, upon receiving an operation plan from DSO 21, control circuit 16 (FIG. 3) instructs second management circuit 146 (FIG. 4) in operation plan creating circuit 14 to create an operation plan. Upon receiving the instruction from control circuit 16, second management circuit 146 instructs power generation predicting circuit 142 to predict the generated power of mega-solar plant 26, via storage battery operation plan creating circuit 141.

Upon receiving the instruction from second management circuit 146, power generation predicting circuit 142 accesses a weather forecast server on the Internet not shown to acquire a weather forecast for 24 hours from the present to 24 hours later. Power generation predicting circuit 142 predicts the amount of generated power for 24 hours from the present to 24 hours later, using the acquired weather forecast for 24 hours and data stored in a database (not shown) for the amount of generated power prediction managed by power generation predicting circuit 142. The database for the amount of generated power prediction is constructed based on the history of the amount of generated power of mega-solar plant 26 collected every 30 minutes, and weather history information. Description of the method of constructing the database is omitted.

Upon predicting the amount of generated power at S051, at S052, CEMS 31 predicts the power consumption of consumers. Specifically, returning to FIG. 4, upon receiving the prediction result of the amount of generated power of mega-solar plant 26 from power generation predicting circuit 142, second management circuit 146 instructs power consumption predicting circuit 143 to predict the power consumption of consumers, via storage battery operation plan creating circuit 141.

Upon receiving the instruction from second management circuit 146, power consumption predicting circuit 143 predicts the amount of power consumption of consumers for 24 hours from the present to 24 hours later, using data stored in a database for power consumption prediction (not shown) managed by power consumption predicting circuit 143. The database for power consumption prediction is constructed by processing the power consumption of consumers collected every 30 minutes, based on date, time information, and weather information. Description of the method of constructing the database is omitted.

Upon predicting the amount of power consumption of consumers at S052, at S053, CEMS 31 creates a demand plan. Specifically, returning to FIG. 4, upon receiving the prediction result of the amount of power consumption of consumers from power consumption predicting circuit 143, storage battery operation plan creating circuit 141 calculates the total of the amount of charge/discharge power for every 30 minutes of storage batteries 40a to 40c, based on the prediction result of the amount of generated power of mega-solar plant 26 by power generation predicting circuit 142, the prediction result of the amount of power consumption of consumers by power consumption predicting circuit 143, and the operation plan (power supply plan for every 30 minutes) given from DSO 21.

Upon creating a demand plan at S053, at S054, CEMS 31 formulates the charge/discharge power (power target value) of storage batteries 40a to 40c. Specifically, returning to FIG. 3 and FIG. 4, storage battery operation plan creating circuit 141 allocates the charge/discharge power for every 30 minutes of each storage battery 40, based on the SOC information and the storage battery capacity of storage batteries 40a to 40c collected in memory circuit 12 through communication circuit 11.

In the first embodiment, in creating an operation plan of storage battery 40 for 24 hours, CEMS 31 formulates the charge/discharge power of each storage battery 40 such that the SOC of storage batteries 40a to 40c becomes zero simultaneously or storage batteries 40a to 40c become a fully-charged state substantially simultaneously when they are in the charge mode.

The reason for this is as follows. For example, a case where clouds move across above mega-solar plant 26 and the generated power of mega-solar plant 26 decreases from 10 MW to 4 MW for about 5 minutes will be discussed. It is assumed that the capacities of the static inverters of power conversion devices 41a to 41c are 8 MW, 4 MW, and 2 MW, respectively.

Here, it is assumed that power conversion devices 41b and 41c are notified of the operation plan of the storage battery such that the SOC of storage battery 40a first becomes zero and stops discharging and then the remaining storage batteries 40b and discharge 1 MW and 0.5 MW, respectively. When the generated power of mega-solar plant 26 decreases by 6 MW due to sudden change in solar radiation, the virtual synchronous generator control allows for additional outputs of merely 3 MW and 1.5 MW as the discharge powers of storage batteries 40b and 40c, respectively, and therefore a deficit of 6 MW is unable to be compensated for.

On the other hand, when storage batteries 40a to 40c are operating, discharge up to 14 MW (=8 MW+4 MW+2 MW) is possible and the power range that the virtual synchronous generator control can compensate for is extended. Thus, when an operation plan (charge/discharge plan) of storage battery 40 is created in CEMS 31, it is necessary to create an operation plan such that the SOC of storage batteries 40a to 40c becomes zero or becomes full substantially simultaneously.

If the charge/discharge power (power target value) of storage batteries 40a to is formulated at S054, at S055, CEMS 31 confirms whether information necessary for generating control parameters of virtual generator control has been created for all of storage batteries 40a to 40c. If generation of information has not been finished for all of storage batteries 40a to 40c (NO at S055), CEMS 31 proceeds to S056 and generates information necessary for generating control parameters of virtual generator control.

Figure 35:
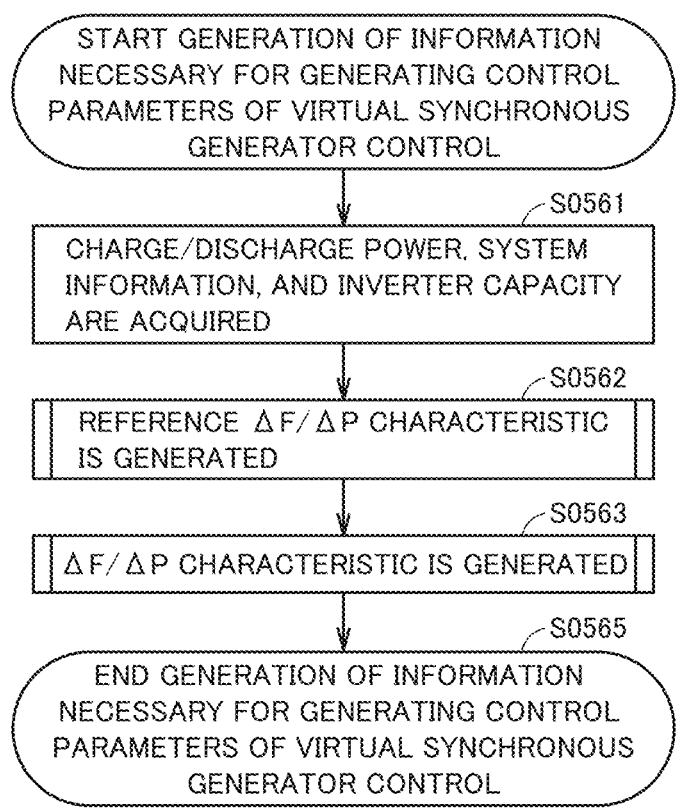
FIG. 35 is a flowchart illustrating a process of generating information necessary for generating control parameters of virtual synchronous generator control (S056 in FIG. 34).

FIG. 35 is a flowchart illustrating a process of generating information necessary for generating control parameters of virtual synchronous generator control (S056 in FIG. 34). The process illustrated in FIG. 35 is executed by control parameter generating circuit 13 (FIG. 5) in CEMS 31.

As illustrated in FIG. 35, upon start of the process, at S0561, control circuit 136 (FIG. 5) collects the power target value of storage battery 40 for the next 30 minutes generated by storage battery operation plan creating circuit 141 at S054 in FIG. 34, the capacity of second DC/AC converter 408 (static inverter) in power conversion device 41, and information on distribution system 24. The information on distribution system 24 includes the upper limit and the lower limit of the system frequency, and response performance of virtual synchronous generator control circuit 83 (FIG. 11).

The upper limit of the system frequency is reference frequency Fref (for example, 60 Hz)+ΔFmax, and the lower limit of the system frequency is Fref−ΔFmax.

Upon completion of information collection at S0561, at S0562, reference ΔF/ΔP characteristic calculating circuit 131 calculates the reference ΔF/ΔP characteristic for each power conversion device 41. The reference ΔF/ΔP characteristic will be described below.

When control parameters of power conversion device 41 equipped with virtual synchronous generator control are generated, the reference ΔF/ΔP characteristic of the static inverter is first calculated. In the first embodiment, a configuration for generating control parameters for power conversion device 41 is described. However, the control parameters can be generated using the same method for a power conversion device capable of adjusting its output, such as a wind generator, equipped with virtual synchronous generator control.

Specifically, as illustrated in FIG. 27, in the discharge mode of storage battery reference ΔF/ΔP characteristic calculating circuit 131 (FIG. 5) sets the power target value to half the capacity of the static inverter and determines the reference ΔF/ΔP characteristic such that the frequency of AC voltage when the static inverter discharges the maximum power is equal to the lower limit frequency (in FIG. 27, differential frequency ΔF=−ΔFmax) and that the frequency of AC voltage when the discharge power of the static inverter is zero is equal to the upper limit frequency (in FIG. 27, ΔF=ΔFmax).

On the other hand, in the charge mode of storage battery 40, the power target value is set to half the capacity of the static inverter, and the reference ΔF/ΔP characteristic is determined such that the frequency of AC voltage when the static inverter charges the maximum power is the upper limit frequency (ΔF=ΔFmax) and the frequency of AC voltage when the charge power of the static inverter is zero is equal to the lower limit frequency (ΔF=−ΔFmax).

In the charge/discharge mode of storage battery 40, the power target value of the static inverter is set to zero, and the reference ΔF/ΔP characteristic is determined such that the frequency of AC voltage when the static inverter discharges the maximum power is equal to the lower limit frequency (ΔF=−ΔFmax) and the frequency of AC voltage when the static inverter charges the maximum power is equal to the upper limit frequency (ΔF=ΔFmax).

Figure 36:
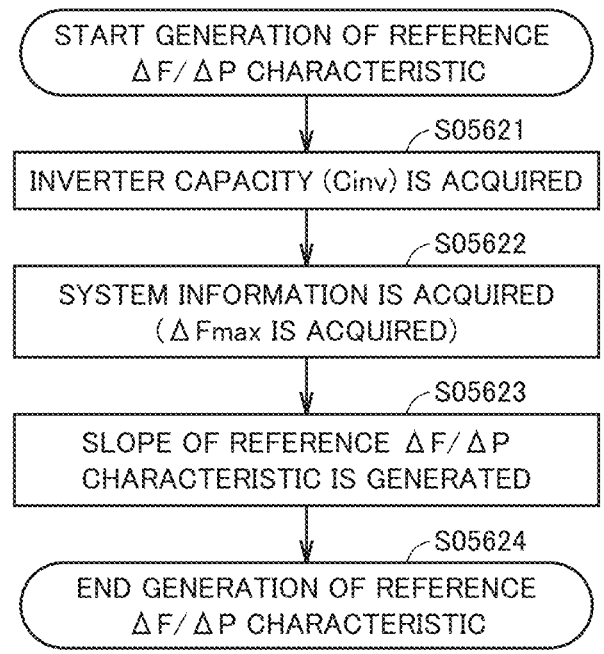
FIG. 36 is a flowchart illustrating a process of generating a reference ΔF/ΔP characteristic (S0562 in FIG. 35).

FIG. 36 is a flowchart illustrating a process of generating a reference ΔF/ΔP characteristic (S0562 in FIG. 35).

As illustrated in FIG. 36, upon start of the process, at S05621, reference ΔF/ΔP characteristic calculating circuit 131 (FIG. 5) collects capacity information (Cinv) of the target static inverter from control circuit 136.

Upon collecting the capacity information of the static inverter, at S05622, reference ΔF/ΔP characteristic calculating circuit 131 collects system information (ΔFmax). Then, at S05623, reference ΔF/ΔP characteristic calculating circuit 131 obtains the slope of the reference ΔF/ΔP characteristic, using the inverter capacity Cinv and ΔFmax.

Specifically, when storage battery 40 is in the charge mode or the discharge mode, reference ΔF/ΔP characteristic calculating circuit 131 sets the slope of the reference ΔF/ΔP characteristic to −ΔFmax/(Cinv×0.5). On the other hand, when storage battery 40 is in the charge/discharge mode, the slope of the reference ΔF/ΔP characteristic is set to −ΔFmax/Cinv.

Which of the reference ΔF/ΔP characteristic in the discharge mode (or charge mode) and that in the charge/discharge mode is employed is determined by storage battery operation plan creating circuit 141 (FIG. 4), based on the formulation result of charge/discharge power of storage battery 40 in the demand plan created at S053 in FIG. 34. Specifically, when the absolute value of the formulated charge/discharge power is smaller than a predetermined value, storage battery operation plan creating circuit 141 employs the charge/discharge mode. The employed mode is applied to all of the power conversion devices 41 connected to distribution system 24.

Returning to FIG. 35, upon calculation of the reference ΔF/ΔP characteristic at S0562, at S0563, ΔF/ΔP characteristic calculating circuit 132 (FIG. 5) generates a ΔF/ΔP characteristic. Specifically, reference ΔF/ΔP characteristic calculating circuit 131 outputs the generated slope of the reference ΔF/ΔP characteristic to control circuit 136 and ΔF/ΔP characteristic calculating circuit 132.

Figure 37:
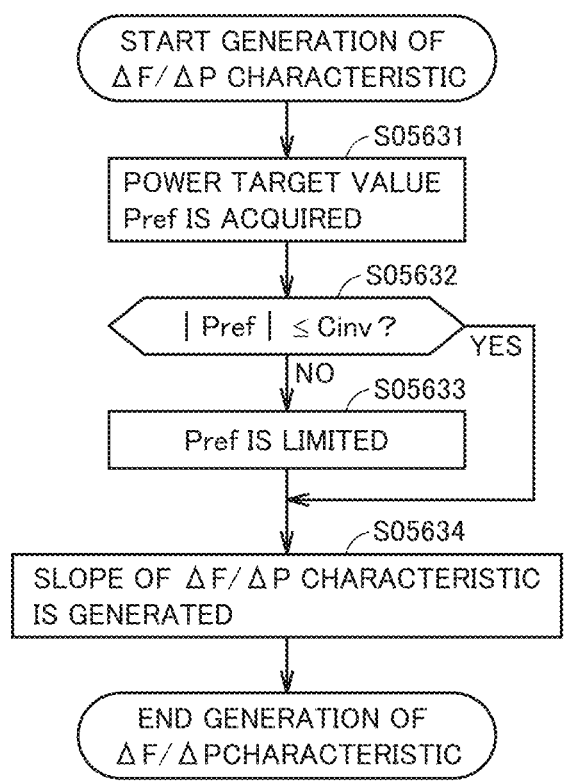
FIG. 37 is a flowchart illustrating a process of generating a ΔF/ΔP characteristic (S0563 in FIG. 35).

ΔF/ΔP characteristic calculating circuit 132 calculates the ΔF/ΔP characteristic, based on the power target value applied from control circuit 136. FIG. 37 is a flowchart illustrating a process of generating a ΔF/ΔP characteristic (S0563 in FIG. 35). As illustrated in FIG. 37, upon start of the process, at S05631, ΔF/ΔP characteristic calculating circuit 132 collects power target value Pref from control circuit 136. At S05632, ΔF/ΔP characteristic calculating circuit 132 determines whether the magnitude of the collected power target value Pref does not exceed static inverter capacity Cinv.

If the magnitude of power target value Pref exceeds static inverter capacity Cinv (NO at S05632), at S05633, ΔF/ΔP characteristic calculating circuit 132 allows a limiter to limit power target value Pref to static inverter capacity Cinv.

At S05634, ΔF/ΔP characteristic calculating circuit 132 obtains the slope of the ΔF/ΔP characteristic using power target value Pref. Specifically, when storage battery is in the discharge mode or the charge mode, the slope of the ΔF/ΔP characteristic is set to the slope of reference ΔF/ΔP characteristic×(Cinv×0.5)/Pref. On the other hand, when storage battery 40 is in the charge/discharge mode, assuming that fluctuations in generated power of renewable energy such as mega-solar plant 26 or wind power generation are absorbed (the power target value is zero), the ΔF/ΔP characteristic that depends only on the static inverter capacity, that is, the reference ΔF/ΔP characteristic obtained at S0562 in FIG. 35 is used as it is. In the first embodiment, a case where the slope of the ΔF/ΔP characteristic, system information (±ΔFmax, etc.), and power target value Pref are used as information necessary for generating control parameters of virtual synchronous generator control will be described.

Upon generation of ΔF/ΔP characteristic at S0563 in FIG. 35, returning to S055 in FIG. 34, control parameter generating circuit 13 confirms whether calculation of information necessary for generating control parameters has been completed for all the power conversion devices 41 connected to distribution system 24. If calculation of the information has not been completed for all of the power conversion devices 41 (NO at S055), information necessary for generating control parameters for the next power conversion device 41 is calculated. If calculation of the information has been completed for all of the power conversion devices 41 (YES at S055), control parameter generating circuit 13 terminates the process of creating an operation plan of storage battery 40 (S05 in FIG. 33).

At S05 in FIG. 33, upon completion of the process of creating an operation plan of storage battery 40, storage battery operation plan creating circuit 141 (FIG. 4) notifies first management circuit 145 (FIG. 4) of the created operation plan (power target value), via second management circuit 146. Upon receiving the operation plan, first management circuit 145 stores the received operation plan into a memory and notifies transmission data generating circuit 15 (FIG. 3). Control parameter generating circuit 13 notifies transmission data generating circuit 15 of the generated information.

Upon acquiring the operation plan (power target value) of storage battery 40 and the information necessary for generating control parameters, transmission data generating circuit 15 processes them into a transmission format and outputs the processed data to communication circuit 11 (FIG. 3). Upon receiving the transmitted data from transmission data generating circuit 15, communication circuit 11 transmits the transmitted data to the corresponding power conversion device 41 through communication line 25.

Upon completion of transmission of the operation plan and information necessary for generating control parameters to all of power conversion devices 41 at S10 in FIG. 33, at S11, it is confirmed whether to stop CEMS 31. If CEMS 31 is to be stopped (YES at S11), the process ends. On the other hand, if CEMS 31 is not to be stopped (NO at S11), the process returns to S01.

On the other hand, if an operation plan (power supply plan) is not received from DSO 21 at S04 in FIG. 33 (NO at S04), CEMS 31 proceeds to S06 and confirms whether the time to collect various measurement data has come. In the first embodiment, CEMS 31 collects measurement data every 5 minutes as described above. If the time to collect measurement data has not yet come (NO at S06), the process returns to S01. On the other hand, if the time to collect measurement data has come (YES at S06), at S07, CEMS 31 collects measurement data. In the first embodiment, CEMS 31 collects the amount of charge/discharge power of storage battery 40 for 5 minutes, the charge/discharge power at present, and the SOC information, as measurement data, from each of power conversion devices 41a to 41c.

Upon collecting measurement data at S07, at S08, CEMS 31 confirms whether the operation plan of storage battery 40 needs to be revised. At S07, CEMS 31 compares the charge/discharge power at present with the operation plan (power target value), for each of a plurality of storage batteries 40. Specifically, CEMS 31 confirms whether the power difference between the charge/discharge power at present and the power target value exceeds a prescribed range and whether the SOC of storage battery exceeds a predetermined permissible range. If the power difference exceeds a prescribed range in any one storage battery 40 among a plurality of storage batteries 40 and/or if the SOC exceeds a permissible range, CEMS 31 reviews the operation plans of all of storage batteries 40. The operation plan of storage battery 40 in which the power difference exceeds a prescribed range and/or the SOC exceeds a permissible range may be reviewed.

CEMS 31 confirms whether the operation plan of storage battery 40 needs to be revised in this manner, and, if it is determined that the operation plan of storage battery does not need to be revised (NO at S08), returns to S01 to continue the process. On the other hand, if it is determined that the operation plan of storage battery 40 needs to be revised (YES at S08), CEMS 31 proceeds to S09 and revises the operation plans of all of storage batteries 40.

Figure 38:
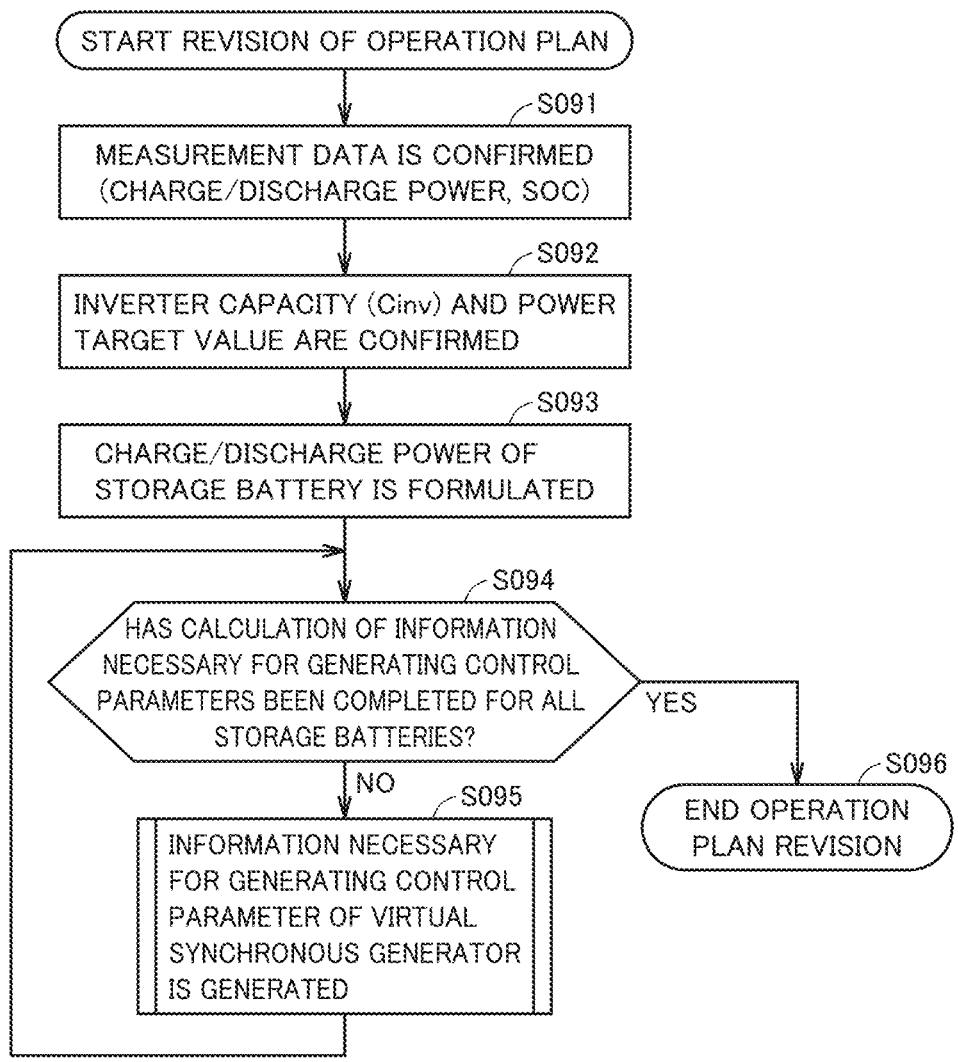
FIG. 38 is a flowchart illustrating a process of revising a storage battery operation plan (S09 in FIG. 33).

FIG. 38 is a flowchart illustrating a process of revising the operation plan of storage battery 40 (S09 in FIG. 33). The process illustrated in FIG. 38 is executed by operation plan creating circuit 14 (FIG. 3) in CEMS 31.

As illustrated in FIG. 38, upon start of the process, at S091, second management circuit 146 (FIG. 4) instructs storage battery operation plan correcting circuit 144 (FIG. 4) to revise the operation plan and transfers the charge/discharge power and the SOC information collected from each power conversion device 41.

At S092, second management circuit 146 also outputs the operation plan of storage battery 40 (power target value) stored in first management circuit 145 (FIG. 4) and the capacity of the static inverter of power conversion device 41 stored in memory circuit 12 to storage battery operation plan correcting circuit 144.

Storage battery operation plan correcting circuit 144 reviews the operation plan of storage battery 40, based on information applied from second management circuit 146. For example, a case where the output power of power conversion device 41 is twice the power target value because the predicted value of the amount of generated power of mega-solar plant 26 and the predicted value of the amount of power consumption of each consumer fall out of the actual values will be discussed.

In such a case, it is assumed that the system frequency decreases to the vicinity of the lower limit (Fref−ΔFmax). If power deficiency further increases, the system frequency may reach the lower limit and power may not be supplied anymore from power conversion device 41.

Then, in the first embodiment, when the ratio between the power target value and the charge/discharge power does not fall within a prescribed range, storage battery operation plan correcting circuit 144 revises the operation plan (power target value) of storage battery 40, based on the measurement data collected every 5 minutes. Specifically, storage battery operation plan correcting circuit 144 revises the operation plan of storage battery 40 based on the charge/discharge power and the SOC information at present.

Here, the reason why the SOC is used in revising the operation plan of storage battery 40 is as follows. When a lithium ion battery is used as storage battery 40, storage battery 40 may be broken or suddenly deteriorate due to overcharge or overdischarge. In normal control of a storage battery, therefore, when the SOC exceeds 90%, for example, the charge mode of the storage battery is switched from a constant current charge mode to a constant voltage charge mode. In the constant voltage charge mode, since a large charge power is unable to be set, it is necessary to reduce the power target value in virtual synchronous generator control. Similarly, since deterioration of storage battery 40 also proceeds in the case of overdischarge, it is necessary to limit the discharge power, for example, at the point of time when the SOC becomes below 5%. This is why the SOC is used in creating and revising the operation plan of storage battery 40.

When a lead-acid battery is used as storage battery 40, it is resistant to overcharge but may deteriorate due to overdischarge. In the case of a lead-acid battery, it is therefore necessary to limit the discharge power, for example, at the point of time when the SOC becomes below 20%. As described above, the power target value is revised using the SOC in order to suppress deterioration of the storage battery used.

Specifically, storage battery operation plan correcting circuit 144 creates the operation plan of storage battery 40 based on the charge/discharge power at present, but creates the operation plan of storage battery 40 based on the charge/discharge power and the SOC at present, in charging when the SOC is in the vicinity of the upper limit and in discharging when the SOC is in the vicinity of the lower limit. Specifically, when the SOC is near the upper limit, the charge power target value is limited, and when the SOC is near the lower limit, the discharge power target value is limited.

Upon revision of the operation plan (power target value) of storage battery 40 at S093, at S094, control parameter generating circuit 13 (FIG. 3) confirms whether calculation of information necessary for generating control parameters has been completed for all of storage batteries 40. If calculation of information necessary for generating control parameters has been completed for all of storage batteries 40 (YES at S094), storage battery operation plan correcting circuit 144 terminates the process of revising the operation plan of storage battery 40. On the other hand, if revision of the operation plan has not been completed for all of storage batteries 40 (NO at S094), at S095, control parameter generating circuit 13 generates information necessary for generating control parameters of virtual synchronous generator control. The method of generating information necessary for control parameters of virtual synchronous generator control is similar to the generation method used in the process of creating the operation plan of storage battery 40 as described above (at S056 in FIG. 34 and FIG. 35) and will not be further elaborated.

Upon generating information necessary for generating control parameters at S095, returning to S094, control parameter generating circuit 13 conforms whether calculation of information necessary for generating control parameters has been completed for all of power conversion devices 41. If calculation of information necessary for generating control parameters has not been completed for all of power conversion devices 41 (NO at S094), at S095, control parameter generating circuit 13 generates information necessary for generating control parameters for the next power conversion device 41.

On the other hand, if calculation of information necessary for generating control parameters has been completed for all of power conversion devices 41 (YES at S094), at S096, storage battery operation plan correcting circuit 144 terminates the process of revising the operation plan of storage battery 40.

Returning to FIG. 33, upon revising the operation plan of storage battery 40 at S09, storage battery operation plan creating circuit 141 notifies first management circuit 145 of the revised operation plan (power target value) via second management circuit 146, in the same manner as when the operation plan is created.

Upon acquiring the operation plan of storage battery 40 from storage battery operation plan creating circuit 141, first management circuit 145 stores the acquired operation plan into a not-shown memory and notifies transmission data generating circuit 15. Similarly, control parameter generating circuit 13 notifies transmission data generating circuit 15 of the operation plan of storage battery 40 and the information necessary for generating control parameters.

Upon receiving the operation plan of storage battery 40 and the information necessary for generating control parameters, transmission data generating circuit 15 processes them into a transmission format and outputs the processed data to communication circuit 11.

Upon receiving the transmitted data from transmission data generating circuit communication circuit 11 transmits the transmitted data to the corresponding power conversion device 41 through communication line 25 (at S10 in FIG. 33).

Upon completion of transmission of the operation plan of storage battery 40 to all of power conversion devices 41 at S10 in FIG. 33, at S11, it is confirmed whether to stop CEMS 31. If CEMS 31 is to be stopped (YES at S11), the process ends. On the other hand, if CEMS 31 is not to be stopped, the process returns to S01 and continues.

As described above, in the first embodiment, when the operation plan (power target value) of storage battery 40 is created for power conversion device 41, information necessary for control parameters of virtual synchronous generator control implemented in the static inverter is generated based on the capacity of the static inverter of each power conversion device 41 and the power target value. With this process, a power excess/deficit can be shared at the same allocation ratio as in the operation plan (power target value) of storage battery 40 even when the power consumption of load 600 or the generated power of an energy creation device such as mega-solar plant 26 fluctuates in a period until notification of the next operation plan is given from CEMS 31.

Therefore, for example, when the solar radiation changes immediately after all of power conversion devices 41 are notified of the operation plans and the generated power of mega-solar plant 26 decreases by 50%, the deficient power of 50% is allocated based on the ratio of power target value calculated at the time of creating the operation plan. For example, at the time of creating the operation plan, the charge/discharge power of each storage battery 40 is formulated such that the SOC of all of storage batteries 40 becomes zero substantially simultaneously when the power target value is controlled in accordance with the ratio. In this case, even when the generated power of mega-solar plant 26 decreases by 50%, the SOC of all of storage batteries 40 can be controlled to become zero substantially simultaneously because the power excess/deficit is allocated based on the ratio of power target value.

In the first embodiment, when information necessary for generating control parameters of virtual synchronous generator control is generated for the static inverter of power conversion device 41, the inverter capacity and the power target value are used for calculation. However, embodiments are not limited to this configuration. When the ratio of the capacity of storage battery 40 to the inverter capacity varies among power conversion devices 41, for example, when the capacity of storage battery 40a is twice as large as the inverter capacity of power conversion device 41a and the capacity of storage battery 40b is three times as large as the inverter capacity of power conversion device 41b, the operation plan (power target value) of each storage battery is generated in consideration of the ratio of capacity. Alternatively, the capacity ratio is considered in generating control parameters to achieve similar effects.

(Operation of Power Conversion Device 27 and Power Conversion Device 41)

Referring now to FIG. 6 to FIG. 41, the operation of power conversion device 27 for a mega-solar plant and power conversion device 41 for a storage battery will be described.

[Operation of Power Conversion Device 27]

Referring to FIG. 6, the operation of power conversion device 27 for a mega-solar plant will be described.

When mega-solar plant 26 starts power generation, the DC voltage input from mega-solar plant 26 to first DC/DC converter 203 in power conversion device 27 increases. First control circuit 204 monitors the DC voltage measured by voltmeter 201. When the DC voltage exceeds a prescribed voltage value, first control circuit 204 allows power conversion device 27 to make a transition from a standby state to normal operation.

Upon transition to normal operation, second control circuit 209 in power conversion device 27 controls first DC/AC converter 208. The control of power conversion device 27 in normal operation will be described below.

Referring to FIG. 6, first control circuit 204 confirms whether mega-solar plant 26 is generating power. Specifically, first control circuit 204 confirms whether the output voltage of mega-solar plant 26 measured by voltmeter 201 exceeds a prescribed voltage. When the output voltage exceeds a prescribed voltage, first control circuit 204 notifies second control circuit 209 that mega-solar plant 26 can generate power.

Upon receiving the notification from first control circuit 204, second control circuit 209 confirms whether power is supplied from substation 20 to distribution system 24 (whether distribution system 24 is not blacked out), based on the AC voltage of distribution system 24 measured by voltmeter 10.

If it is confirmed that the AC voltage measured by voltmeter 210 is equal to or higher than a prescribed voltage and that distribution system 24 is not blacked out, second control circuit 209 starts DC/AC converter 208 and instructs first control circuit 204 to start power generation of mega-solar plant 26.

In the first embodiment, a case where the DC bus voltage of DC bus 205 is managed by first DC/AC converter 208 in normal operation will be described. In the first embodiment, the entire distributed power source management device is operated by managing regenerative power from power conversion device 27 to distribution system 24 by current control by first DC/AC converter 208.

Upon an instruction to start power generation of mega-solar plant 26 by second control circuit 209, fifth control circuit 54 (FIG. 8) in first control circuit 204 instructs MPPT control circuit 51 (FIG. 8) to start maximum power point tracking control of mega-solar plant 26.

The maximum power point tracking control will be described briefly. In the maximum power point tracking control, whether the last command value is increased or decreased from the power command value before last is managed. Then, the generated power of mega-solar plant 26 measured this time is compared with the generated power of mega-solar plant 26 measured last time, and if the power generation increases, the command value is changed in the same direction as the last time (increasing direction or decreasing direction).

Specifically, if the generated power of mega-solar plant 26 measured this time increases from the power generation measured last time, and when the last command value is greater than the command value before last, the command value this time is increased. On the other hand, when the last command value is smaller than the command value before last, the command value this time is decreased. Conversely, if the generated power of mega-solar plant 26 measured this time decreases from the power generation measured last time, and when the last command value is greater than the command value before last, the command value this time is decreased. On the other hand, when the last command value is smaller than the command value before last, the command value this time is increased. The command value this time is controlled in this manner, whereby mega-solar plant 26 is controlled such that the output power is maximized.

First DC/DC converter 203 allows a step-up circuit contained therein to operate in accordance with a command value output from first control circuit 204 to convert a first DC voltage output from mega-solar plant 26 into a second DC voltage (DC bus voltage of DC bus 205) and output the second DC voltage.

Upon start of supply of generated power of mega-solar plant 26 from first DC/DC converter 203, second control circuit 209 controls first DC/AC converter 208 to output (regenerate) the generated power of mega-solar plant 26 to distribution system 24. Specifically, the DC bus voltage of DC bus 205 is monitored, and when the DC bus voltage exceeds a control target value, the generated power is output in synchronization with the AC voltage supplied from distribution system 24.

Referring now to FIG. 9, the operation of second control circuit 209 will be described.

In second control circuit 209, phase detecting circuit 61 detects a zero cross point in the waveform of AC voltage of distribution system 24 measured by voltmeter 210 (FIG. 1).

First sine wave generating circuit 62 generates a reference sine wave synchronized with the waveform of AC voltage of distribution system 24, based on information indicating the zero cross point detected by phase detecting circuit 61 and the waveform of AC voltage measured by voltmeter 210. First sine wave generating circuit 62 outputs the generated reference sine wave to multiplier 65.

Voltmeter 206 measures the voltage on DC bus 205 and outputs the measurement value to subtractor 63 in current control circuit 60 and sixth control circuit 67. Current control circuit 60 uses a control method (current control) that outputs a power in synchronization with the AC system voltage. This control method is a common control method for power conversion devices for photovoltaic power generation installed in households.

Sixth control circuit 67 stores a target voltage of DC bus 205 and outputs the target voltage to subtractor 63.

Current control circuit 60 controls current output by first DC/AC converter 208 such that the DC bus voltage measured by voltmeter 206 attains a target voltage. The output of subtractor 63 is input to first PI control circuit 64. First PI control circuit 64 performs PI control such that the output of subtractor 63 becomes zero. The output of first PI control circuit 64 is input to multiplier 65 and multiplied by the reference sine wave from first sine wave generating circuit 62 to be converted into a current command value.

The current command value output from multiplier 65 is input to subtractor 66. Subtractor 66 calculates the deviation between the current command value and the AC current value of distribution system 24 measured by ammeter 211 and inputs the calculated deviation to second PI control circuit 68.

Second PI control circuit 68 performs PI control such that the deviation output from subtractor 66 becomes zero. First PWM converter 69 generates a command value of first DC/AC converter 208 by executing PWM control on the output of second PI control circuit 68. First DC/AC converter 208 outputs AC current in accordance with the command value applied from first PWM converter 69.

When the AC voltage (AC effective voltage) measured by voltmeter 210 exceeds a prescribed voltage value or when a request to suppress the generated power of mega-solar plant 26 is given from CEMS 31, fifth control circuit 54 (FIG. 8) in first control circuit 204 switches the control of mega-solar plant 26 from MPPT control to voltage control. Specifically, fifth control circuit 54 controls the DC voltage output from mega-solar plant 26 such that the AC voltage (AC effective voltage) measured by voltmeter 210 falls within a prescribed voltage range. Alternatively, fifth control circuit 54 controls the output voltage of mega-solar plant 26 such that the generated power of mega-solar plant 26 falls within a power range given from CEMS 31.

First switching circuit 53 (FIG. 8) switches the output of MPPT control circuit 51 and the output of voltage control circuit 52, in accordance with a switch control signal applied from fifth control circuit 54.

Sixth control circuit 67 collects the measurement results concerning DC bus 205 measured by voltmeter 206 and ammeter 207, the measurement results concerning distribution system 24 measured by voltmeter 210 and ammeter 211, and status information of first DC/DC converter 203 output from first control circuit 204, and notifies CEMS 31 and the like of the collected information through communication I/F 212.

Further, sixth control circuit 67 notifies CEMS 31 of the effective voltage of distribution system 24 measured by a not-shown effective voltage measuring unit or information on active power and reactive power of the AC system measured by a not-shown active/reactive power measuring unit, through communication I/F 212, and also notifies fifth control circuit 54 of the measurement results such as effective voltage, active power, and the like of the AC system.

When the effective value of AC system voltage exceeds a prescribed value, fifth control circuit 54 switches the control of mega-solar plant 26 from MPPT control to voltage control as described above, thereby suppressing increase of the AC system voltage.

[Operation of Power Conversion Device 41]

Referring now to FIG. 7 to FIG. 41, the operation of power conversion device 41 for a storage battery will be described.

In the first embodiment, since power conversion device 41 is equipped with virtual synchronous generator control, second DC/AC converter 408 operates as a voltage source by executing voltage control. That is, third control circuit 404 (FIG. 7) performs control such that the voltage on DC bus 405 has a constant value. Referring to FIG. 10, the operation of third control circuit 404 will be described below.

The voltage on DC bus 405 is measured by voltmeter 406. The measurement result of voltmeter 406 is input to charge control circuit 71, discharge control circuit 72, and seventh control circuit 74.

Charge control circuit 71 controls the charge power of storage battery 40 such that the voltage on DC bus 405 attains a target voltage when the voltage on DC bus 405 is greater than the target voltage output from seventh control circuit 74. On the other hand, when the voltage on DC bus 405 is smaller than the target voltage, discharge control circuit 72 increases the discharge power of storage battery 40.

The switching between the output of charge control circuit 71 and the output of discharge control circuit 72 is performed by second switching circuit 73. Seventh control circuit 74 outputs a switch control signal to second switching circuit 73, based on the voltage value of DC bus 405 measured by voltmeter 406.

The operation of fourth control circuit 409 (FIG. 7) will now be described.

Figure 39:
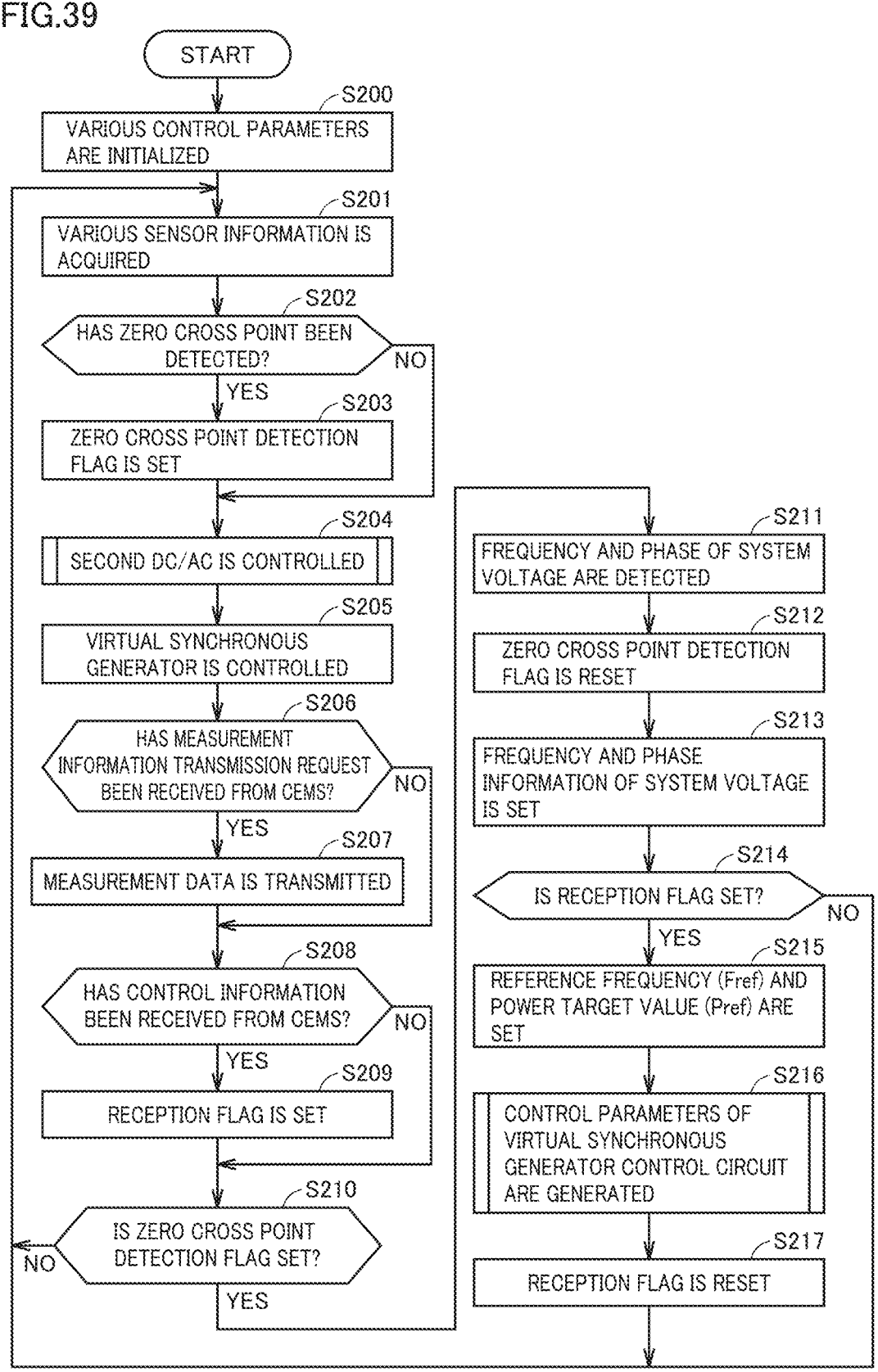
FIG. 39 is a flowchart for explaining the operation of the power conversion device.

FIG. 39 is a flowchart for explaining the operation of power conversion device 41.

As illustrated in FIG. 39, upon start of the process, at S200, fourth control circuit 409 initializes various control parameters. Subsequently, at S201, fourth control circuit 409 collects the voltage values measured by voltmeters 401, 406, and 410, current values measured by ammeters 402, 407, and 411, and status information of storage battery 40. Since the measurement value of voltmeter 410 is an AC voltage, the effective value of AC voltage is calculated in eighth control circuit 87 (FIG. 11) and this effective value is defined as a voltage value. Since the measurement value of ammeter 411 is an AC current, the effective value of AC current is calculated in eighth control circuit 87, and this effective value is used as a current value. A charge/discharge power calculating circuit (not shown) in seventh control circuit 74 calculates the charge/discharge power and the amount of charge/discharge power of the storage battery, based on the collected data.

The AC voltage of distribution system 24 measured by voltmeter 410 is input to AC frequency detecting circuit 81 (FIG. 11). At S202, AC frequency detecting circuit 81 detects a zero cross point in the waveform of AC voltage.

FIG. 12 is a block diagram illustrating a configuration of AC frequency detecting circuit 81 illustrated in FIG. 11. As illustrated in FIG. 12, the measurement value of voltmeter 410 is input to phase detecting circuit 810. At S202 in FIG. 39, phase detecting circuit 810 detects a zero cross point of AC voltage. In the first embodiment, a zero cross point indicates the point and the time at which the waveform of AC voltage measured by voltmeter 410 switches from negative to positive. Phase detecting circuit 810 outputs information indicating the detected zero cross point to frequency detecting circuit 811.

Frequency detecting circuit 811 calculates the periods of AC voltage, based on the time of the zero cross point detected by phase detecting circuit 810 last time and the time of the zero cross point detected this time. Frequency detecting circuit 811 calculates the frequency of AC voltage, based on the calculated periods.

Second sine wave generating circuit 812 outputs the zero cross point information detected by phase detecting circuit 810 and the frequency information of AC voltage detected by frequency detecting circuit 811, as sine wave information. The zero cross point information and the frequency information are output to inverter current control circuit 84, inverter voltage control circuit 85, virtual synchronous generator control circuit 83, and eighth control circuit 87.

Returning to FIG. 39, if a zero cross point is detected at S202 (YES at S202), at S203, phase detecting circuit 810 sets a zero cross point detection flag. If the process at S203 ends or if no zero cross point is detected at S202 (NO at S202), at S204, fourth control circuit 409 controls second DC/AC converter 408.

Figure 40:
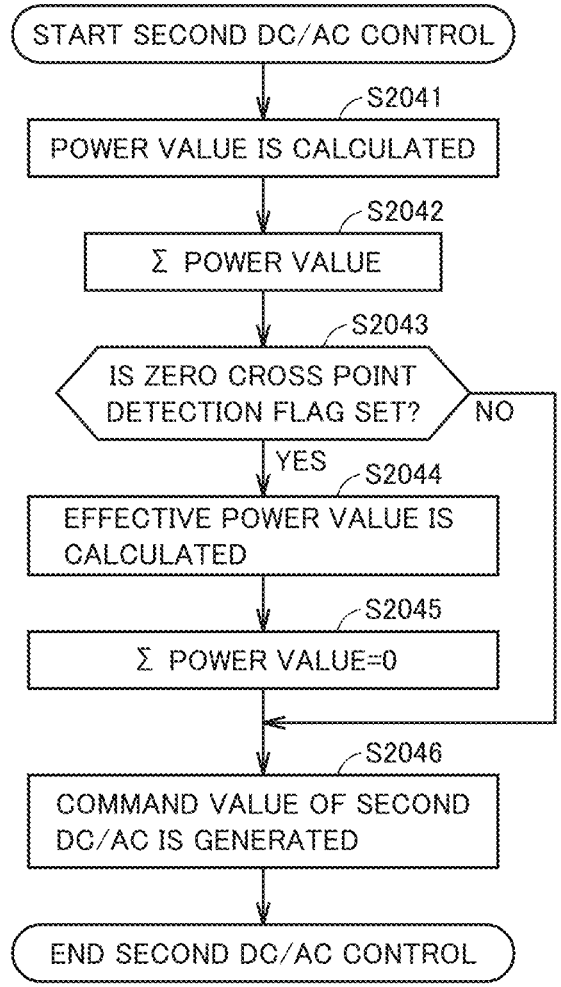
FIG. 40 is a flowchart for explaining the detail of a control process for a second DC/AC converter (S204 in FIG. 39).

Referring to FIG. 11 and FIG. 40, control of second DC/AC converter 408 will be described below.

As described above, since power conversion device 41 is equipped with virtual synchronous generator control, second DC/AC converter 408 is controlled as a voltage source. That is, the voltage of second DC/AC converter 408 is controlled. Therefore, when the power supplied to distribution system 24 is deficient, second DC/AC converter 408 is controlled to increase an output power. On the other hand, when the power supplied to distribution system 24 is excessive, second DC/AC converter 408 is controlled to decrease an output power.

FIG. 40 is a flowchart for explaining the detail of a control process of second DC/AC converter 408.

As illustrated in FIG. 40, at S2041, effective power calculating circuit 82 (FIG. 11) calculates a power value based on the measurement values of voltmeter 410 and ammeter 411, and at S2042, integrates the calculated power value. If the zero cross point detection flag is set (YES at S2043), effective power calculating circuit 82 proceeds to S2044 and stores the integrated value of effective power values for one cycle of AC voltage into a memory circuit (not shown) in eighth control circuit 87, and, at S2045, initializes the integrated value to zero.

If the process at S2045 ends or if the zero cross point detection flag is not set (NO at S2043), at S2046, inverter voltage control circuit 85 generates a command value of second DC/AC converter 408.

Referring now to FIG. 13, the operation of inverter voltage control circuit 85 will be described.

As illustrated in FIG. 13, inverter voltage control circuit 85 generates a control command value for controlling second DC/AC converter 408, based on the frequency and phase information output from virtual synchronous generator control circuit 83 (FIG. 11) (input via second sine wave generating circuit 812), and the amplitude information of AC system voltage input from eighth control circuit 87 via second sine wave generating circuit 812.

Specifically, the sine wave information (frequency, phase, and amplitude information, and frequency and phase information calculated by virtual synchronous generator control circuit 83) from AC frequency detecting circuit 81 is input to third sine wave generating circuit 851. Third sine wave generating circuit 851 generates a target value of AC system voltage output from second DC/AC converter 408, based on the input information.

Subtractor 852 subtracts the voltage measured by voltmeter 410 from the output of third sine wave generating circuit 851 and outputs the subtraction result to third PI control circuit 853.

Third PI control circuit 853 generates a voltage command value by executing PI control for setting the input subtraction to zero and outputs the generated voltage command value to first current limiting circuit 855.

First current limiting circuit 855 imposes a limit on the voltage command value applied from third PI control circuit 853, based on the measurement result of ammeter 411 input via eighth control circuit 87. For example, a case where the power target value given from CEMS 31 is 90% of the inverter capacity and the load power consumption increases will be discussed. In this case, in the ΔF/ΔP characteristic described in the first embodiment, an output of power exceeding the inverter capacity in power conversion device 41 is demanded before the deviation of the frequency of AC system voltage (differential frequency ΔF) reaches −ΔFmax. It is therefore necessary to impose a limit on the output power (output current) of power conversion device 41 so that it does not exceed the inverter capacity. Thus, in the first embodiment, when current exceeding the current capacity of second DC/AC converter 408 flows, control is performed by applying current limitation so that the current flowing through second DC/AC converter 408 attains a predetermined current value (for example, the current capacity of second DC/AC converter 408).

Specifically, first current limiting circuit 855 monitors current flowing through second DC/AC converter 408 and controls (limits) the current value such that the current does not exceed the current capacity of second DC/AC converter 408. The output of first current limiting circuit 855 is input to second PWM converter 854. The control parameters (control gain and integral time) of third PI control circuit 853 and first current limiting circuit 855 are output from eighth control circuit 87.

Second PWM converter 854 generates a control command value by executing PWM control using the voltage command value output from first current limiting circuit 855. Second PWM converter 854 outputs the generated control command value to second DC/AC converter 408.

Returning to FIG. 39, upon generating a control command value of second DC/AC converter 408 at S204, at S205, virtual synchronous generator control circuit 83 (FIG. 11) executes virtual synchronous generator control. In the first embodiment, one cycle of AC voltage is set as a control period. The control period may be an integer multiple of one cycle of AC voltage or a predetermined period such as a 1 second period.

FIG. 14 is a block diagram illustrating a configuration of virtual synchronous generator control circuit 83.

Upon determining that the control timing has come, eighth control circuit 87 (FIG. 11) instructs virtual synchronous generator control circuit 83 to generate information on frequency and phase to be used in voltage control. In the first embodiment, the frequency and phase of a sine wave generated by third sine wave generating circuit 851 (FIG. 13) in inverter voltage control circuit 85 are updated at the zero cross point. Therefore, in the first embodiment, the control period is the period of the zero cross point detected by AC frequency detecting circuit 81.

As illustrated in FIG. 14, in virtual synchronous generator control circuit 83, subtractor 832 subtracts reference frequency Fref (for example 60 Hz) input from eighth control circuit 87 from the measured value of frequency of AC voltage input from AC frequency detecting circuit 81 (FIG. 11) and outputs the subtraction result to governor control circuit 833. FIG. 15 is a block diagram illustrating a detailed configuration of governor control circuit 833 illustrated in FIG. 14.

As illustrated in FIG. 15, in governor control circuit 833, multiplier 91 multiplies the output of subtractor 832 (FIG. 14) by the control parameter (−1/Kgd) given from eighth control circuit 87. Multiplier 91 inputs the multiplication result to first-order lag system model 92.

As for speed adjustment rate Kgd and governor time constant Tg used in governor control circuit 833, that given from CEMS 31 and that generated in control parameter generating circuit 88 are set in a register (not shown) via eighth control circuit 87, and those set in the register are used.

First-order lag system model 92 performs computation to mimic a first-order lag system $(1/(1+s \times Tg))$ using time constant Tg given from eighth control circuit 87 as described above and outputs the computation result to limiter circuit 93.

Limiter circuit 93 imposes a limit on the input data. Specifically, limiter circuit 93 imposes a limit on the output power of second DC/AC converter 408 such that it does not exceed the power capacity of second DC/AC converter 408.

Returning to FIG. 14, adder 835 adds the output of governor control circuit 833 to power target value Pref output from eighth control circuit 87. As for power target value Pref, that given from CEMS 31 is output from eighth control circuit 87.

Subtractor 836 subtracts the actual value of effective power output from effective power calculating circuit 82 (FIG. 11) from the output of adder 835 and outputs the subtraction result to mass system computing circuit 837. FIG. 16 is a block diagram illustrating a detailed configuration of mass system computing circuit 837 illustrated in FIG. 14.

As illustrated in FIG. 16, subtractor 101 subtracts the output of multiplier 103 from the output of subtractor 836 (FIG. 14) and outputs the subtraction value to integrator 102. Integrator 102 divides the subtraction result of subtractor 101 by inertia constant M output from eighth control circuit 87 and integrates the division result. Output $\Delta\omega$ of integrator 102 corresponds to a differential value from the angular velocity (2×π×60 Hz) of the frequency of AC voltage. Output $\Delta\omega$ of integrator 102 is input to multiplier 103 and divider 104.

Multiplier 103 multiplies output $\Delta\omega$ of integrator 102 by damping coefficient Dg applied from eighth control circuit 87 and outputs the multiplication result to subtractor 101.

Divider 104 converts $\Delta\omega$ into differential value of from reference frequency Fref (60 Hz) by dividing output $\Delta\omega$ of integrator 102 by 2×π. Adder 105 generates a frequency (Fref+$\Delta f$) for performing voltage control in inverter voltage control circuit (FIG. 11) by adding output $\Delta f$ of divider 104 to reference frequency Fref (60 Hz).

As for inertia constant M and damping coefficient Dg used in mass system computing circuit 837, those generated by control parameter generating circuit 88 using information necessary for generating virtual synchronous generator control parameters generated and given by CEMS 31 are set in a not-shown register via eighth control circuit 87, and those set in the register are used.

The frequency information (Fref-PAD output from adder 105 is input to phase calculating circuit 106. The operation of phase calculating circuit 106 will be described below.

In the first embodiment, the frequency information output from adder 105 (FIG. 16) is integrated by phase calculating circuit 106 and output as phase information when inverter voltage control circuit 85 performs voltage control.

The phase information and frequency information output from mass system computing circuit 837 (FIG. 16) are input to third sine wave generating circuit 851 (FIG. 13) in inverter voltage control circuit 85 via second sine wave generating circuit 812 (FIG. 12) in AC frequency detecting circuit 81. Third sine wave generating circuit 851 generates a target value of AC voltage output from power conversion device 41, based on the input information.

Returning to FIG. 39, upon completion of the process of virtual synchronous generator control at S205, at S206, fourth control circuit 409 confirms whether a transmission request for measurement data has been received from CEMS 31. If a transmission request has been received from CEMS 31 (YES at S206), at S207, eighth control circuit 87 (FIG. 11) notifies CEMS 31 of measurement data via communication I/F 412 (FIG. 7).

On the other hand, if notification of measurement data is given at S207 or if a transmission request has not been received from CEMS 31 (NO at S206), eighth control circuit 87 proceeds to S208 and confirms whether control information has been received from CEMS 31.

If control information has been received from CEMS 31 (YES at S208), at S209, eighth control circuit 87 sets a control information reception flag. If the process at S209 ends or if control information has not been received from CEMS 31 (NO at S208), at S210, eighth control circuit 87 confirms whether the zero cross point detection flag is set. If the zero cross point detection flag is not set (NO at S210), the process returns to S201.

On the other hand, if the zero cross point detection flag is set (YES at S210), at S211, second sine wave generating circuit 812 (FIG. 12) takes in information on frequency and phase of the system voltage and, at S212, resets the zero cross point detection flag.

Upon resetting the zero cross point detection flag at S212, at S213, second sine wave generating circuit 812 updates the information on frequency and phase of the system voltage (in the first embodiment, zero cross point time information) to the information taken in at S211.

Upon completion of the process at S213, at S214, eighth control circuit 87 confirms whether control information has been received from CEMS 31 (whether the control information reception flag is set). If the reception flag is not set (NO at S214), the process returns to S201.

On the other hand, if the reception flag is set (YES at S214), at S215, eighth control circuit 87 replaces each of the frequency target value (reference frequency Fret) and power target value Pref with the received data.

Figure 41:
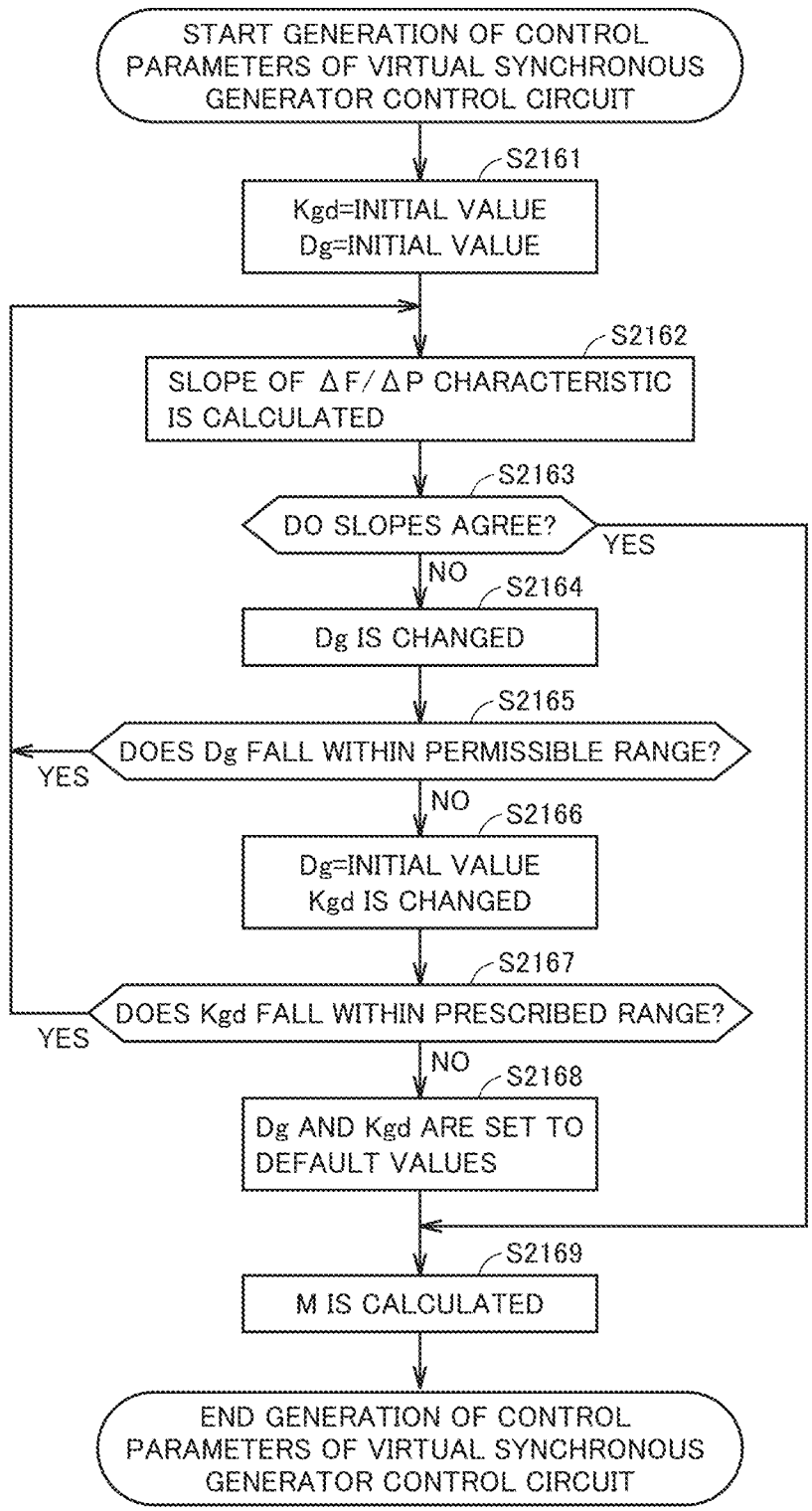
FIG. 41 is a flowchart illustrating a process of generating control parameters (S216 in FIG. 39).

At S216, control parameter generating circuit 88 generates control parameters (speed adjustment rate Kgd, damping coefficient Dg, and inertia constant M) of virtual synchronous generator control. FIG. 41 is a flowchart illustrating a process of generating control parameters (S216 in FIG. 39). In the first embodiment, a case where the $\Delta F/\Delta P$ characteristic is input from CEMS 31 as information necessary for generating control parameters of virtual synchronous generator control will be described. Control parameter generating circuit 88 generates control parameters using system information (reference frequency Fref, power target value Pref, $\Delta Fmax$ information) and inverter capacity Cinv, in addition to the $\Delta F/\Delta P$ characteristic.

As illustrated in FIG. 41, upon starting generation of control parameters, at S2161, control parameter generating circuit 88 initializes speed adjustment rate Kgd and damping coefficient Dg by setting each of speed adjustment rate Kgd and damping coefficient Dg to a predetermined initial value.

Upon initializing speed adjustment rate Kgd and damping coefficient Dg at S2161, control parameter generating circuit 88 proceeds to S2162 and calculates the slope of the $\Delta F/\Delta P$ characteristic using speed adjustment rate Kgd and damping coefficient Dg. In the first embodiment, a case where a virtual synchronous generator model that mimics the operation of virtual synchronous generator control circuit 83 (FIG. 11) is implemented in control parameter generating circuit 88 (FIG. 11) and control parameters are generated using this model will be described.

The method of generating control parameters is not limited to this method. For example, the relation between speed adjustment rate Kgd and the system frequency illustrated in FIG. 18 may be stored as table data corresponding to each damping coefficient Dg, and the relation between damping coefficient Dg and the system frequency illustrated in FIG. 19 may be stored as table data corresponding to each speed adjustment rate Kgd. These table data may be used to determine appropriate speed adjustment rate Kgd and damping coefficient Dg.

In the first embodiment, the block diagrams illustrated in FIG. 14 to FIG. 16 are formed as a mathematical model, which is used as a virtual synchronous generator model. However, embodiments are not limited thereto. For example, a transfer function of virtual synchronous generator control circuit 83 (FIG. 11) may be generated from the transfer function of the governor control unit represented by the above expression (1) and the swing equation represented by the above expression (2), and control parameters may be generated from the generated transfer function.

At S2162, the set speed adjustment rate Kgd and damping coefficient Dg are input to the virtual synchronous generator model to calculate a system frequency output from mass system computing circuit 837 (FIG. 14), for example, when load fluctuations of about 25% of the inverter capacity are input. Differential frequency $\Delta F$ is calculated by subtracting reference frequency Fref from the calculation result. Then, the slope of the $\Delta F/\Delta P$ characteristic is calculated by dividing the calculated differential frequency $\Delta F$ by the amount of load fluctuations (in this example, inverter capacity×0.25).

Upon calculating the slope of the $\Delta F/\Delta P$ characteristic at S2162, at S2163, control parameter generating circuit 88 compares the calculated slope of the $\Delta F/\Delta P$ characteristic with the slope of the $\Delta F/\Delta P$ characteristic generated at S0563 (FIG. 37) in FIG. 35. Specifically, control parameter generating circuit 88 confirms whether the deviation between these two slopes of the $\Delta F/\Delta P$ characteristics falls within a predetermined permissible range.

If the deviation between the slopes falls within the permissible range, control parameter generating circuit 88 determines that the two slopes of the $\Delta F/\Delta P$ characteristics agree (YES at S2163) and proceeds to S2169.

On the other hand, if the deviation between the slopes does not fall within the permissible range, control parameter generating circuit 88 determines that the two slopes of the $\Delta F/\Delta P$ characteristics do not agree (NO at S2163). In this case, control parameter generating circuit 88 proceeds to S2164 and changes damping coefficient Dg. In the first embodiment, control parameter generating circuit 88 adds a prescribed value to damping coefficient Dg at present.

Upon changing damping coefficient Dg at S2164, at S2165, control parameter generating circuit 88 confirms whether damping coefficient Dg falls within a predetermined prescribed range. If damping coefficient Dg falls within the prescribed range (YES at S2165), control parameter generating circuit 88 returns to S2162 and calculates the slope of the $\Delta F/\Delta P$ characteristic using the changed damping coefficient Dg.

On the other hand, if damping coefficient Dg falls out of the prescribed range (NO at S2165), control parameter generating circuit 88 determines that speed adjustment rate Kgd at present does not provide an appropriate characteristic and, at S2166, returns damping coefficient Dg to an initial value and changes speed adjustment rate Kgd. Specifically, control parameter generating circuit 88 adds a prescribed value to speed adjustment rate Kgd at present (initial value).

Upon changing speed adjustment rate Kgd at S2166, at S2167, control parameter generating circuit 88 confirms whether speed adjustment rate Kgd falls within a predetermined prescribed range. If speed adjustment rate Kgd falls outside the prescribed range (NO at S2167), control parameter generating circuit 88 proceeds to S2168 and sets speed adjustment rate Kgd and damping coefficient Dg to respective default values prepared in advance, because appropriate speed adjustment rate Kgd and damping coefficient Dg fail to be obtained. The process proceeds to S2169.

On the other hand, if speed adjustment rate Kgd falls within a prescribed range at S2167 (YES at S2167), control parameter generating circuit 88 returns to S2162 and calculates the slope of the $\Delta F/\Delta P$ characteristic using the changed speed adjustment rate Kgd and damping coefficient Dg. Control parameter generating circuit 88 repeats the process at S2162 to S2167 until the determination is YES at S2163 or until the determination is NO at S2167.

If speed adjustment rate Kgd and damping coefficient Dg are set to default values at S2168, a power excess/deficit is unable to be allocated in accordance with the power ratio based on the operation plan even when load fluctuations occur.

In the first embodiment, damping coefficient Dg and speed adjustment rate Kgd are calculated from the relation between damping coefficient Dg and the frequency of AC system voltage illustrated in FIG. 19. Damping coefficient Dg and speed adjustment rate Kgd may be calculated from the relation between speed adjustment rate Kgd and the frequency of AC system voltage illustrated in FIG. 18.

Upon setting of speed adjustment rate Kgd and damping coefficient Dg, at S2169, control parameter generating circuit 88 calculates inertia constant M. In the first embodiment, inertia constant M is calculated based on the response time required for virtual synchronous generator control. Specifically, the response performance of virtual synchronous generator control is determined by governor time constant Tg in governor control circuit 833 (FIG. 14) and time constant M/Dg in mass system computing circuit 837 (FIG. 14) obtained by the swing equation. In the first embodiment, since a default value of governor time constant Tg is used and governor time constant Tg is not generated, only the time constant of mass system computing circuit 837 is controlled. The time constant of mass system computing circuit 837 is obtained by M/Dg from the above expression (3). In the first embodiment, therefore, inertia constant M is calculated by multiplying the time constant of mass system computing circuit 837 defined by a default value by damping coefficient Dg.

Returning to FIG. 39, upon completion of calculation of control parameters (speed adjustment rate Kgd, damping coefficient Dg, and inertia constant M) at S216, control parameter generating circuit 88 notifies eighth control circuit 87 of the completion and outputs the calculated control parameters.

Upon receiving the calculated control parameters, eighth control circuit 87 outputs the control parameters to virtual synchronous generator control circuit 83 for updating. Upon completion of updating of the control parameters, at S217, eighth control circuit 87 clears (resets) the register (not shown) with the reception flat set and returns to S201.

As described above, in the distributed power source system according to the first embodiment, even when the demand balance significantly changes immediately after power conversion devices 41a to 41c are notified of the operation plans (power target values) of the corresponding storage batteries 40a to 40c created by CEMS 31, the allocation ratio of output power among power conversion devices 41a to 41c can be made substantially equal to the ratio of power target value at the time of creating the operation plan.

With this configuration, in a case where an operation plan (discharge plan) is created such that the SOC of storage batteries 40a to 40c becomes zero substantially simultaneously a few hours later or in a case where an operation plan (charge plan) is created such that storage batteries 40a to 40c become fully charged substantially simultaneously, even when the power consumption of load 600 or the generated power of mega-solar plant 26 significantly changes from the intended power at the time of creating the operation plan, the SOC of storage batteries 40a to 40c can be zero substantially simultaneously or storage batteries 40a to 40c can be fully charged substantially simultaneously, although the time deviates from the intended time, thereby following the intended operation plan.

In the conventional virtual synchronous generator control technology, since a power excess/deficit is shared equally among power conversion devices 41a to 41c, the allocation ratio of power of power conversion device 41 with a relatively small power target value is high, and the SOC of the corresponding storage battery 40 may become zero prior to the other storage batteries 40. By comparison, according to the first embodiment, a power excess/deficit can be allocated at the ratio of power target value set in the operation plan, so that the allocation ratio of storage battery 40 with a low SOC (that is, with a small power target value) can be kept low.

Second Embodiment

In the first embodiment, the method of generating information necessary for generating control parameters of virtual synchronous generator control circuit 83 (FIG. 11) implemented in power conversion device 41, executed in CEMS 31, and the method of generating control parameters, executed in control parameter generating circuit 88 (FIG. 11) in power conversion device 41, have been described.

In a second embodiment, a problem in control parameters generated in the first embodiment and a solution to the problem will be described. In the second embodiment, the operation in a case where information necessary for generating control parameters that is generated in CEMS 31 is up to the slope of the reference $\Delta F/\Delta P$ characteristic will be described.

The configuration of CEMS 31 according to the second embodiment is therefore the same configuration as CEMS 31 according to the first embodiment and differs only in the process in control parameter generating circuit 13 (FIG. 5) and control parameter generating circuit 88 (FIG. 11). The distributed power source management device according to the second embodiment will be described below, focusing on the operation of the different parts.

Figure 42B:
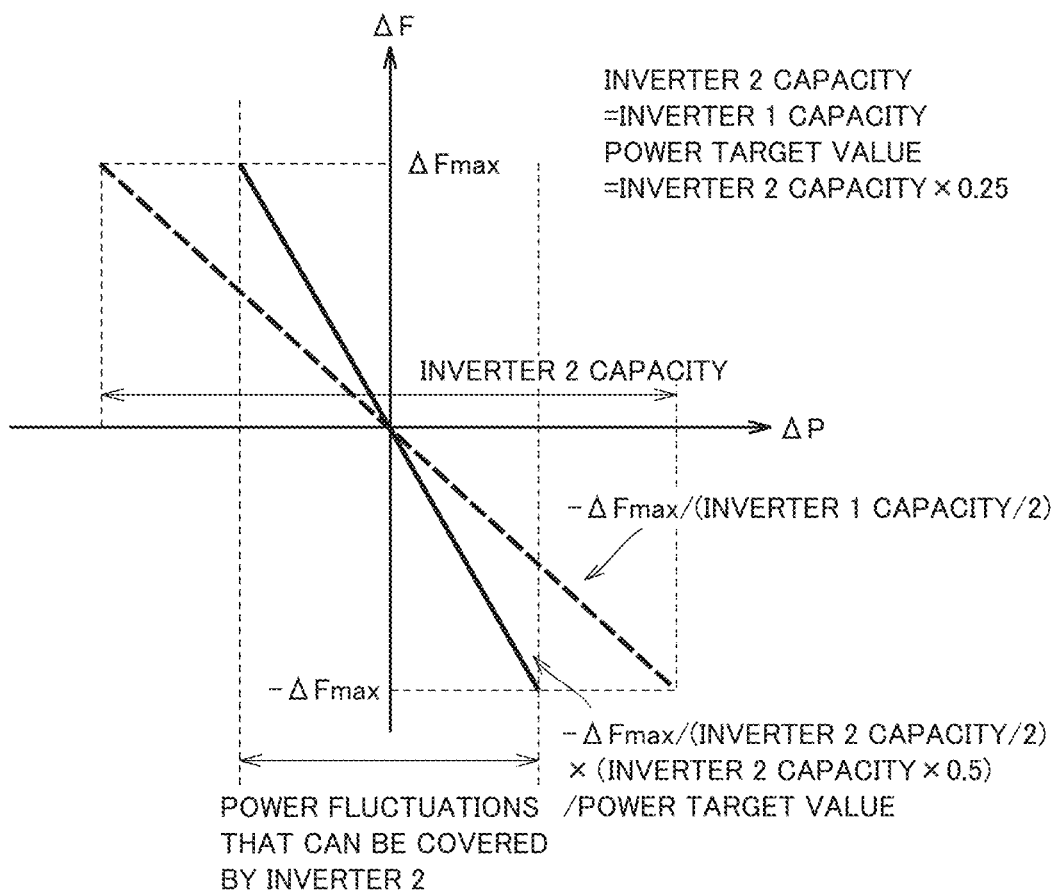
FIG. 42B is a diagram for explaining a problem when a power conversion device is controlled in accordance with the control parameters for virtual synchronous generator control generated in the first embodiment.

FIG. 42A and FIG. 42B are diagrams for explaining the problem when power conversion device 41 is controlled in accordance with control parameters for virtual synchronous generator control described in the first embodiment.

In the following, the problem in control parameters generated in the first embodiment will be described with reference to FIG. 42A and FIG. 42B. For simplicity of explanation, it is assumed two power conversion devices 41 with equal inverter capacity Cinv are used.

It is assumed that a power target value corresponding to 12.5% of the inverter capacity is applied to first power conversion device 41 from CEMS 31, and a power target value corresponding to 25% of the inverter capacity is applied to second power conversion device 41 from CEMS 31.

In the first embodiment, the horizontal axis of the reference $\Delta F/\Delta P$ characteristic and the $\Delta F/\Delta P$ characteristic is an actual power (kW). However, in the following description, as the horizontal axis, the charge/discharge power output from power conversion device 41 is normalized by the inverter capacity of power conversion device 41 (that is, the capacity of second DC/AC converter 408).

FIG. 42A and FIG. 42B illustrate the reference $\Delta F/\Delta P$ characteristic and the $\Delta F/\Delta P$ characteristic of power conversion device 41 created under the above conditions. In each figure, the broken line indicates the reference $\Delta F/\Delta P$ characteristic, and the solid line indicates the $\Delta F/\Delta P$ characteristic.

FIG. 42A illustrates the $\Delta F/\Delta P$ characteristic of first power conversion device 41 when the power target value is 12.5% of the inverter capacity. FIG. 42B illustrates the $\Delta F/\Delta P$ characteristic of second power conversion device 41 when the power target value is 25% of the inverter capacity.

In FIG. 42A, when the load fluctuates and the system frequency decreases to Fref (reference frequency)–$\Delta$Fmax with virtual synchronous generator control, the power that can be increased by first power conversion device 41 is 12.5% of the inverter capacity. That is, the power that can be covered by first power conversion device 41 is up to 25% of the inverter capacity.

Similarly, in FIG. 42B, the power that can be increased by second power conversion device 41 is up to 25% of the inverter capacity. That is, the power that can be covered by second power conversion device 41 is up to 50% of the inverter capacity.

As described above, when the power target value that each power conversion device 41 is notified of is small, the power range that can cover load fluctuations or fluctuations in the amount of power generation is narrow. In the example in FIG. 42A and FIG. 42B, the ΔF/ΔP characteristics of the first and second power conversion devices 41 are changed whereby the power range that can cover the fluctuations can be extended while the power allocation in the case of load fluctuations or fluctuations in the amount of power generation is set to 2:1 as in the first embodiment. An example is illustrated in FIG. 43A and FIG. 43B.

Figure 43A:
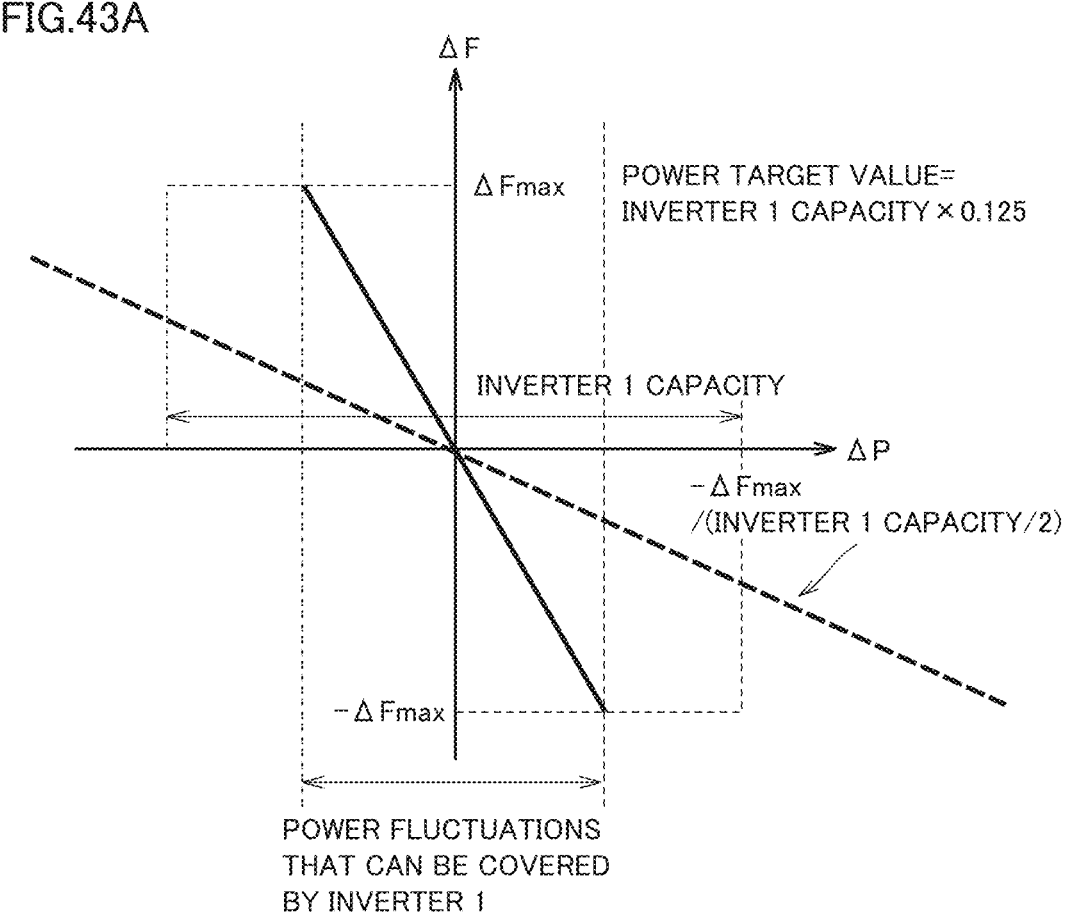
FIG. 43A is a diagram illustrating an example of the ΔF/ΔP characteristic generated by changing the slope of the reference ΔF/ΔP characteristic of a first power conversion device.

FIG. 43A and FIG. 43B illustrate a case where the ΔF/ΔP characteristic is generated by changing the slope of the reference ΔF/ΔP characteristic of each power conversion device 41. In FIG. 43A, the broken line indicates the changed reference ΔF/ΔP characteristic of first power conversion device 41. In FIG. 43B, the broken line indicates the changed reference ΔF/ΔP characteristic of second power conversion device 41. In FIG. 43A and FIG. 43B, the slope of the reference ΔF/ΔP characteristic is ½ compared with that in FIG. 42A and FIG. 42B, respectively.

With this setting, when the system frequency decreases to Fref−ΔFmax, the power that can be increased by first power conversion device 41 with virtual synchronous generator control is 25% of the inverter capacity. The power that can be increased by second power conversion device 41 is up to 50% of the inverter capacity. This configuration can cope with twofold load fluctuations or fluctuations in the amount of power generation.

Based on the above concept, the operation of the distributed power source system according to the second embodiment will be described. In the second embodiment, a case where the slope of the reference ΔF/ΔP characteristic is used as information necessary for generating control parameters for virtual synchronous generator control will be described.

Figure 44:
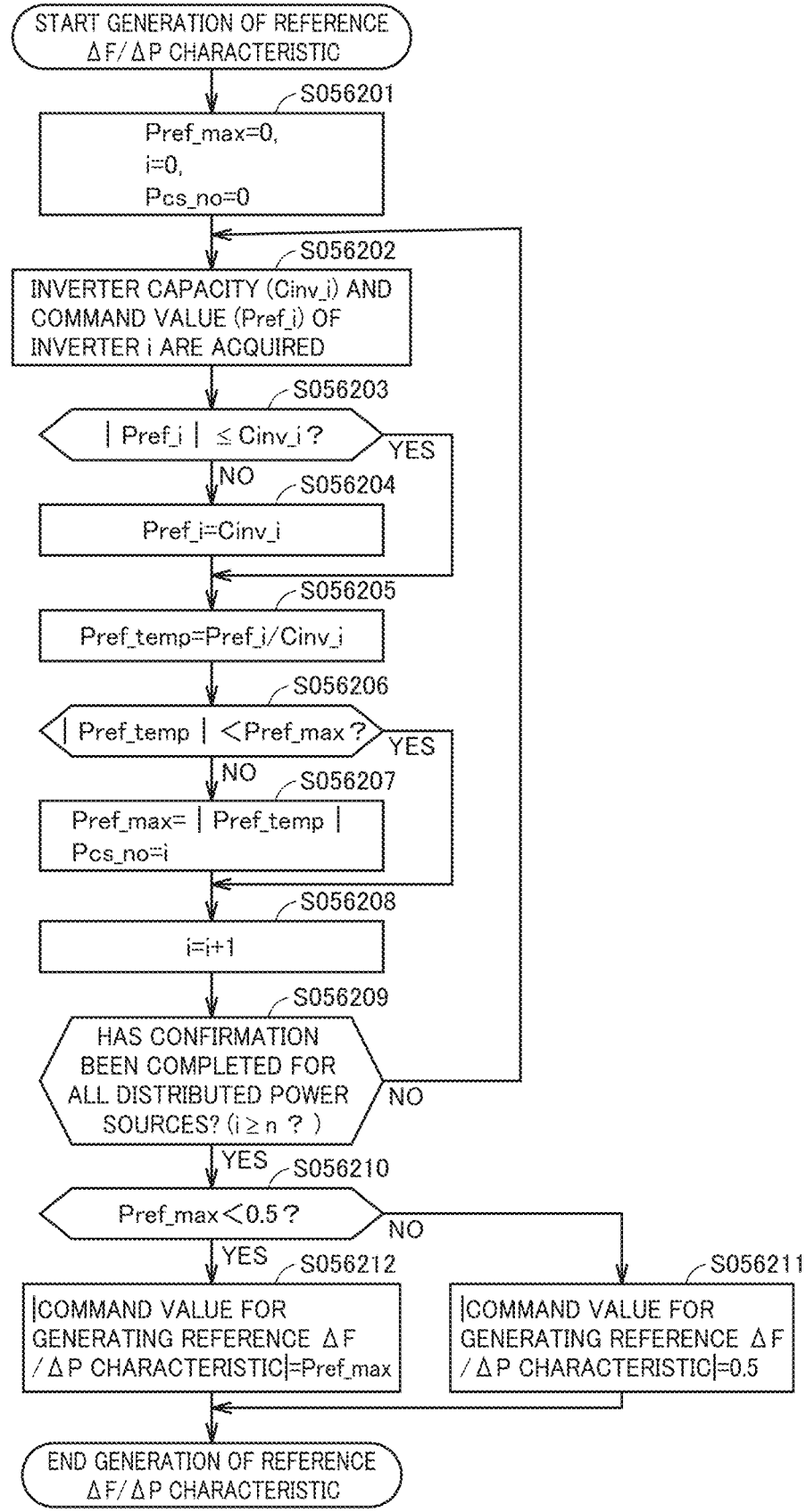
FIG. 44 is a flowchart for explaining a process of generating a reference ΔF/ΔP characteristic that is executed by the CEMS.

FIG. 44 is a flowchart for explaining a process of generating a reference ΔF/ΔP characteristic that is executed by CEMS 31. In the second embodiment, in CEMS 31, reference ΔF/ΔP characteristic calculating circuit 131 (FIG. 5) alone operates and ΔF/ΔP characteristic calculating circuit 132 does not operate. Thus, the information that transmission data generating circuit 15 (FIG. 3) is notified of is the slope of the reference ΔF/ΔP characteristic and information indicating a reference power command value used in generating the slope. Except of this, the operation of CEMS 31 is the same as the operation of CEMS 31 according to the first embodiment, and only the process of generating a reference ΔF/ΔP characteristic will be described below.

As illustrated in FIG. 44, upon start of the process, at S056201, reference ΔF/ΔP characteristic calculating circuit 131 (FIG. 5) sets an initial value. Specifically, a value of the register storing the maximum value Pref_max of power target value Pref output to power conversion device 41 connected to distribution system 24 and operating is cleared to zero (Pref_max=0). Further, the number i of power conversion device 41 connected to distribution system 24 and operating is set to zero (i=0).

In the flow in FIG. 44, it is assumed that n (n≥2) power conversion devices 41 are connected to distribution system 24 and operating. Further, Pcs_no storing the number of power conversion device 41 set with the maximum value Pref_max of the power target value is set to zero (Pcs_no=0).

Upon completion of initialization at S056201, at S056202, reference ΔF/ΔP characteristic calculating circuit 131 acquires inverter capacity Cinv_i and power target value Pref_i of the ith power conversion device 41.

At S056203, reference ΔF/ΔP characteristic calculating circuit 131 compares inverter capacity Cinv acquired at S056202 with the absolute value of power target value Pref_i. If the absolute value of power target value Pref_i is larger than inverter capacity Cinv_i (YES at S056203), at S056204, reference ΔF/ΔP characteristic calculating circuit 131 changes power target value Pref_i to inverter capacity Cinv_i. If the absolute value of power target value Pref_i is equal to or smaller than inverter capacity Cinv (YES at S056203) or when power target value Pref_i is changed to inverter capacity Cinv, at S056205, reference ΔF/ΔP characteristic calculating circuit 131 normalizes power target value Pref_i by inverter capacity Cinv by dividing power target value Pref_i by inverter capacity Cinv. In the following description, the normalized power target value Pref_i is denoted as Pref_temp.

Upon completion of the normalization process at S056205, at S056206, reference ΔF/ΔP characteristic calculating circuit 131 compares the absolute value of the normalized power target value Pref_temp with the maximum value Pref_max of the power target value. If the absolute value of Pref_temp is equal to or larger than Pref_max (NO at S056206), at S056207, Pref_max is set to the absolute value of Pref_temp. Furthermore, Pcs_no is set to the number i of power conversion device 41 at present.

If the absolute value of Pref_temp is smaller than Pref_max (YES at S056206) or when the process at S056207 is performed, at S056208, reference ΔF/ΔP characteristic calculating circuit 131 increments the number i of power conversion device 41 by 1 (i=i+1).

At S056209, reference ΔF/ΔP characteristic calculating circuit 131 determines whether the confirmation at S056202 to S056207 has been completed for power conversion devices 41 of all of distributed power sources. At S056209, whether i≥n is confirmed. If the confirmation has not been completed for power conversion devices 41 of all of the distributed power sources (NO at S056209), the process returns to S056202.

On the other hand, if the confirmation has been completed for power conversion devices 41 of all of the distributed power sources (YES at S056209), at S056210, reference ΔF/ΔP characteristic calculating circuit 131 determines whether Pref_max is smaller than 0.5.

If Pref_max>0.5 (NO at S056210), reference ΔF/ΔP characteristic calculating circuit 131 sets the power target value (the command value normalized by the inverter capacity) used in generating a reference ΔF/ΔP characteristic to 0.5. With this process, the control parameters used in virtual synchronous generator control circuit 83 are substantially the same as those described in the first embodiment.

On the other hand, if Pref_max<0.5 (YES at S056210), at S056212, reference ΔF/ΔP characteristic calculating circuit 131 sets the power target value (the command value normalized by the inverter capacity) used in generating a reference ΔF/ΔP characteristic to Pref_max.

Next, a method of generating a reference ΔF/ΔP characteristic in a case where the power target value (the command value normalized by the inverter capacity) used in generating a reference ΔF/ΔP characteristic is set to Pref_max (S056212 in FIG. 44) will be described.

Figure 45B:
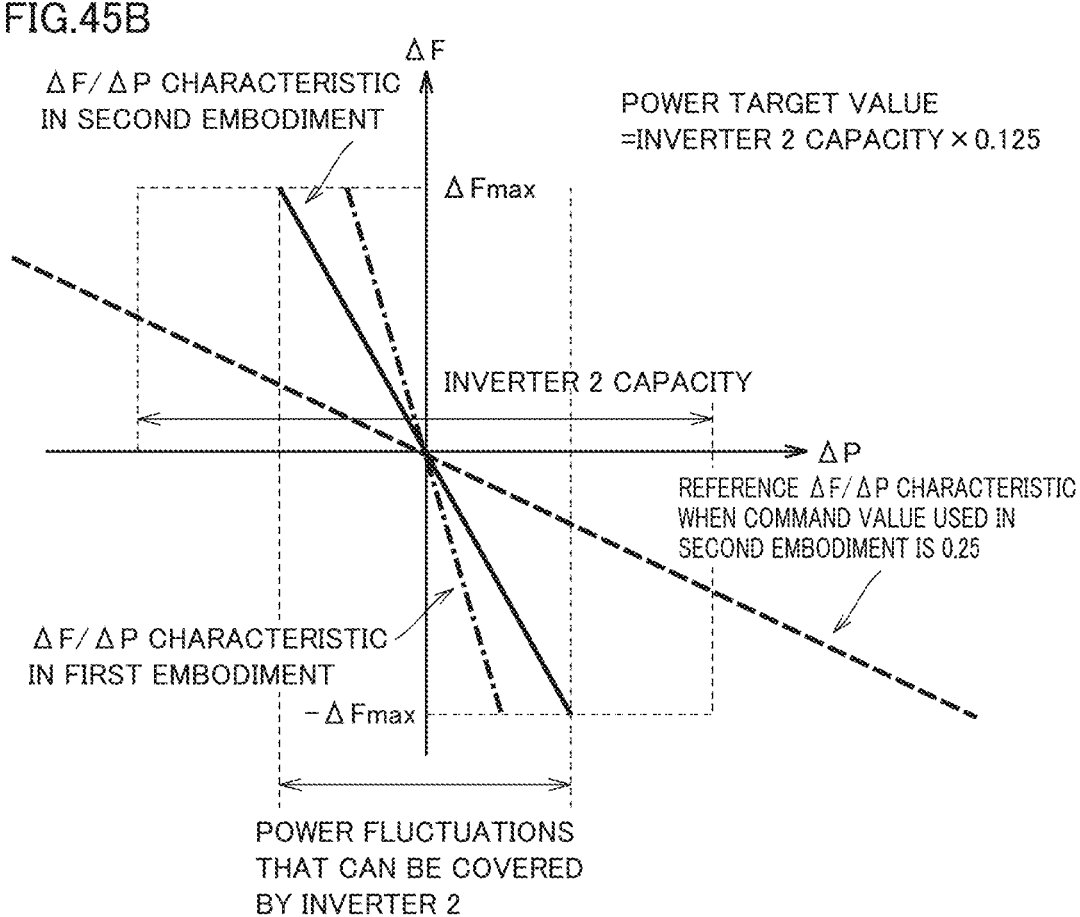
FIG. 45B is a diagram illustrating an example of the reference ΔF/ΔP characteristic and the ΔF/ΔP characteristic of a second power conversion device according to the second embodiment.

In the following, a method of generating a reference ΔF/ΔP characteristic and a ΔF/ΔP characteristic according to the second embodiment will be described with reference to FIG. 45A and FIG. 45B. In FIG. 45A and FIG. 45B, it is assumed that first power conversion device 41 and second power conversion device 41 are interconnected to distribution system 24.

In first power conversion device 41, Cinv=8 kW, and Pref=2 kW (the command value normalized by the inverter capacity=0.25). In second power conversion device 41, Cinv=4 kW, and Pref=0.5 kW (the command value normalized by the inverter capacity=0.125). Therefore, according to the flow in FIG. 44, Pref_max (the maximum value of the command value normalized by the inverter capacity) is the command value 0.25 in first power conversion device 41.

In the foregoing first embodiment, since the command value in generating a reference ΔF/ΔP characteristic is 0.5, the output power of power conversion device 41 is inverter capacity Cinv×0.5 when the system frequency decreases ΔFmax. In comparison, in the second embodiment, the command value in generating a reference ΔF/ΔP characteristic is 0.25.

FIG. 45A illustrates the reference ΔF/ΔP characteristic (broken line) and the ΔF/ΔP characteristic (solid line) of first power conversion device 41 according to the second embodiment. FIG. 45A further illustrates the ΔF/ΔP characteristic (dashed-dotted line) according to the first embodiment. The horizontal axis in FIG. 45A indicates the value normalized by the inverter capacity and the vertical axis indicates differential frequency ΔF from reference frequency Fref.

In the example in FIG. 45A, it is assumed that the command value in generating a reference ΔF/ΔP characteristic is 0.25. This means that the slope of the reference ΔF/ΔP characteristic is 0.5 times (0.25 (the command value in generating a reference ΔF/ΔP characteristic)/0.5 (the command value in generating an original reference ΔF/ΔP characteristic (first embodiment)) times) as steep as that in the first embodiment. Thus, in FIG. 45A, a reference ΔF/ΔP characteristic is determined such that the output power of first power conversion device 41 is inverter capacity Cinv when the system frequency decreases ΔFmax.

A method of determining the slope of the ΔF/ΔP characteristic will now be described.

There are a variety of methods of generating a ΔF/ΔP characteristic. As an example, a method of generating a ΔF/ΔP characteristic using the slope of the reference ΔF/ΔP characteristic (or the command value (0.25 in the present example) used in generating a reference ΔF/ΔP characteristic), inverter capacity Cinv, system-related information (system frequency, ΔFmax), and power target value Pref, as control parameters of virtual synchronous generator control, will be described.

When the slope of the reference ΔF/ΔP characteristic is received as a control parameter, first of all, the slope of the reference ΔF/ΔP characteristic in the case of a command value of 0.5 as described in the first embodiment is calculated. Then, the received slope of the reference ΔF/ΔP characteristic is divided by the slope of the reference ΔF/ΔP characteristic in the case of a command value of 0.5, and the command value (in the present example, 0.25) used in determining the reference ΔF/ΔP characteristic in CEMS 31 is calculated based on the division result.

Then, the slope of the ΔF/ΔP characteristic is calculated using the generation method according to the first embodiment, based on the reference ΔF/ΔP characteristic with a command value of 0.5. For example, in the example in FIG. 45A, the slope is twice as steep as the reference ΔF/ΔP characteristic with a command value of 0.5. This slope corresponds to 0.5 (the command value generating a reference ΔF/ΔP characteristic)/0.25 (the value normalized by dividing the power target value given from CEMS 31 by the inverter capacity). Then, this slope is multiplied by ½ (0.25 (the command value used in generating a reference ΔF/ΔP characteristic)/0.5 (the command value in generating a reference ΔF/ΔP characteristic)), thereby calculating the slope of the reference ΔF/ΔP characteristic. According to the slope of the ΔF/ΔP characteristic obtained from this calculation result, half (4 kW) of inverter capacity Cinv is output when the system frequency decreases ΔFmax. In the generation method in the first embodiment, the output of first power conversion device 41 is 2 kW.

FIG. 45B illustrates the reference ΔF/ΔP characteristic (broken line) and the ΔF/ΔP characteristic (solid line) of second power conversion device 41. FIG. 45B further illustrates the ΔF/ΔP characteristic (dashed-dotted line) according to the first embodiment. The horizontal axis in FIG. 45B indicates the value normalized by the inverter capacity, and the vertical axis indicates differential frequency ΔF from reference frequency Fref.

In the example in FIG. 45B, the ΔF/ΔP characteristic of second power conversion device 41 is generated by a value 0.25 normalized by dividing power target value Pref given from CEMS 31 by inverter capacity Cinv. Specifically, the slope of the ΔF/ΔP characteristic is calculated using the generation method according to the first embodiment, based on the reference ΔF/ΔP characteristic generated with a command value of 0.5, in the same manner as in the example in FIG. 45A.

More specifically, the slope is four times as steep as the reference ΔF/ΔP characteristic with a command value of 0.5 (0.5 (the command value used in generating a reference ΔF/ΔP characteristic)/0.125 (the value normalized by dividing the power target value given from CEMS 31 by the inverter capacity). Then, this slope is multiplied by ½ (0.25 (the command value used in determining a reference ΔF/ΔP characteristic)/0.5 (the command value in generating a reference ΔF/ΔP characteristic)), thereby calculating the slope of the reference ΔF/ΔP characteristic.

According to the slope of the ΔF/ΔP characteristic obtained from the calculation result, ¼ (1 kW) of the inverter capacity (4 kW) is output when the system frequency decreases ΔFmax. In the generation method according to the first embodiment, the output power of second power conversion device 41 is 0.5 kW. Thus, the reference ΔF/ΔP characteristic is generated by the generation method according to the second embodiment to achieve the effect of extending the output power of second power conversion device 41 twice (from 2.5 kW to 5.0 kW) for load fluctuations or fluctuations in generated power.

Figure 46:
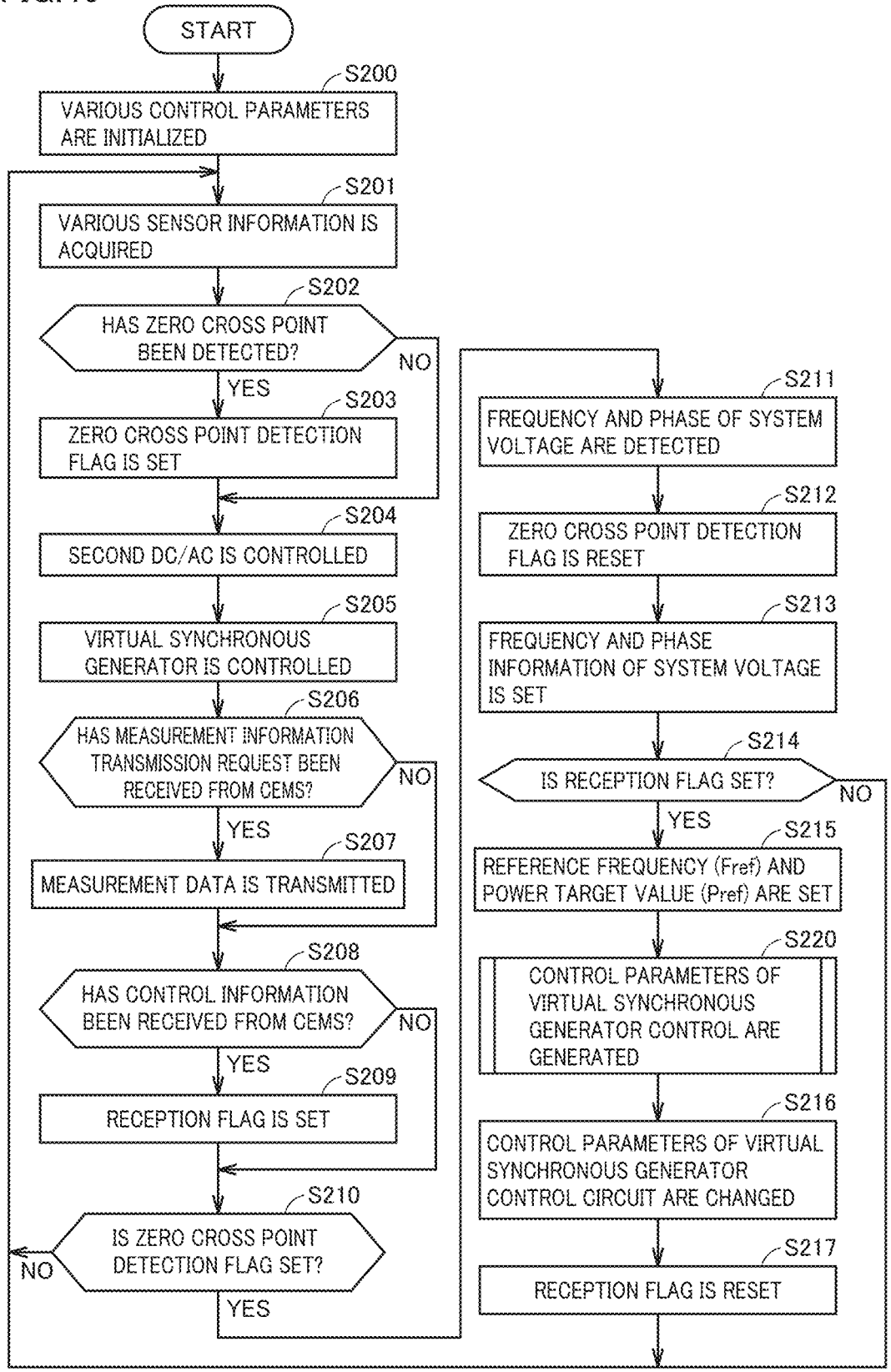
FIG. 46 is a flowchart for explaining the operation of the fourth control circuit.
Figure 47:
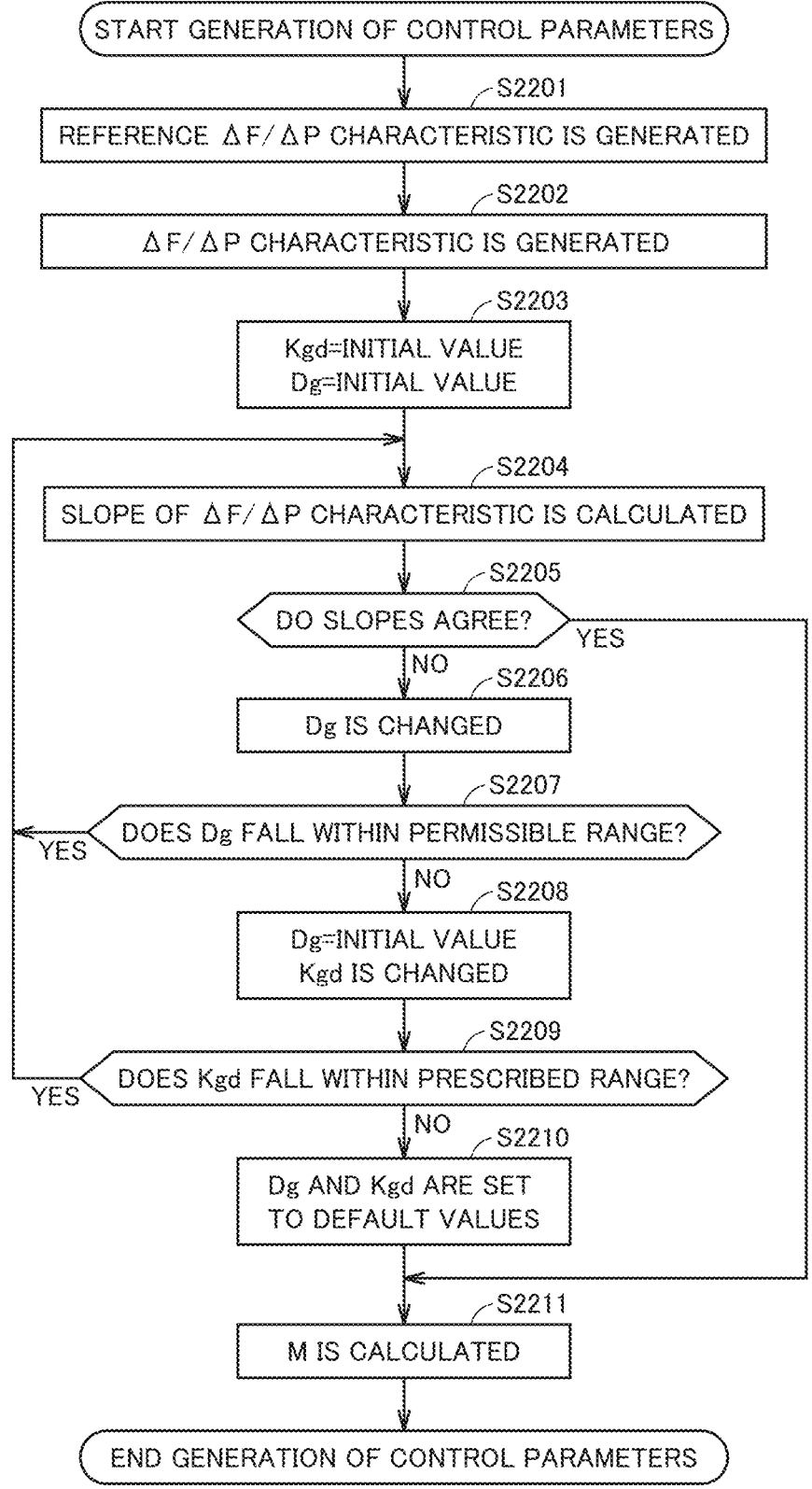
FIG. 47 is a flowchart illustrating a process of generating control parameters (S220 in FIG. 46).

Referring now to FIG. 46 and FIG. 47, the operation of fourth control circuit 409 using the method of generating a reference ΔF/ΔP characteristic according to the second embodiment will be described.

FIG. 46 is a flowchart focusing on the operation of fourth control circuit 409.

As illustrated in FIG. 46, upon start of the operation of power conversion device 41, at S200, fourth control circuit 409 initializes various control parameters by setting various control parameters to predetermined initial values.

Upon completion of initialization at S200, at S201, eighth control circuit 87 collects the measured voltages of voltmeters 401, 406, and 410, the measured currents of ammeters 402, 407, and 411, and status information (SOC, etc.) of storage battery 40 in the same manner as in the first embodiment. A charge/discharge power calculating circuit (not shown) in seventh control circuit 74 (FIG. 10) calculates the charge/discharge power and the amount of charge/discharge power of storage battery based on the collected data. The waveform of AC system voltage of distribution system 24 measured by voltmeter 410 is input to AC frequency detecting circuit 81.

At S202, AC frequency detecting circuit 81 detects a zero cross point of the AC system voltage. The method of detecting a zero cross point is similar to the method described in the first embodiment and will not be further elaborated. If a zero cross point of the AC system voltage is detected (YES at S202), at S203, AC frequency detecting circuit 81 sets a zero cross point detection flag.

If no zero cross point is detected (NO at S202) or if the zero cross point detection flag is set (S203), at S204, fourth control circuit 409 controls second DC/AC converter 408. The control operation of second DC/AC converter 408 is the same as the control operation in the first embodiment (see FIG. 40) and will not be further elaborated.

Referring now to FIG. 13, the operation of inverter voltage control circuit 85 will be described.

Inverter voltage control circuit 85 generates a control command value for controlling second DC/AC converter 408, based on information on frequency and phase output from virtual synchronous generator control circuit 83 (FIG. 11) and amplitude information of system voltage output from eighth control circuit 87 (FIG. 11). The amplitude information of AC system voltage from eighth control circuit 87 is input to inverter voltage control circuit 85 via second sine wave generating circuit 812.

The sine wave information (information on frequency, phase, and amplitude) from AC frequency detecting circuit 81 (FIG. 11) is input to third sine wave generating circuit 851. However, in the second embodiment, the amplitude information is not controlled since QV control is not performed in control circuit 83.

Third sine wave generating circuit 851 generates a target value of AC voltage output from second DC/AC converter 408, based on the input sine wave information.

Subtractor 852 calculates the deviation between the target value of AC voltage from third sine wave generating circuit 851 and the voltage measured by voltmeter 410 and outputs the calculated deviation to third PI control circuit 853.

Third PI control circuit 853 generates a voltage command value by performing PI (proportional integral) computation such that the input deviation becomes zero. Third PI control circuit 853 outputs the generated voltage command value to first current limiting circuit 855.

First current limiting circuit 855 imposes a limit on the voltage command value output from third PI control circuit 853, based on the measurement result of ammeter 411 input via eighth control circuit 87, as described in the first embodiment. Specifically, when current exceeding the current capacity of second DC/AC converter 408 flows, first current limiting circuit 855 performs control to limit the voltage command value so that the current flowing through second DC/AC converter 408 becomes equal to or lower than a predetermined current value (for example, the current capacity of second DC/AC converter 408). The output of first current limiting circuit 855 is input to second PWM converter 854.

Second PWM converter 854 generates a control signal by executing PWM control using the voltage command value output from first current limiting circuit 855. Second PWM converter 854 outputs the generated control signal to second DC/AC converter 408.

Returning to FIG. 46, when S204 is finished, at S205, virtual synchronous generator control is performed. In the second embodiment, the one cycle of the AC system voltage is set as the control period in the same manner as in the first embodiment. The control period may be an integer multiple of a cycle of the AC system voltage or a predetermined period such as a 1 second period.

The virtual synchronous generator control (S205 in FIG. 46) will be described using a block configuration diagram of virtual synchronous generator control circuit 83 illustrated in FIG. 14.

Upon determining that the control timing has come, eighth control circuit 87 (FIG. 11) instructs virtual synchronous generator control circuit 83 to generate information on frequency and phase to be used in voltage control. In the second embodiment, the frequency and phase of a sine wave generated by third sine wave generating circuit 851 (FIG. 13) in inverter voltage control circuit 85 are updated at the zero cross point. Therefore, in the second embodiment, the control period is the period of the zero cross point detected by AC frequency detecting circuit 81.

Subtractor 832 subtracts reference frequency Fref (for example 60 Hz) input from eighth control circuit 87 from the measured value of frequency of AC system voltage input from AC frequency detecting circuit 81 (FIG. 11) and outputs the subtraction result to governor control circuit 833 (FIG. 15).

In governor control circuit 833, multiplier 91 multiplies the output of subtractor 832 (FIG. 14) by the control parameter ($-1/Kgd$) given from eighth control circuit 87. Multiplier 91 inputs the multiplication result to first-order lag system model 92.

As for speed adjustment rate Kgd and governor time constant Tg used in governor control circuit 833, those generated in control parameter generating circuit 88 based on information necessary for generating control parameters (the slope of the reference $\Delta F/\Delta P$ characteristic) given from CEMS 31, the inverter capacity, the power target value, and the system information are set in a register (not shown) via eighth control circuit 87, and those set in the register are used.

First-order lag system model 92 performs computation to mimic a first-order lag system ($1/(1+s \times Tg)$) using time constant Tg given from eighth control circuit 87 as described above and outputs the computation result to limiter circuit 93. Limiter circuit 93 imposes a limit on the input data.

Adder 835 (FIG. 14) adds the output of governor control circuit 833 to power target value Pref output from eighth control circuit 87. As for power target value Pref, that given from CEMS 31 is output from eighth control circuit 87.

Subtractor 836 subtracts the actual value of effective power output from effective power calculating circuit 82 (FIG. 11) from the output of adder 835 and outputs the subtraction result to mass system computing circuit 837 (FIG. 16).

In mass system computing circuit 837 (FIG. 16), subtractor 101 subtracts the output of multiplier 103 from the output of subtractor 836 (FIG. 14) and outputs the subtraction value to integrator 102.

Integrator 102 divides the subtraction result of subtractor 101 by inertia constant M output from eighth control circuit 87 and integrates the division result. Output $\Delta\omega$ of integrator 102 corresponds to a differential value from the angular velocity ($2 \times \pi \times 60$ Hz) of the frequency of AC voltage. Output $\Delta\omega$ of integrator 102 is input to multiplier 103 and divider 104.

Multiplier 103 multiplies output $\Delta\omega$ of integrator 102 by damping coefficient Dg applied from eighth control circuit 87 and outputs the multiplication result to subtractor 101.

Divider 104 converts Δω into differential frequency Δf from reference frequency Fref (60 Hz) by dividing output Δω of integrator 102 by 2>π. Adder 105 generates a frequency (Fref+Δf) for performing voltage control in inverter voltage control circuit 85 (FIG. 11) by adding output Δf of divider 104 to reference frequency Fref (60 Hz).

As for inertia constant M and damping coefficient Dg used in mass system computing circuit 837, those generated by control parameter generating circuit 88 based on information necessary for generating control parameters (slope of reference ΔF/ΔP characteristic) generated by CEMS 31 in the manner described above are set in a not-shown register via eighth control circuit 87, and those set in the register are used.

The frequency information (Fref-PAD output from adder 105 is input to phase calculating circuit 106. The frequency information is integrated by phase calculating circuit 106 and output as phase information when inverter voltage control circuit 85 performs voltage control.

The phase information and frequency information output from mass system computing circuit 837 (FIG. 16) are input to third sine wave generating circuit 851 (FIG. 13) in inverter voltage control circuit 85 via second sine wave generating circuit 812 (FIG. 12) in AC frequency detecting circuit 81. Third sine wave generating circuit 851 generates a target value of AC voltage output from power conversion device 41, based on the input information.

Returning to FIG. 46, upon completion of the process of virtual synchronous generator control at S205, at S206, fourth control circuit 409 confirms whether a transmission request for measurement data has been received from CEMS 31. If a transmission request has been received from CEMS 31 (YES at S206), at S207, eighth control circuit 87 (FIG. 11) notifies CEMS 31 of measurement data via communication I/F 412 (FIG. 7).

On the other hand, if notification of measurement data is given at S207 or if a transmission request has not been received from CEMS 31 (NO at S206), eighth control circuit 87 proceeds to S208 and confirms whether control information has been received from CEMS 31.

If control information has been received from CEMS 31 (YES at S208), at S209, eighth control circuit 87 sets a control information reception flag. If the process at S209 ends or if control information has not been received from CEMS 31 (NO at S208), at S210, eighth control circuit 87 confirms whether the zero cross point detection flag is set. If the zero cross point detection flag is not set (NO at S210), the process returns to S201.

On the other hand, if the zero cross point detection flag is set (YES at S210), at S211, second sine wave generating circuit 812 (FIG. 12) takes in information on frequency and phase of the AC system voltage and, at S212, resets the zero cross point detection flag.

When the zero cross point detection flag is reset at S212, at S213, second sine wave generating circuit 812 updates the information on frequency and phase of the AC system voltage (in the second embodiment, zero cross point time information) to the information taken in at S211.

Upon completion of the process at S213, at S214, eighth control circuit 87 confirms whether control information has been received from CEMS 31 (whether the control information reception flag is set). If the reception flag is not set (NO at S214), the process returns to S201.

On the other hand, if the reception flag is set (YES at S214), at S215, eighth control circuit 87 replaces each of the frequency target value (reference frequency Fret) and power target value Pref with the received data. At S220, control parameter generating circuit 88 generates control parameters (speed adjustment rate Kgd, damping coefficient Dg, and inertia constant M) of virtual synchronous generator control.

FIG. 47 is a flowchart illustrating a process of generating control parameters (S220 in FIG. 46). In the second embodiment, a case where the slope of the reference ΔF/ΔP characteristic is input from CEMS 31 as information necessary for generating control parameters of virtual synchronous generator control will be described. In the second embodiment, control parameters are generated using system information (reference frequency Fref, power target value Pref, ΔFmax information) and inverter capacity Cinv, as information necessary for generating control parameters, in addition to the slope of the reference ΔF/ΔP characteristic.

Figure 48:
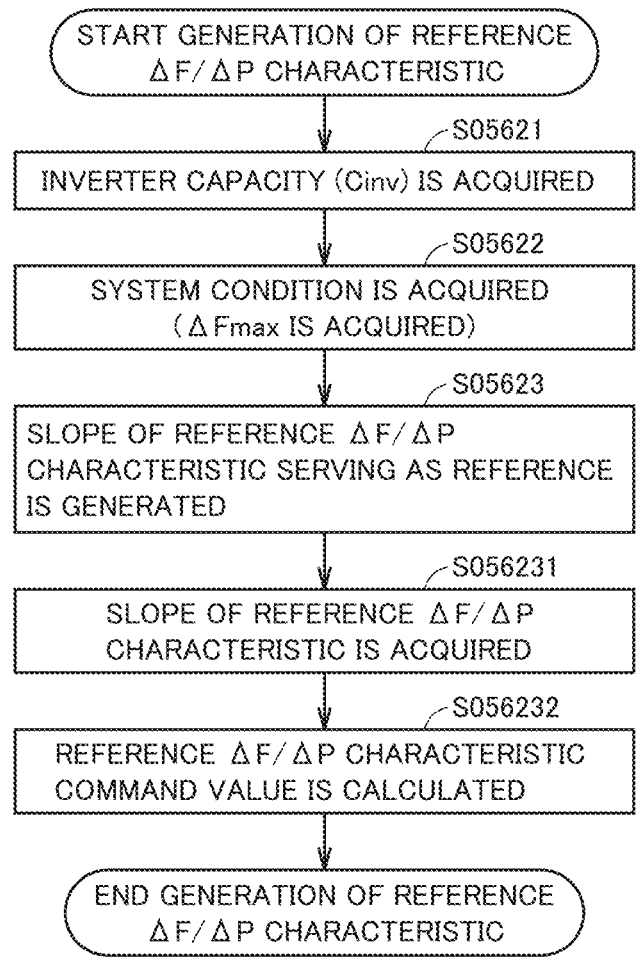
FIG. 48 is a flowchart illustrating a process of generating a reference ΔF/ΔP characteristic (S2201 in FIG. 47).

Upon start of the process, at S2201, control parameter generating circuit 88 in fourth control circuit 409 generates a reference ΔF/ΔP characteristic. FIG. 48 is a flowchart illustrating a process of generating a reference ΔF/ΔP characteristic (S2201 in FIG. 47).

As illustrated in FIG. 48, upon start of the process, at S05621, control parameter generating circuit 88 collects the capacity information (Cinv) of the static inverter of second DC/AC converter 408, from eighth control circuit 87.

Upon collecting the capacity information (Cinv) of the static inverter, at S05622, control parameter generating circuit 88 collects system information (ΔFmax) from eighth control circuit 87. Then, at S05623, control parameter generating circuit 88 obtains the slope of the reference ΔF/ΔP characteristic based on inverter capacity Cinv and ΔFmax, using the generation method according to the first embodiment. In the second embodiment, the slope of the reference ΔF/ΔP characteristic generated using the method according to the first embodiment is referred to as "the slope of the reference ΔF/ΔP characteristic serving as a reference".

Specifically, when storage battery 40 is in the charge mode or the discharge mode, the slope of the reference ΔF/ΔP characteristic serving as a reference is −ΔFmax/(Cinv×0.5). On the other hand, when storage battery 40 is in the charge/discharge mode, the slope of the reference ΔF/ΔP characteristic serving as a reference is −ΔFmax/Cinv.

Which of the reference ΔF/ΔP characteristic in the discharge mode (or charge mode) and that in the charge/discharge mode is employed is determined by eighth control circuit 87 based on the power target value given from CEMS 31, and control parameter generating circuit 88 is notified. Specifically, when the absolute value of the formulated power target value is smaller than a predetermined value, eighth control circuit 87 employs the charge/discharge mode.

Upon calculating the slope of the reference ΔF/ΔP characteristic serving as a reference at S05623, at S056231, control parameter generating circuit 88 acquires the slope of the reference ΔF/ΔP characteristic given from CEMS 31, from eighth control circuit 87.

At S056232, control parameter generating circuit 88 calculates the command value used when CEMS 31 generates a reference ΔF/ΔP characteristic in the above manner, based on the acquired slope of the reference ΔF/ΔP characteristic and the slope of the reference ΔF/ΔP characteristic serving as a reference generated at S05623. Specifically, the command value is calculated such that (the command value used when CEMS 31 generates a reference ΔF/ΔP characteristic)=(the slope of the reference ΔF/ΔP characteristic received from CEMS 31)/(the slope of the reference ΔF/ΔP characteristic serving as a reference calculated at S05623)×

(the command value (in the second embodiment, 0.5) used in calculating the slope of the reference ΔF/ΔP characteristic serving as a reference).

Figure 49:
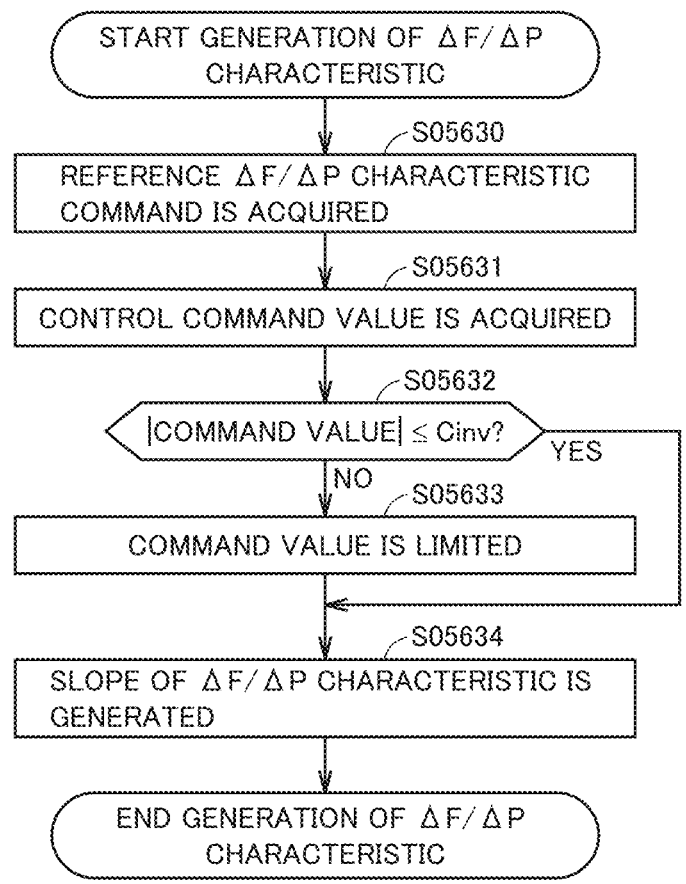
FIG. 49 is a flowchart illustrating a process of generating a ΔF/ΔP characteristic (S2202 in FIG. 47).

Returning to FIG. 47, upon completion of generation of a reference ΔF/ΔP characteristic (generation of the command value used when CEMS 31 generates a reference ΔF/ΔP characteristic) at S2201, at S2202, control parameter generating circuit 88 generates a ΔF/ΔP characteristic. FIG. 49 is a flowchart illustrating a process of generating a ΔF/ΔP characteristic (S2202 in FIG. 47).

As illustrated in FIG. 49, upon start of the process, at S05630, control parameter generating circuit 88 acquires a command value used when CEMS 31 generates a reference ΔF/ΔP characteristic that is calculated at S2201 in FIG. 47.

At S05631, control parameter generating circuit 88 acquires the control command value (power target value) given from CEMS 31, through eighth control circuit 87. At S05632, control parameter generating circuit 88 determines whether the magnitude of the collected power target value does not exceed inverter capacity Cinv. If the magnitude of the power target value exceeds inverter capacity Cinv (NO at S05632), at S05633, ΔF/ΔP characteristic calculating circuit 132 allows a limiter to limit the power target value to inverter capacity Cinv.

At S05634, control parameter generating circuit 88 obtains the slope of the ΔF/ΔP characteristic. Specifically, first of all, the slope of the ΔF/ΔP characteristic identical to that in the first embodiment is calculated based on the slope of the reference ΔP/ΔF characteristic serving as a reference (the command value in generating a reference ΔF/ΔP characteristic is 0.5). In the following description, the ΔF/ΔP characteristic identical to that in the first embodiment is referred to as "intermediate ΔF/ΔP characteristic" for the sake of convenience.

Next, the slope of the ΔF/ΔP characteristic is calculated using the command value used when CEMS 31 creates a reference ΔF/ΔP characteristic that is acquired at S05631, the command value (in the second embodiment, 0.5) used in calculating the reference ΔF/ΔP characteristic serving as a reference, and the slope of the intermediate ΔF/ΔP characteristic.

The slope is calculated such that (the slope of the ΔF/ΔP characteristic)=(the slope of the intermediate ΔF/ΔP characteristic)×(the command value used when CEMS 31 generates a reference ΔF/ΔP characteristic)/(the command value (in the second embodiment, 0.5) used in calculating a reference ΔF/ΔP characteristic serving as a reference).

Returning to FIG. 47, upon generation of a ΔF/ΔP characteristic at S2202, at S2203, speed adjustment rate Kgd and damping coefficient Dg are set to initial values. Then, at S2204, the slope of the ΔF/ΔP characteristic is calculated based on speed adjustment rate Kgd and damping coefficient Dg. In the second embodiment, a case where a virtual synchronous generator model that mimics the operation of virtual synchronous generator control circuit 83 (FIG. 11) is implemented in control parameter generating circuit 88 (FIG. 11) and control parameters are generated using this model, in the same manner as in the first embodiment, will be described. The method of generating control parameters is not limited to this method.

At S2204, speed adjustment rate Kgd and damping coefficient Dg, which determine the slope of the ΔF/ΔP characteristic, are generated using the virtual synchronous generator model. Specifically, the set speed adjustment rate Kgd and damping coefficient Dg are input to the virtual synchronous generator model to calculate the system frequency output from mass system computing circuit 837 (FIG. 14), for example, when load fluctuations of about 25% of the inverter capacity are input. Differential frequency ΔF is calculated by subtracting reference frequency Fref from the calculation result. Then, the slope of the ΔF/ΔP characteristic is calculated by dividing the calculated ΔF by the amount of load fluctuations.

Upon calculating the slope of the ΔF/ΔP characteristic at S2204, at S2205, control parameter generating circuit 88 compares the calculated slope of the ΔF/ΔP characteristic with the slope of the ΔF/ΔP characteristic generated at S2202. Specifically, control parameter generating circuit 88 confirms whether the deviation between these two slopes of the ΔF/ΔP characteristics fall within a predetermined permissible range.

If the deviation between the slopes falls within the permissible range, control parameter generating circuit 88 determines that the two slopes of the ΔF/ΔP characteristics agree (YES at S2205) and proceeds to S2211.

On the other hand, if the deviation between the slopes does not fall within the permissible range, control parameter generating circuit 88 determines that the two slopes of the ΔF/ΔP characteristics do not agree (NO at S2205). In this case, control parameter generating circuit 88 proceeds to S2206 and changes damping coefficient Dg. In the second embodiment, control parameter generating circuit 88 adds a prescribed value to damping coefficient Dg at present.

Upon changing damping coefficient Dg at S2206, at S2207, control parameter generating circuit 88 confirms whether damping coefficient Dg falls within a predetermined prescribed range. If damping coefficient Dg falls within the prescribed range (YES at S2207), control parameter generating circuit 88 returns to S2204 and calculates the slope of the ΔF/ΔP characteristic using the changed damping coefficient Dg.

On the other hand, if damping coefficient Dg falls out of the prescribed range (NO at S2208), control parameter generating circuit 88 determines that speed adjustment rate Kgd at present does not provide an appropriate characteristic and, at S2208, returns damping coefficient Dg to an initial value and changes speed adjustment rate Kgd. Specifically, control parameter generating circuit 88 adds a prescribed value to speed adjustment rate Kgd at present (initial value).

Upon changing speed adjustment rate Kgd at S2208, at S2209, control parameter generating circuit 88 confirms whether speed adjustment rate Kgd falls within a predetermined prescribed range. If speed adjustment rate Kgd falls outside the prescribed range (NO at S2209), control parameter generating circuit 88 proceeds to S2210 and sets speed adjustment rate Kgd and damping coefficient Dg to respective default values prepared in advance, because appropriate speed adjustment rate Kgd and damping coefficient Dg fail to be obtained. The process proceeds to S2211.

On the other hand, if speed adjustment rate Kgd falls within a prescribed range at S2209 (YES at S2209), control parameter generating circuit 88 returns to S2204 and calculates the slope of the ΔF/ΔP characteristic using the changed speed adjustment rate Kgd and damping coefficient Dg. Control parameter generating circuit 88 repeats the process at S2204 to S2209 until the determination is YES at S2205 or until the determination is NO at S2209.

If speed adjustment rate Kgd and damping coefficient Dg are set to default values at S2210, a power excess/deficit is unable to be allocated in accordance with the power ratio based on the operation plan even when load fluctuations occur.

Even in the second embodiment, damping coefficient Dg and speed adjustment rate Kgd are calculated from the relation between damping coefficient Dg and the frequency of AC system voltage illustrated in FIG. 19, in the same manner as in the first embodiment. Damping coefficient Dg and speed adjustment rate Kgd may be calculated from the relation between speed adjustment rate Kgd and the frequency of AC system voltage illustrated in FIG. 18.

Upon setting of speed adjustment rate Kgd and damping coefficient Dg, at S2211, control parameter generating circuit 88 calculates inertia constant M. Inertia constant M is calculated based on the response time required for virtual synchronous generator control. Specifically, the response performance of virtual synchronous generator control is determined by governor time constant Tg in governor control circuit 833 (FIG. 14) and time constant M/Dg in mass system computing circuit 837 (FIG. 14) obtained by the swing equation. In the first embodiment, since a default value of governor time constant Tg is used and governor time constant Tg is not generated, only the time constant in mass system computing circuit 837 is controlled. The time constant of mass system computing circuit 837 is obtained by M/Dg from the above expression (3). In the first embodiment, therefore, inertia constant M is calculated by multiplying the time constant of mass system computing circuit 837 defined by a default value by damping coefficient Dg.

Returning to FIG. 46, upon completion of calculation of control parameters (speed adjustment rate Kgd, damping coefficient Dg, and inertia constant M) at S220, control parameter generating circuit 88 notifies eighth control circuit 87 of the completion and outputs the calculated control parameters.

Upon receiving the calculated control parameters, at S216, eighth control circuit 87 outputs the control parameters to virtual synchronous generator control circuit 83 for updating. Upon completion of updating of the control parameters, at S217, eighth control circuit 87 clears (resets) the register (not shown) with the reception flat set and returns to S201.

As described above, in the distributed power source system according to the second embodiment, even when the demand balance significantly changes immediately after power conversion devices 41a to 41c are notified of the operation plan created in CEMS 31 (for example, when the power consumption of the load significantly changes or the generated power of mega-solar plant 26 significantly changes to cause a significant change in demand and supply, compared with the power intended when the operation plan is created), the allocation ratio of power output by power conversion devices 41a to 41c can be made substantially equal to the ratio of power target value in creating the operation plan.

For example, in a case where an operation plan is created such that the SOC of storage batteries 40a to 40c becomes zero substantially simultaneously (in discharge plan) a few hours later or in a case where an operation plan is created such that they are fully charged substantially simultaneously, the SOC can be zero or can be full substantially simultaneously, although the time is different, thereby achieving the effect of maintaining the intended operation plan.

When power conversion devices 41 equally share a differential power, the power allocation ratio of power conversion device 41 with a small power target value is high and the SOC of storage battery 40 becomes zero prior to the others. However, the present method enables the power excess/deficit to be allocated according to the original ratio of power target value, thereby achieving the effect of, for example, keeping the allocation of power low for storage battery 40 with a low SOC (with a small power target value).

In addition, the reference $\Delta F/\Delta P$ characteristic is controlled in CEMS 31 based on the power target value that each power conversion device 41 is notified of. For example, in a case where the power target value that each power conversion device 41 is notified of is small, in the first embodiment, when large load fluctuations or fluctuations in generated power occur and the deviation of the system frequency becomes $-\Delta Fmax$, second DC/AC converter 408 is unable to output a power excess/deficit although it can supply in terms of the inverter capacity. However, the control as described above can extend the power that can be output from second DC/AC converter 408 (see FIG. 45).

Third Embodiment

In the second embodiment, the problem in control parameters for virtual synchronous generator control generated in the first embodiment and the solution to the problem have been described. The method of calculating the slope of the reference $\Delta F/\Delta P$ characteristic which is information necessary for generating control parameters for virtual synchronous generator control generated in CEMS 31 has been described as a solution.

In a third embodiment, another determination method in calculating the slope of the reference $\Delta F/\Delta P$ characteristic and a method of calculating the slope of the reference $\Delta F/\Delta P$ characteristic based on it will be described. The configuration of CEMS 31 in the third embodiment is basically the same configuration as CEMS 31 in the second embodiment and differs only in the process in control parameter generating circuit 13 (FIG. 5) and control parameter generating circuit 88 (FIG. 11). The third embodiment will be described below, focusing on the operation of the different parts.

The third embodiment differs from the second embodiment in that whether to calculate the slope of the reference $\Delta F/\Delta P$ characteristic using a numerical value different from that in the first embodiment is determined, and in the method of generating a command value used when the slope of the reference $\Delta F/\Delta P$ characteristic is generated.

Specifically, in the third embodiment, the average value of the command value normalized by dividing the power target value output from operation plan creating circuit 14 (FIG. 3) and given to each power conversion device 41 by the inverter capacity of the corresponding power conversion device 41 is calculated. Then, when the calculated average value is equal to or smaller than a predetermined value, the command value in calculating the slope of the reference $\Delta F/\Delta P$ characteristic is generated as the average value of the command value normalized by dividing the power target value by the inverter capacity of each power conversion device 41.

Figure 50A:
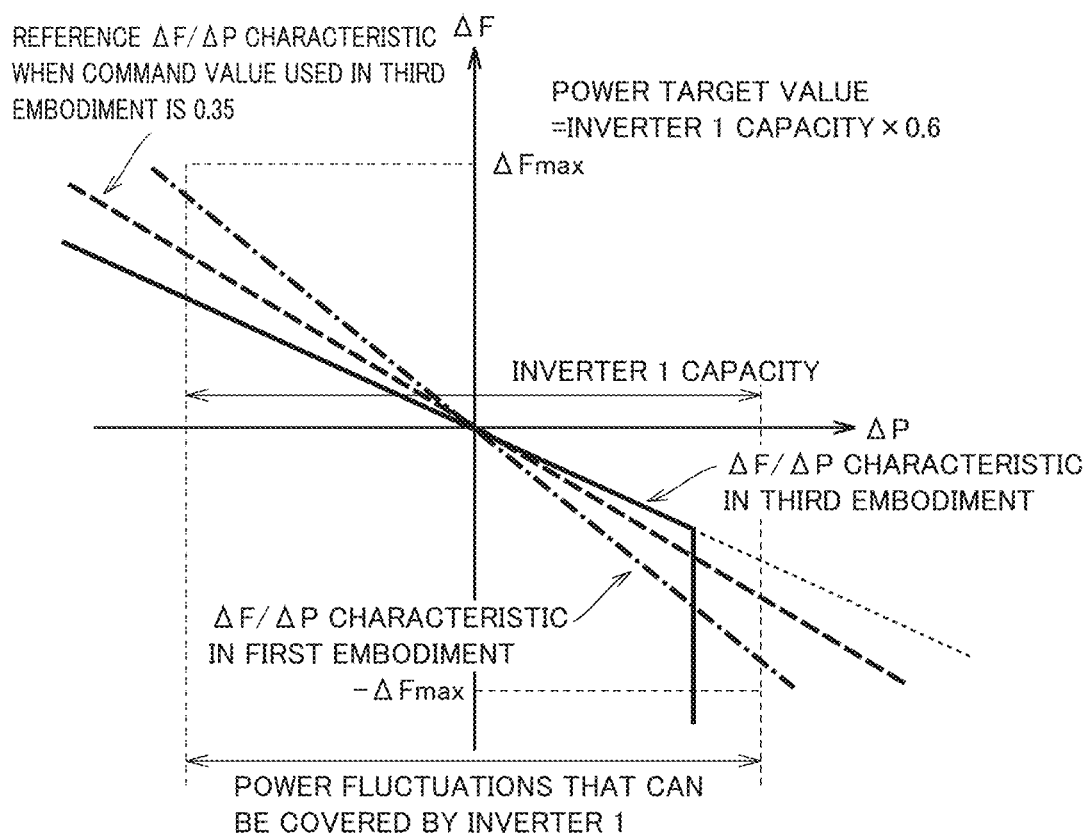
FIG. 50A is a diagram for explaining a method of creating a reference ΔF/ΔP characteristic and a ΔF/ΔP characteristic of a first power conversion device according to a third embodiment.

FIG. 50A and FIG. 50B are diagrams for explaining a method of creating reference $\Delta F/\Delta P$ characteristics and $\Delta F/\Delta P$ characteristics of two power conversion devices 41 equipped with virtual synchronous generator control according to the third embodiment. A method of creating control parameters for virtual synchronous generator control according to the third embodiment will be described below with reference to FIG. 50.

In FIG. 50A, in first power conversion device 41, the inverter capacity is 8 kW, and the power target value normalized by the inverter capacity is 0.6. In FIG. 50B, in second power conversion device 41, the inverter capacity is 4 kW, and the power target value normalized by the inverter capacity is 0.1. In FIG. 50A, the $\Delta F/\Delta P$ characteristic created by the creation method according to the first embodiment is indicated by a dashed-dotted line. In FIG. 50B, the $\Delta F/\Delta P$ characteristic created by the creation method according to the first embodiment is indicated by a dashed-dotted line.

Then, the average value of the command values normalized by dividing the power target values of the first and second power conversion devices 41 by the respective inverter capacities is (0.6+0.1)/2=0.35. Thus, in the third embodiment, the command value in calculating the slope of the reference $\Delta F/\Delta P$ characteristic is generated as 0.35. The method of calculating the slope of the reference $\Delta F/\Delta P$ characteristic is the same as in the second embodiment and will not be further elaborated.

In FIG. 50A, the reference $\Delta F/\Delta P$ characteristic of first power conversion device 41 is indicated by a broken line. In FIG. 50B, the reference $\Delta F/\Delta P$ characteristic of second power conversion device 41 is indicated by a broken line. In each figure, the $\Delta F/\Delta P$ characteristic in generating control parameters of virtual synchronous generator control circuit 83 is indicated by a solid line.

A limit is applied to the $\Delta F/\Delta P$ characteristic illustrated in FIG. 50A when differential power $\Delta P$ is 0.4 times larger than the inverter capacity. This occurs because the original command value is 0.6 and thus the output power (output current) cannot be output anymore at the point of time when a deficient power 0.4 times larger than the inverter capacity is output.

In the third embodiment, for the sake of convenience, the $\Delta F/\Delta P$ characteristic is depicted such that the output is limited at $\Delta P=0.4$ as indicated by a solid line. However, in the actual control, output limitation is performed by first current limiting circuit 855 (see FIG. 11 and FIG. 14) in inverter voltage control circuit 85. Therefore, CEMS 31 outputs the slope of the reference $\Delta F/\Delta P$ characteristic or information for generating the slope, which is information necessary for generating the slope of the $\Delta F/\Delta P$ characteristic, or the slope of the $\Delta F/\Delta P$ characteristic or information for generating the slope, rather than the characteristic indicated by the solid line in FIG. 50A. 50A.

Here, the operation of first current limiting circuit 855 illustrated in FIG. 14 will be described briefly.

First current limiting circuit 855 monitors an output of ammeter 411 input through eighth control circuit 87. When the AC current output by second DC/AC converter 408 exceeds a current capacity, first current limiting circuit 855 limits the output current by imposing a limit on the current command value output to second PWM converter 854. With such control, the power output from power conversion device 41 is like the $\Delta F/\Delta P$ characteristic depicted by a solid line in FIG. 50A.

Based on the foregoing, the operation of the distributed power source system according to the third embodiment, that is, a method of generating information necessary for generating control parameters for virtual synchronous generator control in CEMS 31 will be described. In the third embodiment, a case where the slope of the reference $\Delta F/\Delta P$ characteristic is used as information necessary for generating control parameters in the same manner as in the second embodiment will be described.

Figure 51:
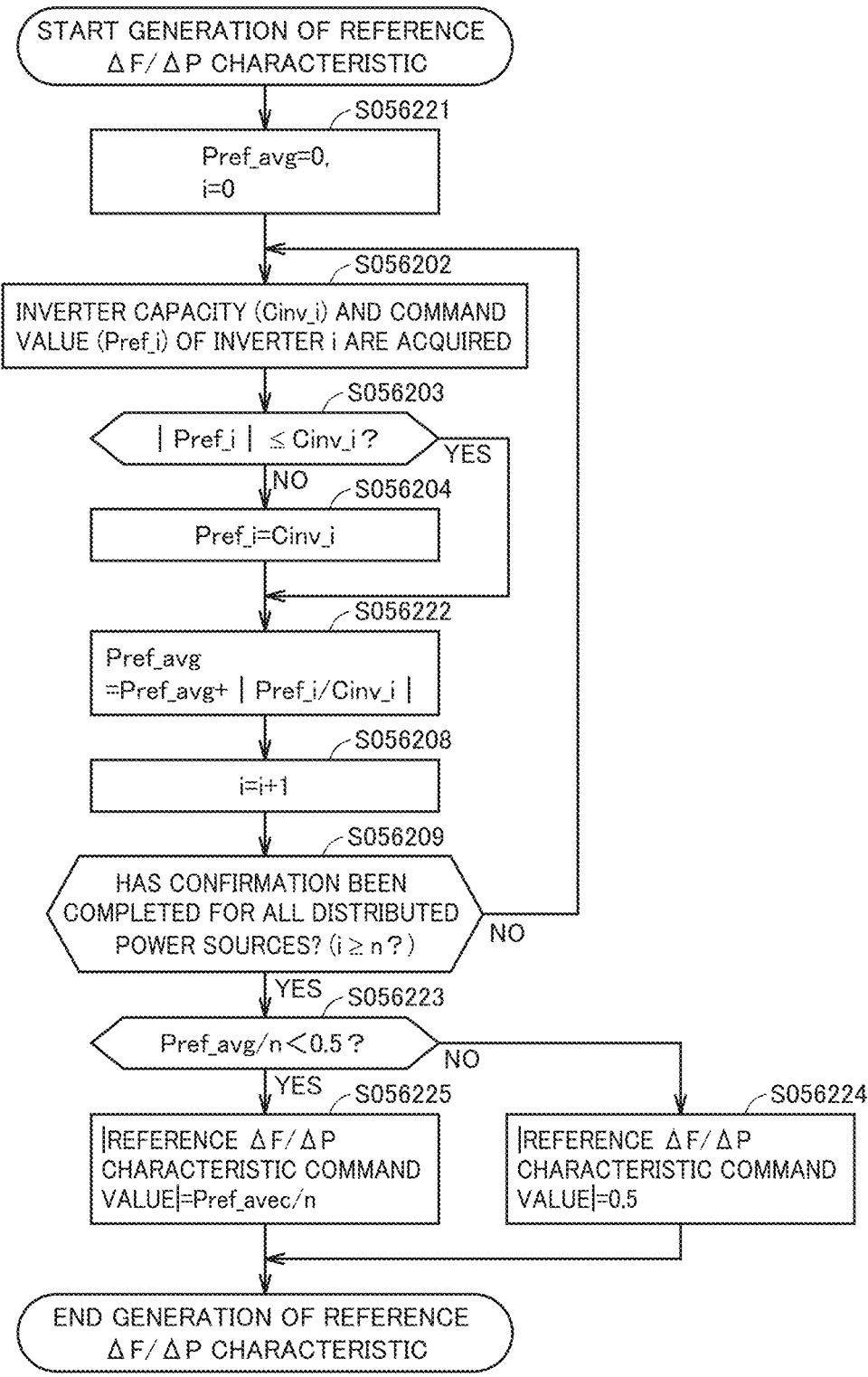
FIG. 51 is a flowchart for explaining a process of generating a reference ΔF/ΔP characteristic in the CEMS.

FIG. 51 is a flowchart for explaining a process of generating a reference $\Delta F/\Delta P$ characteristic in CEMS31. Since the operation of CEMS 31 is the same as in the second embodiment except for the calculation of the reference $\Delta F/\Delta P$ characteristic, only the process of generating a reference $\Delta F/\Delta P$ characteristic will be described.

As illustrated in FIG. 51, upon start of the process, at S056221, reference $\Delta F/\Delta P$ characteristic calculating circuit 131 (FIG. 5) sets initial values in generation. Specifically, Pref_avg, which is used in calculating the average value of the command value obtained by normalizing the power target value output to power conversion device 41 connected to distribution system 24 and operating by the inverter capacity of each second DC/AC converter 408, is initialized to zero. Further, the number i of power conversion device 41 connected to distribution system 24 and operating is set to zero. In the flow in FIG. 51, it is assumed that n (n>2) power conversion devices 41 are connected to distribution system 24 and operating.

Upon completion of initialization at S056221, at S056202, inverter capacity Cinv_i and power target value Pref_i of the ith power conversion device 41 are acquired.

At S056203, inverter capacity Cinv_i acquired at S056202 is compared with the absolute value of power target value Pref_i. As a result of comparison, if the absolute value of power target value Pref_i exceeds inverter capacity Cinv_i, at S056204, power target value Pref_i is changed to inverter capacity Cinv_i.

If the absolute value of power target value Pref_i is equal to or smaller than inverter capacity Cinv_i (YES at S056203) or when the process at S056204 ends, at S056222, power target value Pref_i is normalized by inverter capacity Cinv_i by dividing power target value Pref_i by inverter capacity Cinv_i. Hereinafter the normalized power target value (Pref_i/Cinv_i) is referred to as "normalized command value". Then, the absolute value of the normalized command value is added (integrated) to Pref_avg.

Upon completion of the process of adding (integrating) the absolute value of the normalized command value at S056222, at S056208, the number i of power conversion device 41 is incremented by 1 (i=i+1).

At S056209, it is confirmed whether the confirmation has been completed for power conversion devices 41 of all of the operating distributed power sources (i≥n). If the confirmation has not been completed for power conversion devices 41 of all of the distributed power sources (NO at S056209), the process returns to S056202 and continues.

On the other hand, if the confirmation has been completed for power conversion devices 41 of all of distributed power sources at S056209 (YES at S056209), at S056223, the integral result (Pref_avg) is divided by the number n of connected power conversion devices 41 and the division result is compared with 0.5. In the third embodiment, the division result is compared with 0.5, but may be compared with another value, as a matter of course. This numerical value (0.5) may be changed depending on the number n of connected power conversion devices 41, as a matter of course.

If NO at S056223, at S056224, the command value used in generating a reference $\Delta F/\Delta P$ characteristic is set to 0.5 in the same manner as in the first embodiment, and the reference $\Delta F/\Delta P$ characteristic of power conversion device 41 is generated. The process then ends.

On the other hand, if YES at S056223, at S056225, the command value used in generating a reference $\Delta F/\Delta P$ characteristic is set to Pref_aveg/n, and the reference $\Delta F/\Delta P$ characteristic of power conversion device 41 is generated. The process then ends.

As described above, in the distributed power source management device according to the third embodiment, even when the demand balance significantly changes immediately after power conversion devices 41a to 41c are notified of the operation plan created in CEMS 31 (for example, when the power consumption of the load significantly changes or the generated power of mega-solar plant 26 significantly changes to cause a significant change in demand and supply, compared with the power intended when the operation plan is created), the allocation ratio of power output by power conversion devices 41a to 41c can be made substantially equal to the ratio of power target value in creating the operation plan. For example, in a case where an operation plan is created such that the SOC of storage batteries 40a to 40c becomes zero substantially simultaneously (in discharge plan) a few hours later or in a case where an operation plan is created such that they are fully charged substantially simultaneously, the SOC can be zero or can be full substantially simultaneously, although the time is different, thereby achieving the effect of maintaining the intended operation plan.

When power conversion devices 41 equally share a differential power, the power allocation ratio of power conversion device 41 with a small power target value is high and the SOC of storage battery 40 becomes zero prior to the others. However, the present method enables the power excess/deficit to be allocated according to the original ratio of power target value, thereby achieving the effect of, for example, keeping the allocation of power low for storage battery 40 with a low SOC (with a small power target value).

In addition, the reference ΔF/ΔP characteristic is controlled in CEMS 31 based on the average value of the power target value normalized by the inverter capacity that each power conversion device 41 is notified of. For example, in a case where the power target value that each power conversion device 41 is notified of is small, in the first embodiment, when large load fluctuations or fluctuations in generated power occur and differential frequency ΔF becomes −ΔFmax, second DC/AC converter 408 is unable to output a power excess/deficit although it can supply in terms of the inverter capacity. However, the control as described above achieves the effect of extending the power that can be output from second DC/AC converter 408.

It is needless to say that the third embodiment is more effective as the number of power conversion devices 41 operating in distribution system 24 increases. For example, when the normalized power target values are 0.6, 0.2, 0.1, 0.15, 0.25, and 0.3, the average value Pref_avg is 0.27, so that when all of power conversion devices 41 have the same inverter capacity, the power range that can cope with load fluctuations and the like can be extended approximately twice (0.5/0.27 times).

Fourth Embodiment

In the second and third embodiments, the problem in control parameters for virtual synchronous generator control generated in the first embodiment and, as a solution to the problem, the method of calculating the slope of the reference ΔF/ΔP characteristic which is information for generating control parameters for virtual synchronous generator control generated in CEMS 31 have been described.

In a fourth embodiment, another determination method in calculating the slope of the reference ΔF/ΔP characteristic and a method of calculating the slope of the reference ΔF/ΔP characteristic based on it will be described. The configuration of CEMS 31 according to the fourth embodiment is basically the same configuration as CEMS 31 according to the third embodiment and differs only in the process in control parameter generating circuit 13 (FIG. 5) and the process in control parameter generating circuit 88 (FIG. 11). The fourth embodiment will be described below, focusing on the operation of the different parts.

The fourth embodiment differs from the second and third embodiments in a condition for determining whether to calculate the slope of the reference ΔF/ΔP characteristic using a numerical value different from that in the first embodiment, and in the method of generating a command value used when the slope of the reference ΔF/ΔP characteristic is generated.

Specifically, in the fourth embodiment, a power fluctuation range that can be covered when control parameters of virtual synchronous generator control circuit 83 are generated in the manner in the first embodiment is calculated, based on the power target value output from operation plan creating circuit 14 (FIG. 3) and given to each power conversion device 41, and the reference ΔF/ΔP characteristic is generated based on the calculation result. More specifically, the reference ΔF/ΔP characteristic is determined such that the power fluctuation range that can be covered as intended by CEMS 31 is ensured. In the following, an overview of the fourth embodiment will be described with reference to FIG. 52A and FIG. 52B.

Figure 52A:
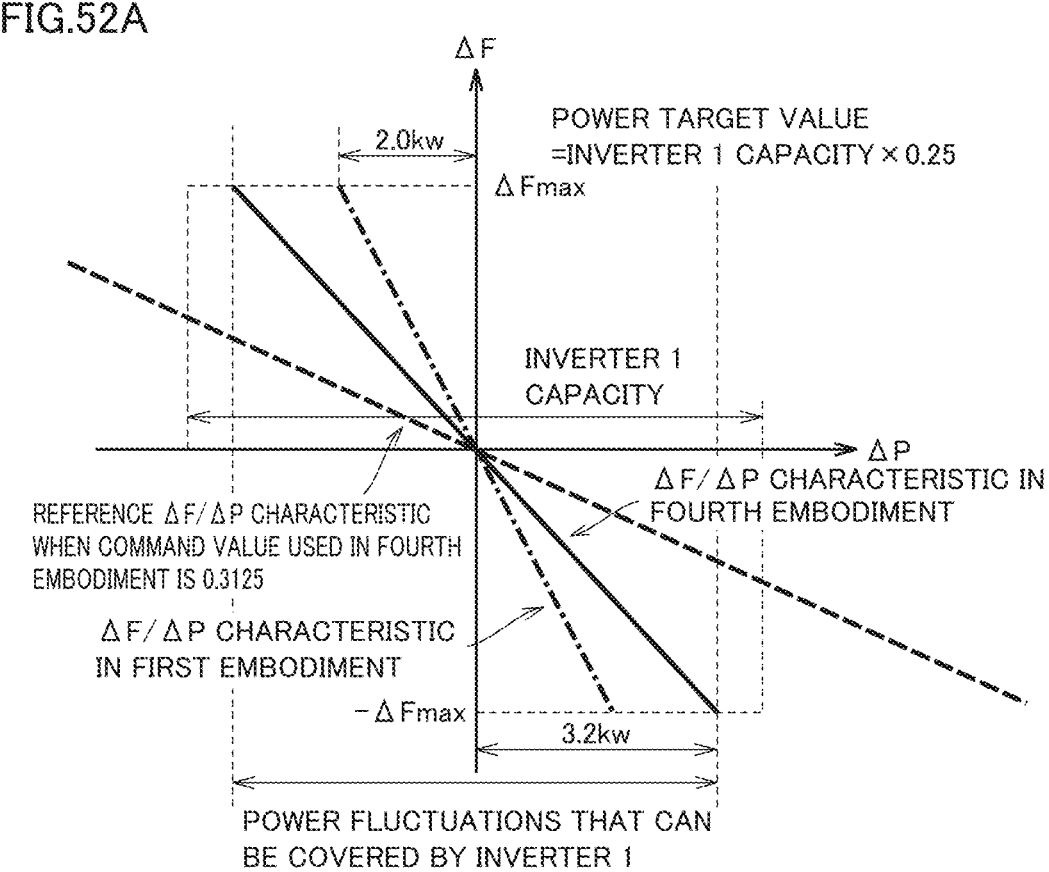
FIG. 52A is a diagram for explaining a method of creating a reference ΔF/ΔP characteristic and a ΔF/ΔP characteristic of a first power conversion device according to a fourth embodiment.
Figure 52B:
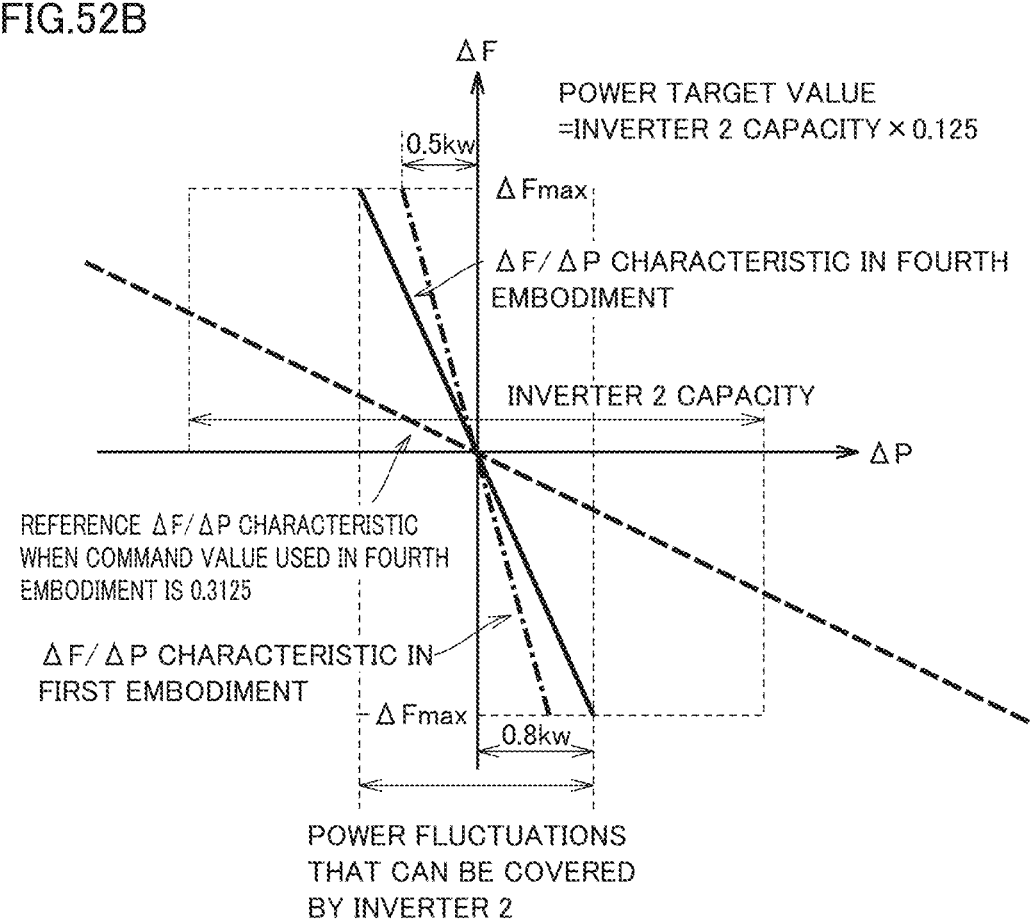
FIG. 52B is a diagram for explaining a method of creating a reference ΔF/ΔP characteristic and a ΔF/ΔP characteristic of a second power conversion device according to the fourth embodiment.

FIG. 52A and FIG. 52B are diagrams for explaining the operation of creating reference ΔF/ΔP characteristics and ΔF/ΔP characteristics of two power conversion devices 41 equipped with virtual synchronous generator control according to the fourth embodiment. A method of creating control parameters for virtual synchronous generator control generated in the fourth embodiment will be described below with reference to FIG. 52A and FIG. 52B.

In FIG. 52A, in first power conversion device 41, the inverter capacity is 8 kW, and the power target value normalized by the inverter capacity is 0.25. In FIG. 52B, in second power conversion device 41, the inverter capacity is 4 kW, and the power target value normalized by the inverter capacity is 0.125. In FIG. 52A, the ΔF/ΔP characteristic created by the creation method according to the first embodiment is indicated by a dashed-dotted line. In FIG. 52B, the ΔF/ΔP characteristic created by the creation method according to the first embodiment is indicated by a dashed-dotted line. Then, the reference ΔF/ΔP characteristic in the fourth embodiment is generated based on the ΔF/ΔP characteristic calculated based on the first embodiment from the power target values of two power conversion devices 41. As illustrated in FIG. 52A, first power conversion device 41 can supply a power deficit of 2.0 kW (8.0 kW (inverter capacity)×0.25 (power target value)) for load fluctuations and fluctuations in generated power of energy creation devices. In FIG. 52B, second power conversion device 41 can supply a power deficit of 0.5 kW (4.0 kW (inverter capacity)×0.125 (power target value)). Thus, a power deficit of up to 2.5 kW can be supplied.

That is, first and second power conversion devices 41 discharge 4 kW and 1 kW, respectively, so that the system frequency is 60 Hz-ΔFmax and the system frequency is unable to be decreased anymore. In the fourth embodiment, therefore, for load fluctuations and fluctuations in generated power of energy creation devices, the amount of power that needs to be covered in virtual synchronous generator control is calculated by operation plan creating circuit 14 (see FIG. 3) in CEMS 31 when creating an operation plan. Then, control is performed such that control parameters of virtual synchronous generator control circuit 83 are created based on the calculation result. More specifically, the reference ΔF/ΔP characteristic is determined.

For example, a case where operation plan creating circuit 14 gives an instruction such that fluctuations of up to 4.0 kW can be handled by two power conversion devices 41 will be described.

In this case, the power cover range when calculated by the method in the first embodiment is extended 1.6 times (4.0/2.5 times). The slope of the reference ΔF/ΔP characteristic is therefore 1/1.6 times steeper. Accordingly, the command value in calculating a reference ΔF/ΔP characteristic is 0.3125 (=0.5/1.6).

In FIG. 52A and FIG. 52B, the reference ΔF/ΔP characteristic in the fourth embodiment is indicated by a broken line. The method of calculating the slope of the reference ΔF/ΔP characteristic is the same as the calculation method in the second embodiment and will not be further elaborated. In each figure, the solid line indicates the ΔF/ΔP characteristic in generating control parameters of virtual synchronous generator control circuit 83.

Based on the foregoing, the operation of the distributed power source system in the fourth embodiment will be described. In the following, a method of generating information necessary for generating control parameters for virtual synchronous generator control generated in CEMS 31 will be described.

In the fourth embodiment, a case where the slope of the reference ΔF/ΔP characteristic is used as information necessary for generating control parameters in the same manner as in the second and third embodiments will be described.

Figure 53:
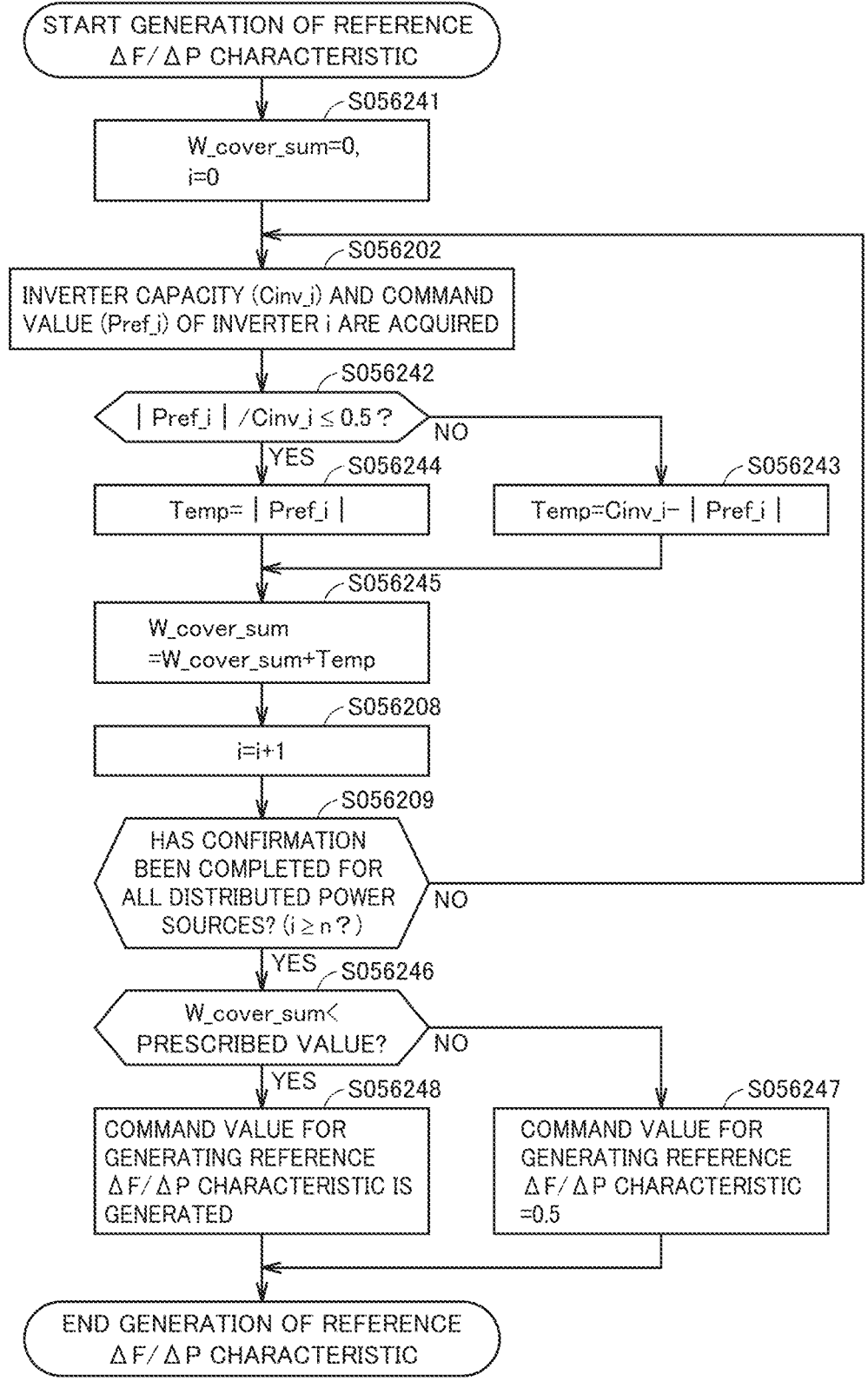
FIG. 53 is a flowchart for explaining a process of generating a reference ΔF/ΔP characteristic that is executed in the CEMS.

FIG. 53 is a flowchart for explaining a process of generating a reference ΔF/ΔP characteristic that is executed in CEMS 31. Since the operation of CEMS 31 is the same as in the second and third embodiments except for the calculation of the reference ΔF/ΔP characteristic, only the process of generating a reference ΔF/ΔP characteristic will be described.

As illustrated in FIG. 53, upon start of the process, reference ΔF/ΔP characteristic calculating circuit 131 (FIG. 5) sets initial values in generation (S056241). Specifically, W_conver_sum, which is used in calculating the sum of power target value output to power conversion device 41 connected to distribution system 24 and operating, is initialized to zero. Reference ΔF/ΔP characteristic calculating circuit 131 also sets the number i of power conversion device 41 connected to distribution system 24 and operating to zero. In this flow, it is assumed that n (n>2) power conversion devices 41 are connected to distribution system 24 and operating.

Upon completion of initialization at S056241, at S056202, inverter capacity Cinv_i and power target value Pref_i of the ith power conversion device 41 are acquired.

At S056242, the absolute value of power target value Pref_i acquired at S056202 is divided by inverter capacity Cinv_i, and the division result is compared with 0.5. As a result of comparison, if the division result exceeds 0.5 (NO at S056242), at S056243, Temp is set to inverter capacity Cinv_i-|Pref_i|.

On the other hand, if the division result is equal to or smaller than 0.5 (YES at S056242), at S056244, the absolute value of power target value Pref_i is substituted into Temp. The reason for this is as follows. In the case of using the reference ΔF/ΔP characteristic generated in the first embodiment, with a power target value exceeding 0.5, if virtual synchronous generator control circuit 83 controls power conversion device 41 with the ΔF/ΔP characteristic generated based on the above power target value, the power output as a deficit exceeds half of the inverter capacity before differential frequency ΔF reaches −ΔFmax. Thus, Temp is substituted such that the addition with |Pref_i| is the maximum value (that is, inverter capacity) of power that can be output by power conversion device 41.

At S056245, W_conver_sum=W_conver_sum+Temp is calculated. Further, at S056208, the number i of power conversion device 41 is incremented by 1 (i=i+1).

Upon completion of S056208, at S056209, it is confirmed whether the confirmation has been completed for power conversion devices 41 of all of the operating distributed power sources (i≥n). If the confirmation has not been completed for power conversion devices 41 of all of the distributed power sources (NO at S056209), the process returns to S056202 and continues.

If the confirmation has been completed for power conversion devices 41 of all of the operating distributed power sources at S056209 (YES at S056209), at S056246, the addition result (W_conver_sum) is compared with a prescribed value given from operation plan creating circuit 14 (see FIG. 3). The method of creating a prescribed value in operation plan creating circuit 14 will not be described in detail but an example is as follows. A prediction value of the power fluctuation range of mega-solar plant 26 due to fluctuations in solar radiation is stored in a not-shown database in power generation predicting circuit 142 (see FIG. 4), and a prediction value of the load fluctuation range is also stored in a not-shown database in power consumption predicting circuit 143 (see FIG. 4). Then, based on these two prediction values, the prescribed value may be generated.

If W_cover_sum is equal to or larger than the prescribed value (NO at S056246), it is determined that the range of power fluctuations predicted by operation plan creating circuit 14 can be covered, and at S056247, the command value in calculating the slope of the reference ΔF/ΔP characteristic is set to 0.5, in the same manner as in the first embodiment. The process of generating a reference ΔF/ΔP characteristic then ends.

On the other hand, if W_cover_sum is smaller than the prescribed value (YES at S056246), the range of power fluctuations predicted by operation plan creating circuit 14 is unable to be covered, and then a command value used in generating a reference ΔF/ΔP characteristic is generated (S056248). In the fourth embodiment, as described in the example in FIG. 52A and FIG. 52B, the command value is calculated based on the following expression, and the process of generating a reference ΔF/ΔP characteristic ends.

Command value=0.5/(prescribed value given from operation plan creating circuit14/$W\_conver\_sum$)

As described above, in the distributed power source management device according to the fourth embodiment, even when the demand balance significantly changes immediately after power conversion devices 41a to 41c are notified of the operation plan generated in CEMS 31 (for example, when the power consumption of the load significantly changes or the generated power of mega-solar plant 26 significantly changes to cause a significant change in demand and supply, compared with the power intended when the operation plan is created), the allocation ratio of power output by power conversion devices 41a to 41c can be made substantially equal to the ratio of power target value in creating the operation plan.

For example, in a case where an operation plan is created such that the SOC of storage batteries 40a to 40c becomes zero substantially simultaneously (in discharge plan) a few hours later or in a case where an operation plan is created such that they are fully charged substantially simultaneously, the SOC can be zero or can be full substantially simultaneously, although the time is different, thereby achieving the effect of maintaining the intended operation plan.

When power conversion devices 41 equally share a differential power, the power allocation ratio of power conversion device 41 with a small power target value is high and the SOC of storage battery 40 becomes zero prior to the others. However, the present method enables the power excess/deficit to be allocated according to the original ratio of power target value, thereby achieving the effect of, for example, keeping the allocation of power low for storage battery 40 with a low SOC (with a small power target value).

Furthermore, since control is performed in CEMS 31 such that the reference $\Delta F/\Delta P$ characteristic is generated based on a power excess/deficit when differential frequency $\Delta F$ reaches $-\Delta Fmax$ from the power target value that each power conversion device 41 is notified of, the power range that can cover load fluctuations or fluctuations in generated power can be specified by operation plan creating circuit 14. This configuration achieves the effect of generating control parameters in virtual synchronous generator control circuit 83 such that the fluctuation range predicted by the prediction result of the amount of power generation and the prediction result of power consumption can be covered. In the example in FIG. 52A and FIG. 52B, load fluctuations up to about 1.6 times larger can be covered.

As described above, in the distributed power source system according to the first to fourth embodiments, even when fluctuations in load power consumption or fluctuations in generated power of energy creation devices such as mega-solar plant 26 occur in distribution system 24 including a plurality of power conversion devices 41 equipped with virtual synchronous generator control, a power excess/deficit can be shared at a power allocation ratio created in CEMS 31. For example, this is effective in suppressing a phenomenon in which when the power consumption of a load increases, the ratio of power target value in an operation plan is lost, and the power output by power conversion device 41 with a small power target value has a larger power allocation ratio, compared with the other power conversion devices 41.

Furthermore, in the first to fourth embodiments, some of the functions implemented in CEMS 31 are imparted to the power conversion device 41 side. For example, when virtual synchronous generator control is implemented in home storage batteries installed by general consumers, in the first embodiment, CEMS 31 needs to generate control parameters for virtual synchronous generator control for hundreds to thousands of home storage batteries. However, implementing some of the functions in home storage batteries can alleviate the process load on the CEMS 31 side.

Further, in a case where virtual synchronous generator control units implemented in power conversion devices 41 and home storage batteries have different configurations, if control parameters are generated on the CEMS 31 side, for example, different kinds of virtual synchronous generator models in FIG. 5 need to be prepared, or different kinds of table data described in the second embodiment need to be prepared, and the number of control parameters generated may vary. Even in such a case, the process on the CEMS 31 side can be simplified by generating control parameters on the power conversion device 41 side or the home storage battery side.

Further, in the first to fourth embodiments, information necessary for generating a reference $\Delta F/\Delta P$ characteristic (slope information of reference $\Delta F/\Delta P$ characteristic, command value information used in generating a reference $\Delta F/\Delta P$ characteristic, power target value, etc.), information necessary for generating a $\Delta F/\Delta P$ characteristic (slope of $\Delta F/\Delta P$ characteristic, power target value), and system information (reference frequency, $\Delta Fmax$ value, response time requested for virtual synchronous generator control) have been described as information necessary for generating control parameters of virtual synchronous generator control circuit 83 in power conversion device 41. However, embodiments are not limited thereto. For example, notification is given as to the value of deviation ($\Delta Fcalc$) in system frequency when the output of power conversion device 41 changes by a predetermined value ($\Delta P\_fix$), or the excess/deficit ($\Delta Pcalc$) of power output from power conversion device 41 when the deviation in system frequency changes to a prescribed value ($\Delta F\_fix$), and the slope of the $\Delta F/\Delta P$ characteristic based on the given information, and then control parameters of virtual synchronous generator control circuit 83 are generated based on the calculation result. Such a configuration also achieves similar effects.

In the first to fourth embodiments, when an operation plan (power target value) for power conversion device 41 is created, control parameters for virtual synchronous generator control implemented for the static inverter are generated from the capacity of the static inverter in each power conversion device 41 and the power target value. Therefore, even when the power consumption of loads fluctuates (or abruptly changes) or the generated power of energy creation devices such as mega-solar plant 26 fluctuates (or abruptly changes) in a period before notification of the next operation plan is given from CEMS 31, the power excess/deficit can be shared substantially at the same share ratio as that of the operation plan (power target value).

Accordingly, for example, even when the solar radiation changes immediately after notification of an operation plan, and the generated power of mega-solar plant 26 decreases by 50%, the deficient power of 50% is shared based on the ratio of power target value calculated when the operation plan is created. Therefore, for example, in a case where it is planned that the SOC becomes zero substantially simultaneously by control at the ratio of the power target value in creating an operation plan, even when the generated power of mega-solar plant 26 decreases by 50% due to change in solar radiation, the SOC is controlled to become zero substantially simultaneously because the power excess/deficit is allocated based on the ratio of power target value.

In the first to fourth embodiments, virtual synchronous generator control is implemented in power conversion device 41. However, embodiments are not limited thereto. Similar effects can be achieved, for example, even when virtual synchronous generator control is implemented in an energy creation device such as a wind generator, as a matter of course. In particular, a wind generator has propellers to rotate a motor and therefore the power generator has an inertial force, thereby achieving similar effects, as a matter of course.

In the first to fourth embodiments, distribution system 24 equipped with a plurality of large-capacity storage batteries such as storage batteries 40 has been described. However, virtual synchronous generator control may be implemented in a power conversion device for home storage batteries or a power conversion device for electric vehicles to perform control similar to CEMS 31, as a matter of course. In this case, hundreds of power conversion devices are to be connected to distribution system 24. Further, in terms of storage battery capacity, similar effects can be achieved when large-capacity storage batteries such as storage batteries 40 (for example, a few hundred kW to a few MW) and home storage batteries (a few kW) are disposed, as a matter of course.

In the first to fourth embodiments, power conversion device 41 has been described. However, embodiments are not limited thereto. Even in a case where virtual synchronous generator control is implemented in a such a system that supplies the generated power from solar batteries (which are not limited to mega-solar plants and may be home solar batteries), wind generators, and/or fuel cells to the system, in which static inverters are controlled as voltage sources, similar effects can be achieved by a configuration that generates control parameters for virtual synchronous generator control similarly, as a matter of course. Furthermore, vehicle-mounted storage batteries on electric vehicles (EVs), plug-in hybrid electric vehicles (PHEVs), or fuel cell vehicles (FCVs) can be used.

In the first to fourth embodiments, for simplicity of explanations, the operation has been described using power conversion device 41 of a few kW. However, embodiments are not limited thereto. The application to distribution system 24 has been described but embodiments are not limited thereto. Similar effects can be achieved by applying the present technology to power transmission systems or independent micro-grids, as a matter of course.

Further, the first to fourth embodiments have been described, taking three-phase alternating current as an example. However, embodiments are not limited thereto. Single-phase alternating current or single-phase three-wire alternating current may be employed, as a matter of course.

Further, even when power conversion devices for system storage batteries (three-phase alternating current) and storage battery systems for home use (single-phase alternating current) coexist, similar effects can be achieved by a configuration that generates control parameters for virtual synchronous generator control similarly, as a matter of course.

In the first to fourth embodiments, when control parameters for virtual synchronous generator control are generated for the static inverter in power conversion device 41, the capacity of the static inverter and the power target value are used in calculation. However, the embodiments are not limited thereto. When the ratio of the storage capacity of the storage battery to the capacity of the static inverter varies, for example, when the storage battery capacity of storage battery 40a is twice as large as the capacity of the static inverter in power conversion device 41a and the storage battery capacity of storage battery 40b is three times as large as the capacity of the static inverter in power conversion device 41b, the operation plan (power target value) is generated in consideration of the capacity ratio, or the capacity ratio is considered when information necessary for generating control parameters for virtual synchronous generator control is generated, thereby achieving similar effects, as a matter of course.

In the first to fourth embodiments, two cases have been described, in which when control parameters for virtual synchronous generator control are generated in CEMS 31, control parameters are generated in CEMS 31 and transmitted with information on a power target value, and in addition, system information, information necessary for generating the slope of the $\Delta F/\Delta P$ characteristic, and information necessary for generating the slope of the reference $\Delta F/\Delta P$ characteristic are transmitted. However, embodiments are not limited thereto. Similar effects can be achieved by a configuration in which CEMS 31 transmits information that enables control parameters to be generated at least in a power conversion device connected to distribution system 24 and equipped with a virtual synchronous generator control unit, as a matter of course.

In the first to fourth embodiments, when control parameter of the virtual synchronous generator control unit are determined, a virtual synchronous generator model is contained, or alternatively, the relation between damping coefficient Dg and the frequency illustrated in FIG. 19 is stored as table data for a plurality of values of speed adjustment rate Kgd, and a combination of speed adjustment rate Kgd and damping coefficient Dg that substantially agrees with the slope of the $\Delta F/\Delta P$ characteristic is searched for based on $\Delta F$max information, or alternatively, the relation between speed adjustment rate Kgd and the frequency illustrated in FIG. 18 is stored as table data for a plurality of values of damping coefficient Dg, and a combination of speed adjustment rate Kgd and damping coefficient Dg that substantially agrees with the slope of the $\Delta F/\Delta P$ characteristic is searched for based on $\Delta F$max information. However, embodiments are not limited thereto. For example, the virtual synchronous generator control unit may be contained in the form of a mathematical model or any other method may be employed, as a matter of course.

Further, in the first to fourth embodiments, when control parameters of the virtual synchronous generator control unit are determined, the $\Delta F/\Delta P$ characteristic is generated. However, embodiments are not limited thereto. For example, a distribution system model (digital twin) below substation 20 is implemented in CEMS 31, and information necessary for calculating control parameters is generated such that the operation is optimized in a conceivable use case using the distribution system model. Further, AI may be implemented to calculate the control parameters.

In the first to fourth embodiments, the communication period between CEMS 31 and DSO 21 is 30 minutes, and the communication period between CEMS 31 and each power conversion device 41 is 5 minutes. However, embodiments are not limited thereto. For example, the communication period between CEMS 31 and each power conversion device 41 may be 1 minute or may be even further shorter, as a matter of course.

In the first to fourth embodiments, the governor model in governor control circuit 833 is made as a first-order lag system. However, similar effects can be achieved by a second-order time lag system or a low pass filter (LPF), as a matter of course.

Further, in the first to fourth embodiments, the mass system computing circuit is modeled with the integrator and the feedback loop illustrated in FIG. 16. However, embodiments are not limited thereto. For example, it may be modeled with a first-order lag system, a second-order lag system, or an LPF, as a matter of course.

In the first to fourth embodiments, VQ control, which is often carried out in virtual synchronous generator control, is not described for simplicity of explanation. However, the present method may be employed in a power conversion device equipped with VQ control as virtual synchronous generator control to achieve similar effects, as a matter of course. Further, the configuration of mass system computing circuit 837 is not limited to the configuration illustrated in FIG. 16.

Description of Modifications

In the first to fourth embodiments, for ease of explanation, the control circuits of power conversion device 27 for a mega-solar plant and power conversion device 41 for a storage battery have the configurations illustrated in FIG. 6 to FIG. 16, and CEMS 31 is configured by hardware (H/W) as illustrated in FIGS. 3 to 5. However, the functions of each block or some blocks depicted in the blocks may be implemented by software (S/W) implemented on a central processing unit (CPU) to achieve similar control functions. Alternatively, the functions of at least some blocks may be divided into software and hardware to implement similar control functions.

Embodiments disclosed here should be understood as being illustrative rather than being limitative in all respects. The scope of the present disclosure is shown not in the foregoing description but in the claims, and it is intended that all modifications that come within the meaning and range of equivalence to the claims are embraced here.

REFERENCE SIGNS LIST 11 communication circuit, 12 memory circuit, 13 control parameter generating circuit, 14 operation plan creating circuit, 15 transmission data generating circuit, 16 control circuit, 20 substation, 21 distribution automation system (DSO), 22, 201, 206, 210, 401, 406, 410 voltmeter, 23 step voltage regulator (SVR), 24 distribution system, communication line, 26 mega-solar plant, 27 power conversion device for mega-solar plant, 28 switch, 29 impedance, 30 synchronous generator, 31 CEMS, 40, 40a to system storage battery, 41, 41a to 41c power conversion device for storage battery, 51 MPPT control circuit, 52 voltage control circuit, 53 first switching circuit, 54 fifth control circuit, 61 phase detecting circuit, 62 first sine wave generating circuit, 63, 66, 101, 832, 836, 852 subtractor, 64 first PI control circuit, 65, 91, 103 multiplier, 67 sixth control circuit, 68 second PI control circuit, 69 first PWM converter, 71 charge control circuit, 72 discharge control circuit, 73 second switching circuit, 74 seventh control circuit, 81 AC frequency detecting circuit, 82 effective power calculating circuit, 83 virtual synchronous generator control circuit, 84 inverter current control circuit, 85 inverter voltage control circuit, 86 third switching circuit, 87 eighth control circuit, 88 control parameter generating circuit, 92 first-order lag system model, 93 limiter circuit, 102 integrator, 104 divider, 105, 835 adder, 106 phase calculating circuit, 100a to 100d town, 110 factory, 141 storage battery operation plan creating circuit, 142 power generation predicting circuit, 143 power consumption predicting circuit, 144 storage battery operation plan correcting circuit, 135 third management circuit, 145 first management circuit, 146 second management circuit, 131 reference ΔP/ΔF characteristic calculating circuit, 132 ΔP/ΔF characteristic calculating circuit, 136 control circuit, 202, 207, 211, 402, 407, 411 ammeter, 203 first DC/DC converter, 204 first control circuit, 205, 405 DC bus, 208 first DC/AC converter, 209 second control circuit, 212, 412 communication I/F, 403 second DC/DC converter, 404 third control circuit, 408 second DC/AC converter, 409 fourth control circuit, 810 phase detecting circuit, 811 frequency detecting circuit, 812 second sine wave generating circuit, 833 governor control circuit, 837 mass system computing circuit, 851 third sine wave generating circuit, 853 third PI control circuit, 854 second PWM converter, 855 first current limiting circuit, 600 load.

The invention claimed is:

1. A power conversion device comprising:
an inverter to convert a power output from a distributed power source into an AC power and output the AC power to an AC system; and
a controller to control the inverter,
the controller including
virtual synchronous generator control circuitry to impart a transient characteristic of a synchronous generator to the inverter,
control parameter generating circuitry to generate a control parameter for controlling the virtual synchronous generator control circuitry,
inverter voltage control circuitry to control the inverter as a voltage source, based on AC system voltage information input from the virtual synchronous generator control circuitry, and
communication circuitry to receive, from a management device that manages the distributed power source, a power target value of the distributed power source and information necessary for generating the control parameter,
wherein the control parameter generating circuitry generates at least one of a speed adjustment rate and a damping coefficient to be used in the virtual synchronous generator control circuitry, based on the power target value and the information necessary for generating the control parameter received by the communication circuitry.

2. The power conversion device according to claim 1, wherein
the virtual synchronous generator control circuitry includes
governor control circuitry to mimic a governor function of the synchronous generator, and
mass system computing circuitry to mimic a swing equation of the synchronous generator,
the control parameter for controlling the governor control circuitry includes a governor time constant to determine response performance of the synchronous generator, and the speed adjustment rate, and
the control parameter for controlling the mass system computing circuitry includes an inertia constant to mimic inertia of a mechanical rotor, and the damping coefficient to apply a damping force to the mechanical rotor.

3. The power conversion device according to claim 1, further comprising a voltmeter to measure an AC system voltage of the AC system,
wherein the inverter voltage control circuitry generates an AC voltage target value based on the AC system voltage information input from the virtual synchronous generator control circuitry and controls the inverter as the voltage source based on the generated AC voltage target value and a measurement value of the voltmeter.

4. The power conversion device according to claim 2, further comprising a voltmeter to measure an AC system voltage of the AC system,
wherein the inverter voltage control circuitry generates an AC voltage target value based on the AC system voltage information input from the virtual synchronous generator control circuitry and controls the inverter as the voltage source based on the generated AC voltage target value and a measurement value of the voltmeter.

5. The power conversion device according to claim 2, further comprising:
a voltmeter to measure an AC system voltage of the AC system;
an ammeter to measure an AC current of the AC system;
effective power calculating circuitry to calculate an AC effective power based on measurement values of the voltmeter and the ammeter; and
an AC frequency detector to detect a frequency and a zero cross point or a phase of the AC system voltage, based on a measurement value of the voltmeter, wherein
the governor control circuitry calculates an offset value to be added to the power target value, based on a reference frequency of the AC system voltage and a frequency of the AC system voltage detected by the AC frequency detector, and outputs a result of the calculation to the mass system computing circuitry, and the mass system computing circuitry generates a frequency and a phase of the AC system voltage to be output as the AC system voltage information to the inverter voltage control circuitry, based on a result of addition of the power target value and the offset value, and the AC effective power.

6. The power conversion device according to claim 4, further comprising:
an ammeter to measure an AC current of the AC system;
effective power calculating circuitry to calculate an AC effective power based on measurement values of the voltmeter and the ammeter; and
an AC frequency detector to detect a frequency and a zero cross point or a phase of the AC system voltage, based on a measurement value of the voltmeter, wherein
the governor control circuitry calculates an offset value to be added to the power target value, based on a reference frequency of the AC system voltage and a frequency of the AC system voltage detected by the AC frequency detector, and outputs a result of the calculation to the mass system computing circuitry, and
the mass system computing circuitry generates a frequency and a phase of the AC system voltage to be output as the AC system voltage information to the inverter voltage control circuitry, based on a result of addition of the power target value and the offset value, and the AC effective power.

7. The power conversion device according to claim 5, wherein
the inverter voltage control circuitry includes current limiting circuitry to limit an AC current output by the inverter, and
the current limiting circuitry imposes a limit on an AC current output by the inverter when a measurement value of the ammeter deviates from a preset current range.

8. The power conversion device according to claim 1, wherein the control parameter generating circuitry generates the control parameter, based on a capacity of the inverter, prescribed information for connecting to the AC system, and the power target value and the information necessary for generating the control parameter received by the communication circuitry.

9. The power conversion device according to claim 8, wherein
the control parameter generating circuitry:
generates a reference $\Delta F/\Delta P$ characteristic indicating a relation between a differential frequency and a differential power when a multiplication value obtained by multiplying a capacity of the inverter by a predetermined ratio is set as the power target value, the differential frequency being a deviation of a system frequency from a reference frequency of an AC system voltage of the AC system, the differential power being a deviation of an output power of the inverter from the power target value;
generates a $\Delta F/\Delta P$ characteristic for controlling the inverter, based on the generated reference $\Delta F/\Delta P$ characteristic and the power target value given from the management device; and
generates the control parameter using the generated $\Delta F/\Delta P$ characteristic.

10. The power conversion device according to claim 1, wherein
the information necessary for generating the control parameter includes a reference $\Delta F/\Delta P$ characteristic or information necessary for generating the reference $\Delta F/\Delta P$ characteristic, or a $\Delta F/\Delta P$ characteristic or information necessary for generating the $\Delta F/\Delta P$ characteristic,
the reference $\Delta F/\Delta P$ characteristic indicates a relation between a differential frequency and a differential power when a multiplication value obtained by multiplying a capacity of the inverter by a predetermined ratio is set as the power target value, the differential frequency being a deviation of a system frequency from a reference frequency of an AC system voltage of the AC system, the differential power being a deviation of an output power of the inverter from the power target value,
the $\Delta F/\Delta P$ characteristic indicates a relation between a differential frequency and a differential power, the differential frequency being a deviation of a system frequency from the reference frequency, the differential power being a deviation of an output power of the inverter from the power target value given from the management device, and
the control parameter generating circuitry generates the control parameter, based on the power target value and the information necessary for generating the control parameter given from the management device, and a capacity of the inverter.

11. The power conversion device according to claim 9, wherein
the control parameter generating circuitry:
calculates the differential power of an output power of the inverter from the power target value given from the management device;
calculates the differential frequency, based on the $\Delta F/\Delta P$ characteristic or the information necessary for generating the $\Delta F/\Delta P$ characteristic; and
generates the control parameter, based on the calculated differential power and differential frequency.

12. The power conversion device according to claim 10, wherein
the control parameter generating circuitry:
calculates the differential power of an output power of the inverter from the power target value given from the management device;
calculates the differential frequency, based on the $\Delta F/\Delta P$ characteristic or the information necessary for generating the $\Delta F/\Delta P$ characteristic; and
generates the control parameter, based on the calculated differential power and differential frequency.

\* \* \* \* \*